United States Patent
Shi et al.

(10) Patent No.: US 12,216,357 B2
(45) Date of Patent: Feb. 4, 2025

(54) DISPLAY BACKPLANES WITH INTEGRATED ELECTRONICS, PHOTONICS AND COLOR CONVERSION COMPONENTS

(71) Applicant: Meta Platforms Technologies, LLC, Menlo Park, CA (US)

(72) Inventors: Zhimin Shi, Bellevue, WA (US); Xi Wu, Redmond, WA (US); James Ronald Bonar, Redmond, WA (US); Yun Wang, Bellevue, WA (US); Edward Buckley, High Peak (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/464,338

(22) Filed: Sep. 11, 2023

(65) Prior Publication Data

US 2024/0085740 A1    Mar. 14, 2024

Related U.S. Application Data

(60) Provisional application No. 63/405,810, filed on Sep. 12, 2022, provisional application No. 63/405,821, filed on Sep. 12, 2022.

(51) Int. Cl.
*G02F 1/1335* (2006.01)
*F21V 8/00* (2006.01)

(52) U.S. Cl.
CPC ..... *G02F 1/133614* (2021.01); *G02B 6/0001* (2013.01)

(58) Field of Classification Search
CPC ............ G02F 1/133614; G02B 6/0001; G02B 6/0026; G02B 6/005; G02B 6/0035
See application file for complete search history.

(56) References Cited

U.S. PATENT DOCUMENTS

| | | | |
|---|---|---|---|
| 6,167,169 A | 12/2000 | Brinkman et al. | |
| 2011/0255303 A1 | 10/2011 | Nichol et al. | |
| 2023/0185011 A1* | 6/2023 | Shi | G02B 6/0036 349/65 |
| 2023/0332759 A1* | 10/2023 | Gao | H01L 31/035218 |

OTHER PUBLICATIONS

International Search Report and Written Opinion for International Application No. PCT/US2023/032514, mailed Jan. 5, 2024, 10 pages.

* cited by examiner

*Primary Examiner* — Anne M Hines
*Assistant Examiner* — Jose M Diaz
(74) *Attorney, Agent, or Firm* — Greenberg Traurig, LLP

(57) ABSTRACT

In some examples, an apparatus may include a backlight unit (BLU) including an electronic integrated circuit layer, a photonic integrated circuit layer, a color conversion module, and a display interface layer. In some examples, a BLU may include at least one laser or may be configured to receive laser light from at least one external laser source. Laser light may be transmitted towards a portion of the display interface layer using the photonic integrated circuit. Color conversion modules may be used to convert the laser light into one or more desired colors. Example apparatus may be used in head-mounted devices such as augmented reality and/or virtual reality devices. Other devices, methods, systems, and computer-readable media are also disclosed.

20 Claims, 34 Drawing Sheets

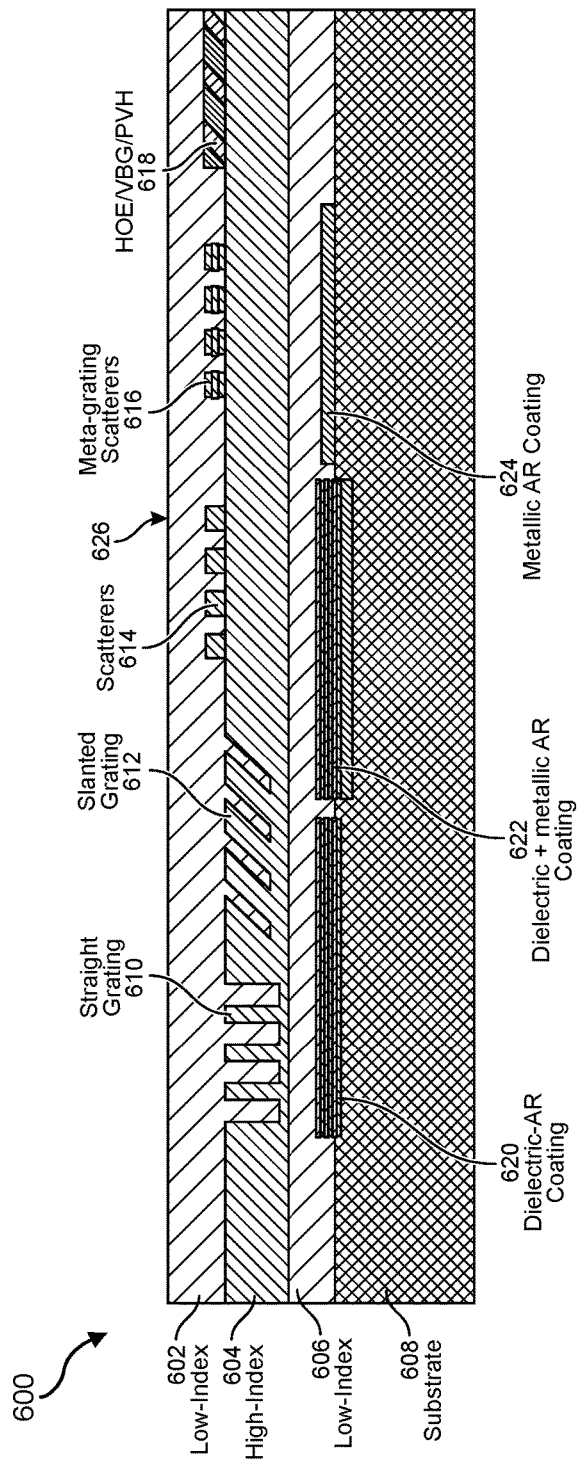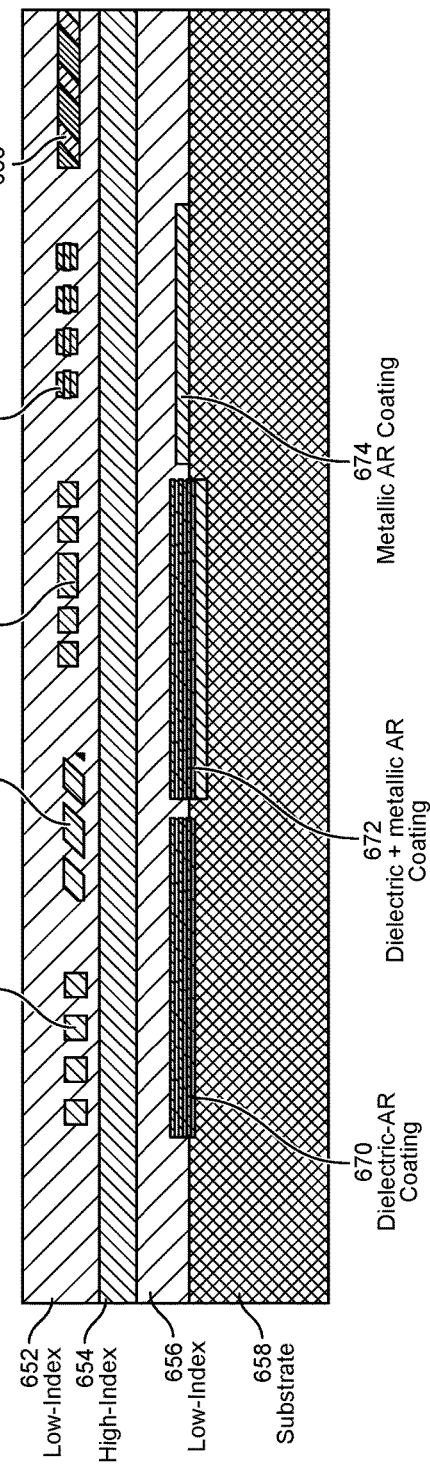

An Example of a Mach-Zehnder Interferometer Based
2-Input—2-Output Active Light Distributor. The MZI
Includes Two 2-by-2 Directional Couplers Photonic Crystal Based 1 by 2 Coupler Ring+Based 1-by-2 Coupler

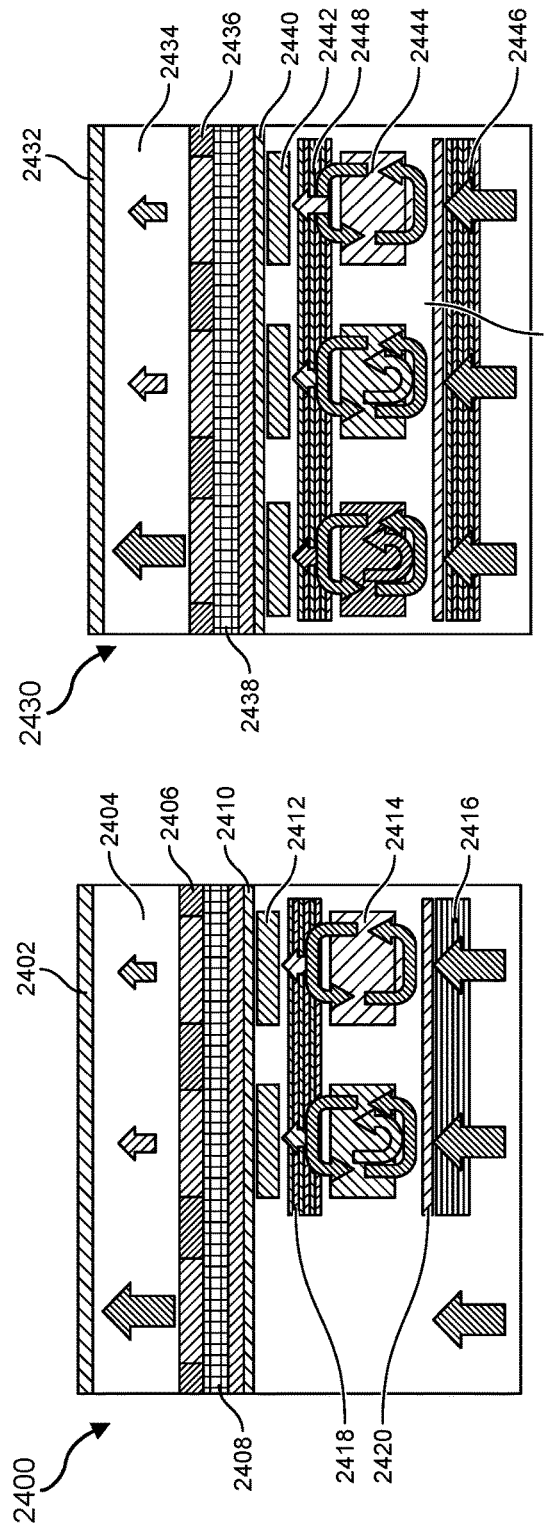
FIG. 24A
FIG. 24B
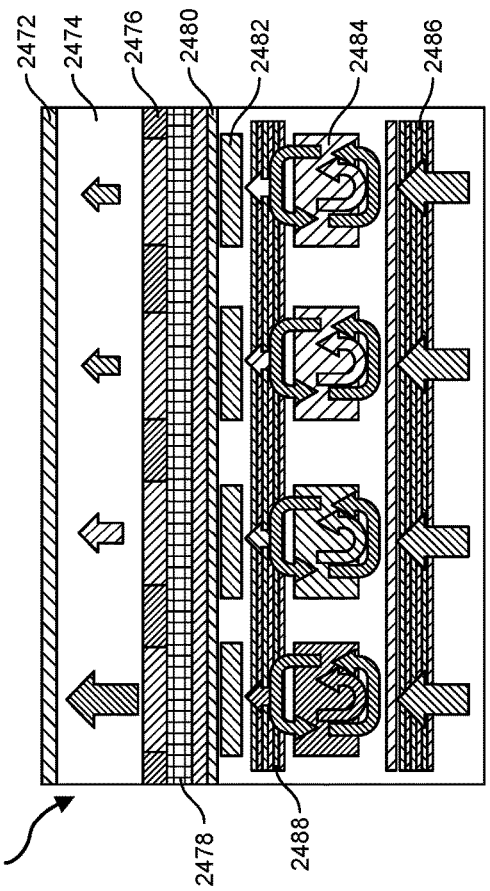
FIG. 24C

DISPLAY BACKPLANES WITH INTEGRATED ELECTRONICS, PHOTONICS AND COLOR CONVERSION COMPONENTS

CROSS REFERENCE TO RELATED APPLICATION

This application claims the benefit of U.S. Provisional Application No. 63/405,821, filed Sep. 12, 2022 and U.S. Provisional Application No. 63/405,810, filed Sep. 12, 2022, the disclosures of both of which are incorporated, in their entirety, by this reference.

BRIEF DESCRIPTION OF DRAWINGS

The accompanying drawings illustrate a number of exemplary embodiments and are a part of the specification. Together with the following description, the drawings illustrate various examples of the present disclosure.

FIGS. 6A and 6B show light outcoupling structures, according to some examples.

FIGS. 24A-24C shows approaches to obtaining color illumination of a display, according to some examples.

Figure 1:
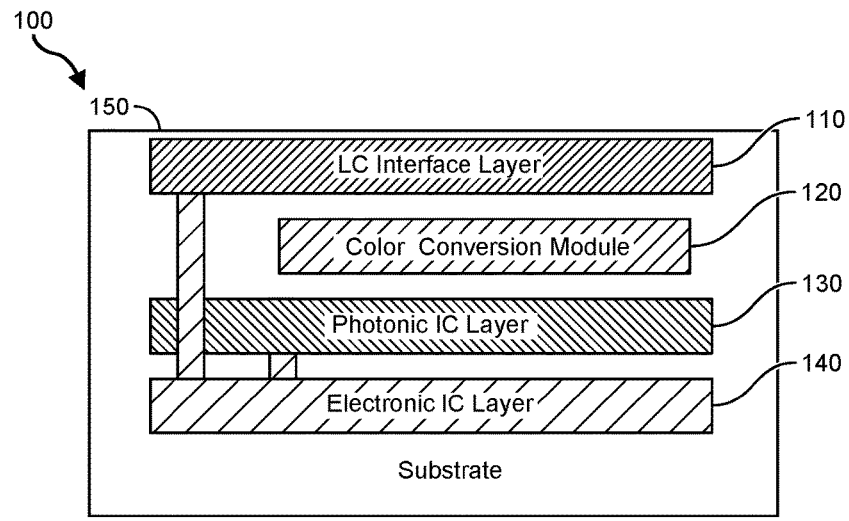
FIG. 1 shows a device including an LC interface layer, a color conversion module and a photonic IC layer, according to some examples.

Throughout the drawings, identical reference characters and descriptions may indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Augmented reality and/or virtual reality (AR/VR) devices may include a display configured to provide virtual or augmented reality elements. In augmented reality (AR), the AR image elements may be combined with light from an external environment.

A display backlight may include at least one laser and an active photonic integrated circuit (APIC) to illuminate various backlight zones of the display. For examples, laser radiation may be distributed using waveguides and light outcoupler elements may be located near the center of each zone. Light intensity within each zone may be controlled using active optical components. Laser radiation may include UV or blue light, and color conversion elements may be used to obtain any other desired colors. Color conversion elements may include fluorescent materials and may be arranged within sub-pixels. Color conversion elements may optionally include an optical resonator and include additional focusing elements.

In some examples, a display backplane may include an electronics layer, a photonics circuit layer, a color conversion layer, and a display interface. The electronics layer may include drive electronics. The photonics layer may distribute laser radiation to illuminate the display. The color conversion layer may convert essentially monochromatic laser radiation into any desired color to illuminate display pixels or subpixels. A color conversion layer may include one or more color conversion modules, wherein each color conversion module is configured to convert an incident light color into a converted light color. In some examples, the incident light color may include blue, violet, or ultraviolet (UV) light. A device may include an arrangement (e.g., an array) of color conversion modules within a color conversion layer, and the color conversion modules may be physically aligned with respective color pixels or subpixels of a display. The display interface may include electrodes and active matrix components for pixel switching control. Electrically conductive vias may interconnect the electronics layer and the display interface, allowing a higher fill factor and a brighter display. The electronics layer may also control active optical components in the photonics circuit layer. The display backplane may support a liquid crystal display (LCD) or any other suitable display technology. Examples devices may include a backlight unit (BLU) having an integrated laser, photonic IC, and color conversion elements. In some examples, the backlight may provide adjustable illumination of one or more backlight zones.

In some examples, one or more lasers may be used as a light source for a backlight unit for a display. Laser light may provide high brightness, high directionality, and may allow large color gamut (e.g., using color conversion modules). However, the delivery of laser light to the display panels is a challenging problem. Current AR waveguides exhibit severe nonuniformity, which is device and pupil position dependent. A display engine with dynamic zonal brightness control would be very useful for display performance & power budget.

Examples relate to illuminating a display (e.g., a liquid crystal display) using different colors of light. In some examples, a photonic integrated circuit receives blue light and conveys the blue light to a display portion. A color conversion module proximate the display portion converts parts of the blue light into red light and green light. The display portion can then be illuminated using red, green and blue light while needing only a single photonic network to distribute the blue light to the portion of the display. Red and green light can be generated locally proximate the display portion and separate photonic networks for the red and green light are not needed. In some examples, the photonic IC may transmit other pump light colors such as violet light or UV light, and color conversion modules may be used to generate blue, green (or yellow) and red light.

BLUs including miniLEDs may use diffusers to help create uniform illumination, but these introduce additional losses, weight, and thickness to the module. Light guides may couple light (either lasers or LEDs) from the side, but may have problems in uniformity, light cone angle control, and polarization maintenance. AR waveguide based delivery may be challenging in terms of uniformity and issues of interference between overlapping part. Photonic IC (IC) based delivery systems may also suffer uniformity challenges, angular cone challenges, cross-talk and speckle challenges. Current architectures may not support zonal illumination, which is useful for improved contrast ratio and power efficiency.

In some examples, an active photonics integrated circuit (APIC) based laser back light unit may provide one or more of the following: color-separated sources for individual sub-pixels; high pixel density; high efficiency; and/or zonal dimming functionalities. An example BLU backplane, BLU, or device including a BLU may include a source light, a dynamic light distribution module, at least one outcoupling module, at least one beam spot generation module, at least one color-conversion module, and optionally one or more color filters. A module configuration may be designed for a specific application, such as an AR/VR device or other display application. The module design may provide high performance and relatively straightforward manufacturability.

Technical advantages may include an efficient laser backlight unit having local (zonal) dimming functionalities. A device may include only one laser source and a simple integrated light routing and control network. Local dimming and energy redistribution may be achieved using an active light distribution module. Only one out-coupler design (e.g., with high out-coupling efficiency) may be used per local zone per color. A redundant design may be tolerant of individual light channel failure. In some examples, light may be focused into the finite opening of display panels for improved light efficiency. Light color conversion may be provided at the sub-pixel level for better light efficiency. In some examples discussed further below, a device may not require alignment at the pixel level between the outcoupling module and a beam spot generation module.

Compact displays are very useful for AR/VR systems. For LCOS/TFT based displays, the light illumination module typically takes up a lot of space. A laser BLU architecture may integrate the electronic and photonic integrated circuits, greatly reducing the complexity, footprint, weight and size of the display.

However, the need for red/green/blue (RGB) light illumination suggests that the BLU includes three set of photonic networks, which can be complicated and difficult to achieve high performance. In particular, this becomes challenging for high PPI (pixels per inch) displays.

An integrated electronic and photonic (including color conversion) display backplane architecture may provide a compact, high-efficiency, high-PPI and cost-effective display that supports a laser light source and provides an excellent color gamut. A backlight unit (BLU) may include four layers that can be fabricated in sequence using standard lithographic manufacturing process: an LC interface layer, a color conversion module, a photonic IC layer, and an electronic IC layer. The integration of these layers allows use with both front-lit and back-lit display panels.

FIG. 1 shows an example device 100 including an LC interface layer 110, a color conversion module 120, a photonic IC layer 130, an electronic IC layer 140, and a substrate 150. The electronic IC layer 140 may be in electronic communication with the photonic IC layer 130 and the LC interface layer 110 through one or more electrodes. An example device may include a liquid crystal display adjacent to or including the LC interface layer, for example, a liquid crystal display including electrodes, at least one transparent substrate, at least one polarizer, at least one alignment layer and a liquid crystal layer (not shown). An example display backplane may include integrated electronics and/or photonics and color conversion components. A device may include any suitable display, such as an amplitude modulation displays (e.g., with a conventional liquid crystal display panel) or a phase modulation display (e.g., a coherent holographic display).

An example device (e.g., including an integrated display backplane) may be fabricated using standard lithography-based nano-manufacturing process for both electronic IC, photonic IC, color conversion, and display backplane components, and is scalable to wafer or panel level manufacturing. An example device may include integration of an interface layer, an electronic IC layer, a photonic IC layer and color conversion modules to provide a more compact form factor, less weight, and reduced system complexity.

In some examples, a device may include a photonic integrated circuit for only one color (e.g., blue, UV, or other pump light color), which provides design simplification (e.g., relative to three different color photonic ICs) and allows relatively high performance.

In some examples, a device may not require high-precision post-fabrication alignment between a PIC-BLU and the active pixel interface layer. An example device may not require high-precision alignment between the bottom of the device (e.g., having LC pixel opening windows) and the top substrate of the LC device (e.g., with black matrix opening). The distance between the photonic IC layer and the light-modulating layer may be greatly reduced, improving the total performance (including reduced optical crosstalk between neighboring pixels, improved light efficiency, and emission cone control) of the display panel. Example devices allow displays with higher PPI (pixel resolution).

Locating an electronic IC layer beneath a photonic IC layer greatly improves the fill factor of the active pixel matrix (e.g., only limited by the metallic vias), similar to the case of LCOS panels. In this context, below may refer to the arrangement shown in FIG. 1 where the photonic IC layer is located between the electronic IC layer and the LC interface layer.

An example device may be integrated with on-chip laser sources to provide a stand-alone display module. Alternatively, a device may be configured to receive laser radiation from at least one external laser source. In some examples, a device may be integrated with further silicon IC modules, for example, for more power-efficient data processing and transfer.

An example device may include three layers that may be fabricated in sequence using standard lithographic manufacturing process. An LC interface layer may include an anti-reflection coating, pixelated conducting pads for liquid crystal cells, a black matrix layer, or other components. A photonic IC layer may include single-layer or multi-layer light-guiding waveguides and out-coupling components, anti-reflection layers, or other components. Color conversion modules may be configured to convert the laser light (e.g., UV or blue laser light) into any light color of interest at the subpixel level. For example, color conversion modules may convert UV laser light into red, green, or blue light at appropriate pixels or subpixels. Color conversion modules may convert blue laser light into red or green light at appropriate pixels or subpixels.

An example electronic IC layer may include electronic bus lines for power distribution, control lines, data lines and integrated electronic circuitry for active LC cell control.

The functional layers may be arranged from top to bottom. Vertical metallic vias or other electrical connections may be used to electrically connect the electronic IC layer and the active pixel interface layer.

Figure 2:
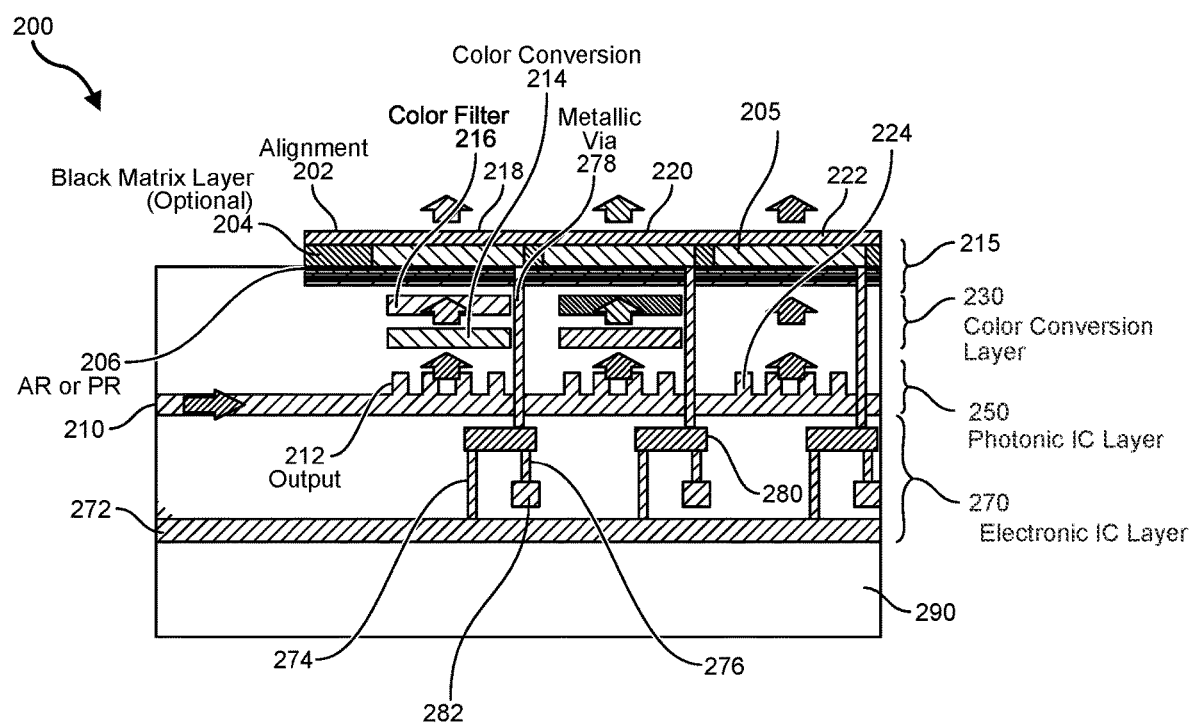
FIG. 2 shows an example device including an integrated display backplane architecture, according to some examples.

FIG. 2 illustrates an example device 200 including an integrated display backplane architecture. Example devices include display backplanes, display modules, and AR/VR devices. The device 200 includes an alignment layer 202 (e.g., for a liquid crystal layer, with the upper substrate not shown), an optional black matrix layer 204 (e.g., configured to block light leakage between pixels), transparent electrode 205 (e.g., a transparent conductive oxide electrode such as an indium tin oxide electrode) an antireflection (AR) and/or photoresist (PR) layer 206, a waveguide 210, a grating 212 (e.g., an outcoupler or output for light from the waveguide 210), a color conversion module 214, color filter 216 (e.g., as part of a color filter layer), where light is emitted through light emission surface (e.g., provided by alignment layer 202) into, for example, a liquid crystal layer (not shown, but located adjacent the alignment layer 202). An example outcoupler may be configured to direct a portion of light within a waveguide towards the display (e.g., towards a color conversion module).

The device 200 may be considered as an assembly of a plurality of layers, including an LC interface layer 215, a color conversion layer 230, a photonic IC layer 250, an electronic IC layer 270, and a substrate 290. The color conversion layer may receive light outcoupled from the waveguide 210 by a grating such as grating 212. Outcoupled light is directed upwards (as illustrated in FIG. 2), denoted by arrows. The electronic IC layer 270 may include electrode 272 and further electrical connections such as metallic vias (e.g., metallic vias 274, 276, and 278). Circuit components such as electronic component 280 may be electrically interconnected to the electrode 272, orthogonal electrode 282, photonic IC layer 250, and/or the LC interface layer 215.

In some examples, the waveguide 210 may convey essentially monochromatic light. For example, the waveguide 210 may convey blue light, and blue light may emerge from a blue light emissive region 222 without passing through a color conversion layer. In some examples, green light may emerge from green light emissive region 220 and red light emissive region 218 after passing through respective color conversion and color filter regions (e.g., color filter 216 and color conversion module 214).

An example LC interface layer may include an optical coating, for example, providing an anti-reflection layer for single-pass operation of LC cells or partial reflection for resonance-based LC cell operation. An example active pixel interface layer may include pixelated electrodes that may provide individual electric control signal (voltage) to each LC pixel cell. An example active pixel interface layer may include an alignment layer, for example, including a microstructured surface that may be lithographically fabricated, or based on materials that may be spun on top of the device.

Materials and fabrication process of the LC interface layer may be selected to be compatible with the fabrication of the photonic and electronic IC layers (e.g., maximum processing temperature, material compatibility, and the like).

Figure 3A:
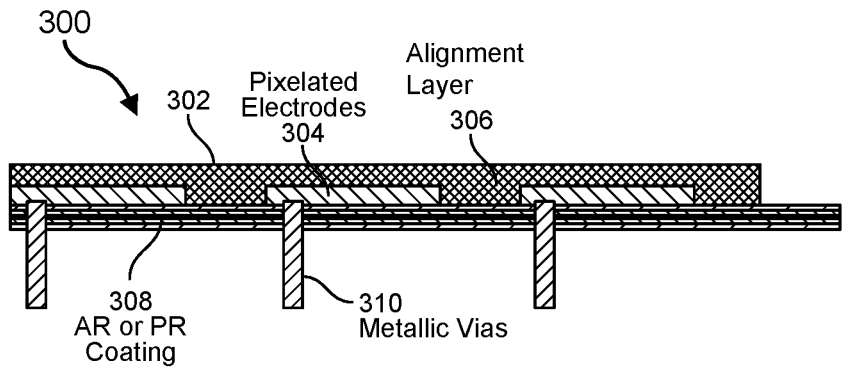
FIGS. 3A-3C show example LC interface layers, according to some examples.
Figure 3B:
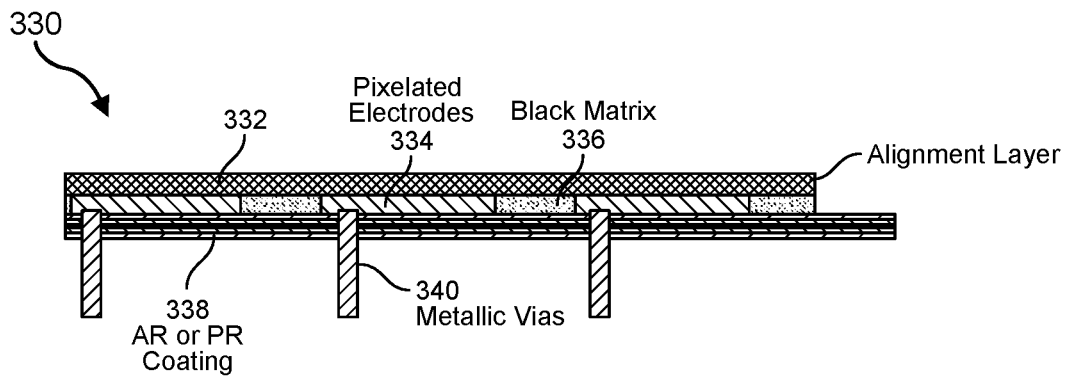
Figure 3C:
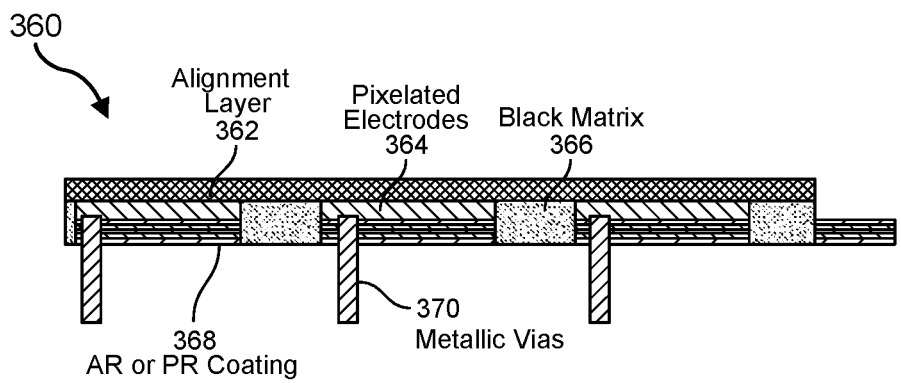

FIGS. 3A-3C show possible configurations of example LC interface layers. A black matrix structure may be located through various vertical positions through the interface layer and the photonic IC layer.

FIG. 3A shows an example LC interface layer 300 including a light emissive surface 302, electrodes 304 (e.g., pixelated or stripe electrodes), alignment layer 306, coating 308 (e.g., antireflection coating, partially reflective coating or reflective coating) and metallic vias 310. In some examples, the coating 308 may be located on the opposite side of the electrodes 304 from a liquid crystal layer (not shown). The coating 308 is optional and may be omitted. Metallic vias may be used to electrically connect the pixelated electrodes to an electrical control circuit such as a display driver. Light may be emitted through the light emissive surface 302 (e.g., into a liquid crystal layer), and different regions may emit different colors of light to form a multi-color pixelated liquid crystal display.

A liquid crystal layer (not shown) may be adjacent the alignment layer 306, and the liquid crystal layer may be located between the LC interface layer and a second substrate supporting a second alignment layer and orthogonal stripe electrodes proximate the liquid crystal layer.

FIG. 3B shows a further example LC interface layer 330 including a light emissive surface 332 (e.g., provided by an alignment layer), electrodes 334 (e.g., pixelated or stripe electrodes), a black matrix layer 336, optional coating 338 (e.g., antireflection coating or a photoresist coating) and metallic vias 340. The black matrix layer 336 may be configured to reduce light emission from between the electrodes (e.g., through inter-pixel gaps). For example, the black matrix layer 336 may be located between the electrodes 334.

FIG. 3C shows a further example LC interface layer 360 including a light emissive surface 362 (e.g., provided by an alignment layer), electrodes 364 (e.g., pixelated or stripe electrodes), a black matrix layer 366, optional coating 368 (e.g., antireflection coating or a photoresist coating) and metallic vias 370. The black matrix layer 336 may be configured to reduce light emission from between the electrodes (e.g., through inter-pixel gaps). For example, the black matrix layer 336 may be located between the electrodes 334 and further between separated portions of the optional coating 368.

In some examples, a photonic IC layer may include a single layer or multiple layers of photonic integrated circuits embedded in a substrate or other support material. An example photonic IC layer may include one or more of any of the following; waveguides, splitters, active light modulating components, and out-coupling components.

Out-coupling components may include waveguide grating couplers, ring resonators, side-coupled scatterers, etc. Example gratings may include multi-material-layers, multi-etch-depth, straight or slanted gratings, or any combination. An example photonic IC layer may include a dielectric or metallic high reflection (HR) layer located beneath the photonic IC to improve the out-coupling efficiency. In this example, the term "beneath" may refer to the other side of the photonic IC to the display.

In some examples, active photonic IC (APIC) components may include one or more of any of; an amplitude modulator, phase modulator, polarization modulator, any other modulator, couplers, other optical or electrooptical components, etc. APIC components may be driven by electronic circuitry built in the electronic IC layer and connected, for example, with vertical metallic vias or other electrical connections.

The materials and fabrication processes related to the photonic IC layer may be selected to be compatible with the fabrication of the electronic IC layers (e.g., selected based on processing temperature, material compatibility, etc.).

Example light distribution modules may be static (for power splitting), or may be dynamic and/or reconfigurable (for zonal illumination).

An example light distribution module may include one or more of any of the following: isolators, waveguides, beamsplitters and cascaded trees of any combination, additional modulators or redistributors, and/or an additional phase modulator. Example isolators may be located between each light source and the rest of the light distribution module to block reflected light from entering the light sources. Waveguides may include rectangular, rib, ridge, or any lithographically defined and fabricated waveguides; direct laser written waveguides; ion-diffusion and/or ion implanted waveguides; and/or holographically defined and developed waveguides. Beam splitters and cascaded trees of any combination may include: fiber-based beam splitters; on-chip star couplers or evanescent star couplers; multi-mode interferometer (MMI) couplers, Y-splitters or other directional couplers; and/or resonator based (e.g. photonic crystal) couplers. Additional amplitude modulator or redistributors may include a Mach-Zehnder interferometer (MZI); microring devices; tunable-absorption waveguides; photonic crystal (PhC) cavities; and/or mechanically movable components (e.g., using MEMS devices, actuators, electrostatic distortion, piezoelectric, or flexoelectric devices). An additional phase modulator may be used, for example, to scramble the relative phase of laser light out of each row.

Figure 4A:
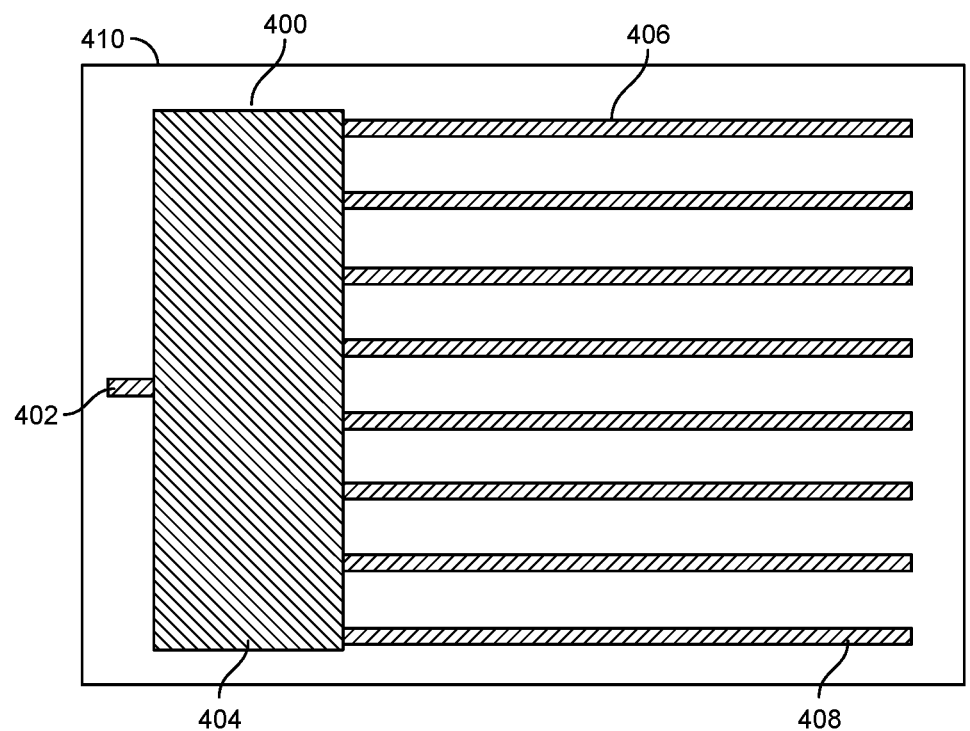
FIGS. 4A and 4B show example photonic IC layers, according to some examples.
Figure 4B:
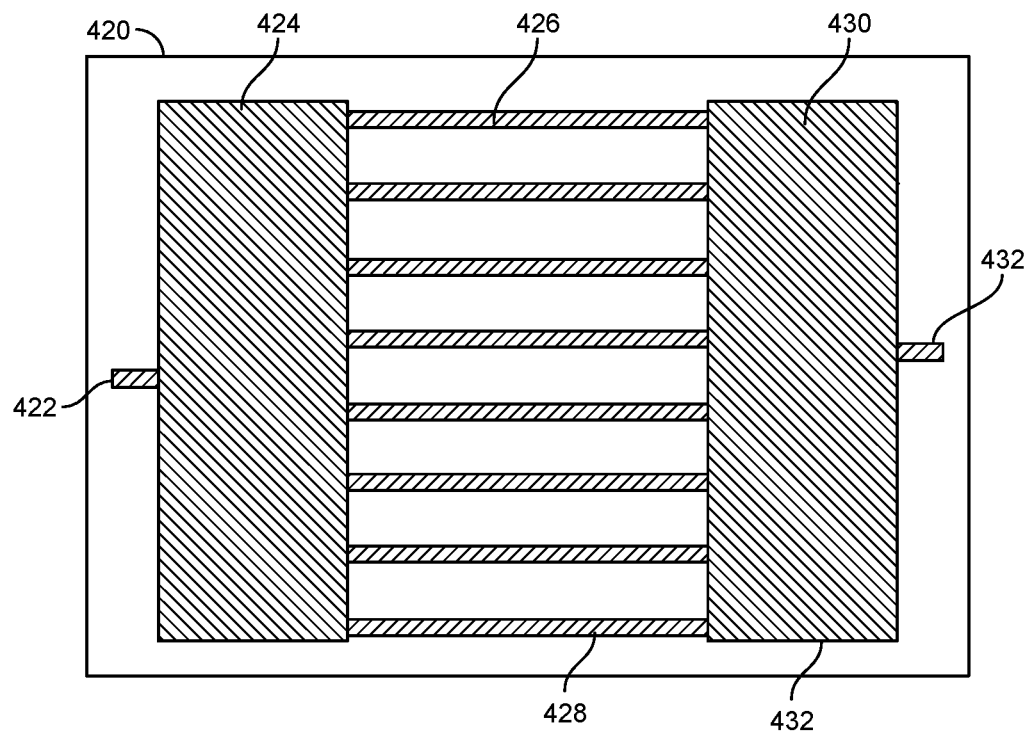

FIGS. 4A and 4B show example photonic IC layers such as photonic IC layers including one or more waveguides such as those discussed above. Light may be launched into the one or more waveguide from one side or both sides of a light distribution module. In some examples, a device may include a plurality of row waveguides.

FIG. 4A shows an example photonic IC layer 400 including a light receiving port 402 (e.g., a light input waveguide), a light distribution module 404, and an arrangement of waveguides such as waveguides 406 and 408. In this example, the waveguides may be arranged into rows, and the waveguides may be generally parallel. In this example, light input into the light receiving port 402 is distributed between the waveguides by the light distribution module 404. Light is input into only one end (a single end) for each of the waveguides.

FIG. 4B shows a further example photonic IC layer 420 including first and second light receiving port 422 and 432 (e.g., light input waveguide), first light distribution module 424, second light distribution module 430, and an arrangement of waveguides such as waveguide 426 and waveguide 428. Light input into the light receiving ports (e.g., port 422 and port 432) is distributed between the waveguides by first light distribution module 424 and second light distribution module 430, respectively. In this example, the waveguides may be arranged into rows, and the waveguides may be generally parallel. Light may be input into either or both ends for each of the waveguides.

Figure 5A:
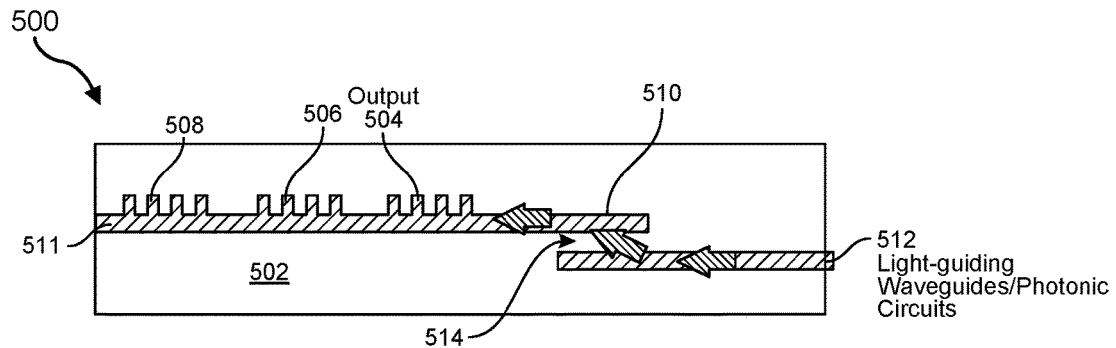
FIGS. 5A-5C show a portion of a photonic IC layer, according to some examples.
Figure 5B:
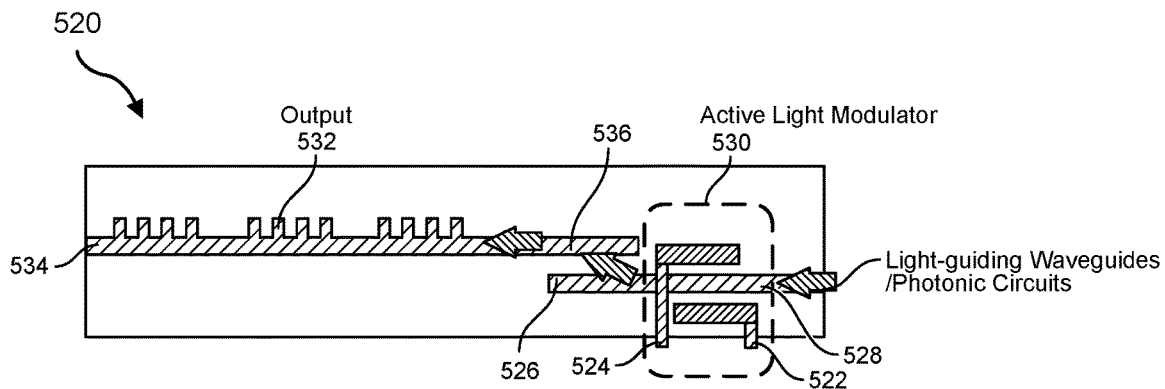
Figure 5C:
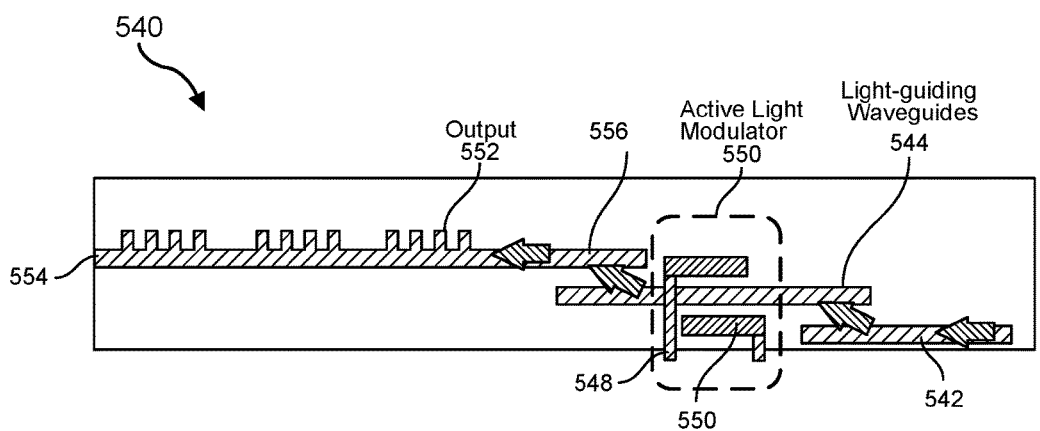

FIGS. 5A-5C show further possible configurations of portions of example photonic IC layers.

FIG. 5A illustrates a portion of a photonic IC layer 500 including a first waveguide segment 510 (including light-outcoupling structures such as light outputs 504, 506 and 508) and a second waveguide segment 516. Evanescent coupling through gap 514 may be used to couple light between first waveguide segment 510 and second waveguide segment 516. In some examples, light may be input through optional light input port 511.

FIG. 5B shows a further example configuration of a device 520 including an active light modulator. The device 520 includes a light-receiving waveguide segment 528 and an active light modulator 530. The active light modulator 530 may include electrodes such as electrodes 522 and 524 configured to apply an adjustable electric field across, for example, an electrooptical material. The active light modulator 530 may be used to vary relative and/or absolute light intensities for particular waveguides and/or backlight zones, for example, to achieve local dimming within a backlight. Evanescent coupling may be used to couple light between light-receiving waveguide segment 528 and waveguide segment 536. In some examples, light may be input through optional light input port 534.

FIG. 5C shows a further example configuration of a portion of a device 540 having a photonic IC layer including an active light modulator 550. In some examples, a portion of a photonic IC layer may include active light modulator 550 that may include electrodes (e.g., electrodes 546 and 548) configured to apply an electric field across a portion of the waveguide segment 544. The portion of the waveguide segment 544 may include an electrooptical material or may otherwise provide an electrically controllable transmission of light passing through waveguide segment 544. Waveguide segment 544 may be evanescently coupled to waveguide segment 542 and waveguide segment 556. The waveguide segment 556 may include light outcoupling structures such as light output 552. In some examples, light may be input through optional light input port 534.

FIGS. 6A and 6B show that grating or scattering structure based outcouplers may be located either above or beneath the waveguides. Outcoupler elements may include elements etched into, supported on, or located proximate a waveguide. FIGS. 6A and 6B show various example outcoupler elements formed within a waveguide element. A waveguide element may include one or more of each type of outcoupler element, and may include only one type (e.g., a grating).

FIG. 6A shows a portion of a device 600 including a low index layer 602 (which may also be referred to as a low refractive index layer), high index layer 604 (which may also be referred to as a high refractive index layer), a second low index layer 606 and a substrate 608. A waveguide may be formed by the high index layer 604 (e.g., a light transmissive layer) with adjacent low index cladding layers (e.g., low index layer 602 and second low index layer 606). Without further modification, light may propagate along the high index layer and be effectively confined within the high index layer by surrounding cladding layers. A light outcoupling structure may be formed by outcoupler elements formed in, adjacent to or proximate the high index layer 604.

FIG. 6A shows a variety of example outcoupling structures formed in or adjacent to the high index layer 604. The device 600 may include rectangular grating 610 (which may also be referred to as a straight grating), slanted grating 612, scatterers 614 formed adjacent the high index layer 604, meta-grating scatterers 616 (e.g., including a metamaterial), and a grating or other diffractive optical element 618 (e.g., a holographic optical element, volume Bragg grating, or polarization volume hologram). In some examples, one or more additional layers may be located between the second low index layer 606 and the substrate 608, such as a dielectric anti-reflection coating (620), a dielectric and metallic anti-reflection coating (622), or a metallic anti-reflection coating (624). The one or more additional layers may include a multilayer structure, such as a dielectric multilayer or a dielectric layer/metal layer multilayer structure. In some examples, a reflective layer may be located between the second low index layer 606 and the substrate 608, such as a metal coating or dielectric multilayer.

FIG. 6B shows a further variety of example outcoupling structures within device portion 650. The device portion 650 may include low index layer 652, high index layer 654, second low index layer 656, and substrate 658. The device 600 may include structures located within the low index layer 652 (e.g., an upper cladding layer between the high index layer 654 and the upper surface as illustrated). Example outcoupling structures may include rectangular grating elements 660 (which may also be referred to as a straight grating), slanted grating elements 662, resonant structures 664 formed within the low index layer 652, meta-grating scatterers 666 (e.g., including a metamaterial), and a grating or other diffractive optical element 668 (e.g., a holographic optical element, volume Bragg grating, or polarization volume hologram). In some examples, one or more additional layers may be located between the second low index layer 606 and the substrate 608, such as a dielectric anti-reflection coating (670), a dielectric and metallic anti-reflection coating (672), or a metallic anti-reflection coating (674). The one or more additional layers may include a multilayer structure, such as a dielectric multilayer or a dielectric layer/metal layer multilayer structure. In some examples, a reflective layer may be located between the second low index layer 606 and the substrate 608, such as a metal coating or dielectric multilayer.

An example out-coupling structure (which may be referred to as an out-coupler) may out-couple light propagating in a waveguide into an out-of-plane direction, for example, to illuminate a display. An example outcoupler may include one or more of any of the following: a grating coupler, an arrangement of scatterers, an antireflection coating, other grating structures, or an holographic optical element (HOE). An example grating coupler may have a 1D, 2D or 3D grating profile, and the grating coupler may be etched directly into the waveguide or may be separate from but proximate to the waveguide. For example, there may be evanescent optical coupling between the waveguide and the grating coupler. An arrangement (e.g., an array) of scatterers may include non-resonant and/or resonant structures) and may be fabricated proximate the waveguide layer(s). Scatterers may include meta-grating scatterers, for example including a multilayer and/or resonant scatterers. An antireflective (AR) coating may be formed on the other side of the waveguide to increase the coupling efficiency and reduce unwanted light leakage and loss. An example AR coating may include one or more stacked layers of dielectric, metallic or semiconductor materials. Grating structures may include a volumetric Bragg grating. A holographic optical element (HOE) may include any suitable optical element, such as a liquid-crystal based polarization volume hologram.

Example outcouplers may include straight or oblique grating elements, which may be formed on, in, or proximate to but separated from a waveguide. An example AR coating may be formed on the opposite side of the grating from the outcouplers. In some examples, different outcouplers may be formed at different locations within the BLU. For example, oblique gratings may be formed near an edge portion of the BLU.

Figure 7A:
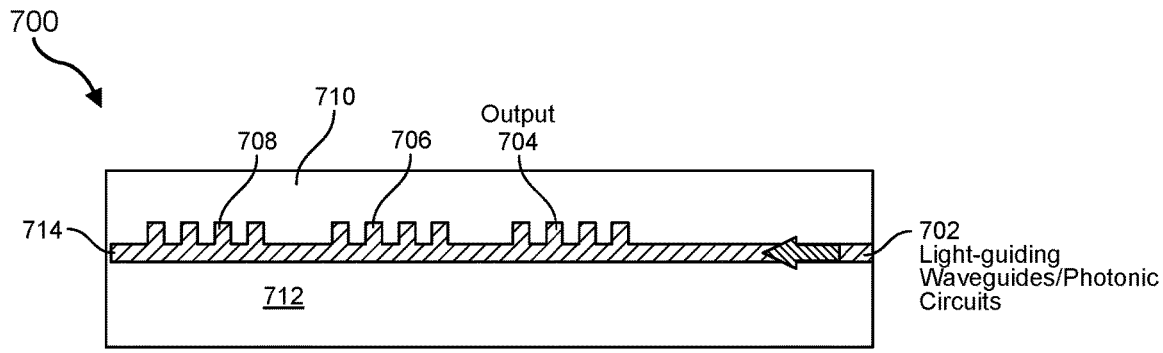
FIGS. 7A-7C show portions of photonic IC layer, according to some examples.
Figure 7B:
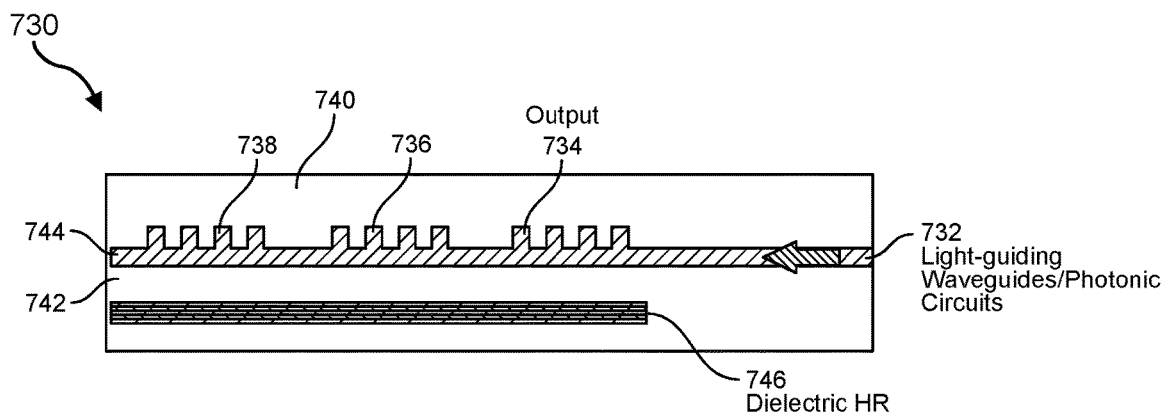
Figure 7C:
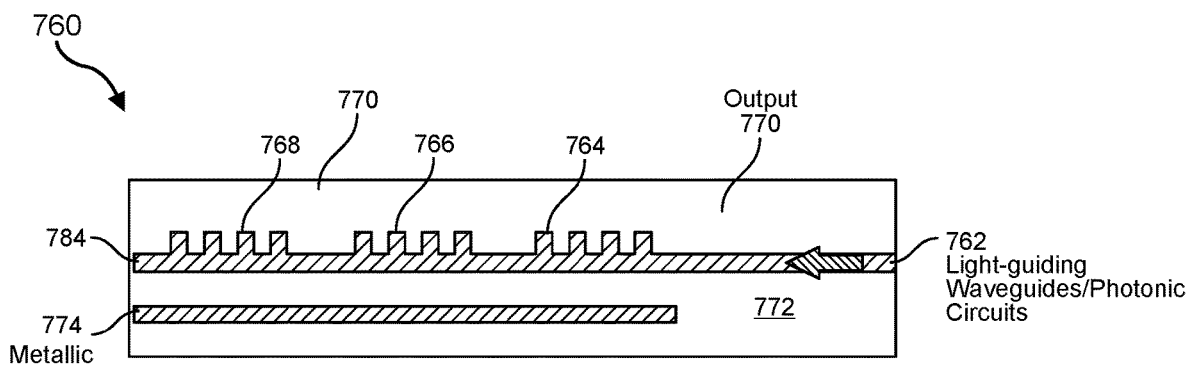

FIGS. 7A-7C show further possible configurations of an example photonic IC layer. In some examples, a reflector or metallic coating may be located on the opposite side of the waveguide from the outcoupler elements.

FIG. 7A shows a further example portion of photonic IC layer 700. Light (e.g., from a laser or other light source) is received at waveguide input 702 and is transmitted along waveguide 714. Three outcoupling structures (704, 706, and 708) are used to output light from the waveguide along a direction orthogonal to the extension direction of the waveguide 714. The light may propagate upwards (as shown) through region 710 that may include color conversion and/or display interface layers (not shown in detail). In some examples, light may be output having red, green (or yellow) or blue colors respectively. Layer 712 may include a substrate.

FIG. 7B shows a further example portion of photonic IC layer 730. Light (e.g., from a laser or other light source) is received at waveguide input 732 and is transmitted along waveguide 744. Three outcoupling structures (734, 736, and 738) are used to output light from the waveguide along a direction orthogonal to the extension direction of the waveguide 744. The light may propagate upwards (as shown) through region 740 that may include color conversion and/or display interface layers (not shown in detail). In some examples, light may be output having red, green (or yellow) or blue colors respectively. Layer 742 may include further layers, such as a dielectric high reflectivity layer 746 and a substrate. The dielectric high reflectivity layer 746 may have a reflectivity of greater than 90% for one or more wavelengths, such as the wavelength of the pump and/or converted light.

FIG. 7C shows a further example portion of photonic IC layer 760. Light (e.g., from a laser or other light source) is received at waveguide input 762 and is transmitted along waveguide 784. Three outcoupling structures (764, 766, and 768) are used to output light from the waveguide along a direction orthogonal to the extension direction of the waveguide 784. The light may propagate upwards (as shown) through light output region 770 that may include color conversion and/or display interface layers (not shown in detail). In some examples, light may be output having red, green (or yellow) or blue colors respectively. Layer 772 may include further layers, such as a metal high reflectivity layer 774 and a substrate. A metal high reflectivity layer 774 may have a reflectivity of greater than 90% for one or more wavelengths, such as the wavelength of the pump and/or converted light.

FIGS. 8A-8D show example device configurations that may be used in connection with display pixels, including a photonic IC layer, light outcouplers, and color conversion layers. Laser light (or other light) may leave the photonic IC (e.g., exit a waveguide) through one or more outcouplers. The laser light may then pass through a color converter and through a pixel of the display. The color conversion may be performed at the pixel or sub-pixel level, so only one color of light (e.g., blue or UV) may be handled by the photonic IC and outcoupled to the color conversion modules. In some examples, an optical cavity is configured so that outcoupled light makes multiple passes through a color conversion layer. The optical cavity may be defined by a pair of spaced-apart reflectors, as described in more detail below.

Figure 8A:
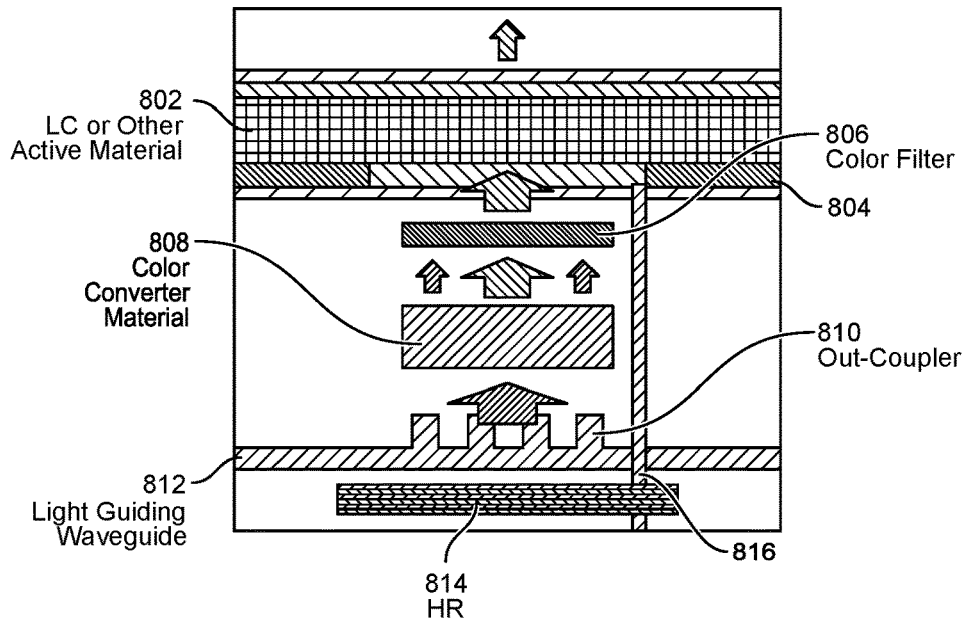
FIGS. 8A-8D show further device configurations, according to some examples.

FIG. 8A shows a portion of a device 800 including a liquid crystal layer 802, a light emissive surface 803, a black matrix material 804, a color filter 806, a color conversion layer 808, an outcoupling structure 810 and waveguide 812. This arrangement may be described as a single-pass configuration as light outcoupled from the waveguide 812 makes a single pass through the color conversion layer 808. The device 800 may further include a high reflectivity layer 814 and electrodes (e.g., metallic via 816).

Figure 8B:
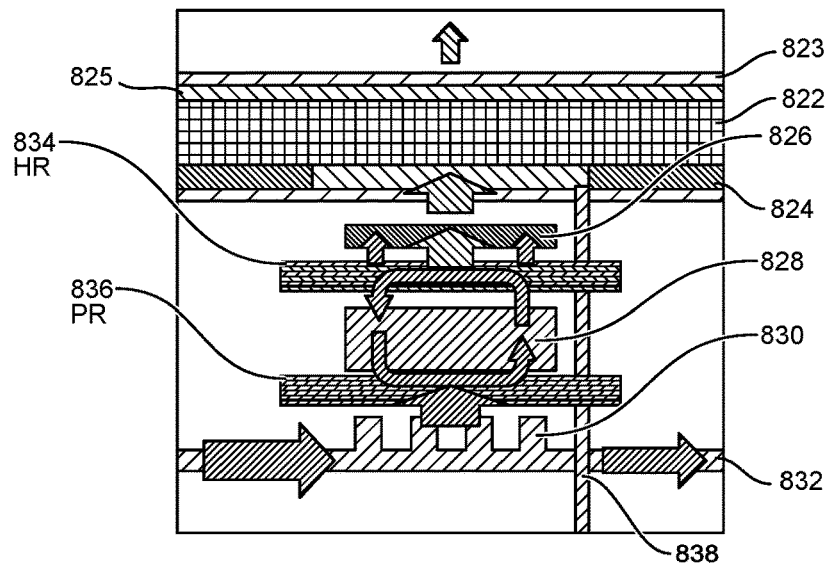

FIG. 8B shows a portion of a device 820 including a liquid crystal layer 822, a light emissive surface 823, an electrode layer 824 including electrodes and a black matrix material, a second electrode 825, a color filter 826, a color conversion layer 828, an outcoupling structure 830 and waveguide 832. This arrangement may function as a pump-light configuration as light outcoupled from the waveguide 832 may pump an optical cavity formed using a pair of spaced-apart reflectors, namely reflectors 834 and 836. For example, reflectors may include high reflectivity mirrors and/or partial reflectivity mirrors. The light outcoupled from the waveguide 832 may make multiple passes through the color conversion layer 828, in some examples generating light of a different color. This is represented schematically by the circulating arrows through the color conversion layer 828, though light may be reflected back and forth through the cavity. The device 820 may further include electrodes (such as metallic via 838) that may electrically connect a control circuit (not shown) to display electrodes.

Figure 8C:
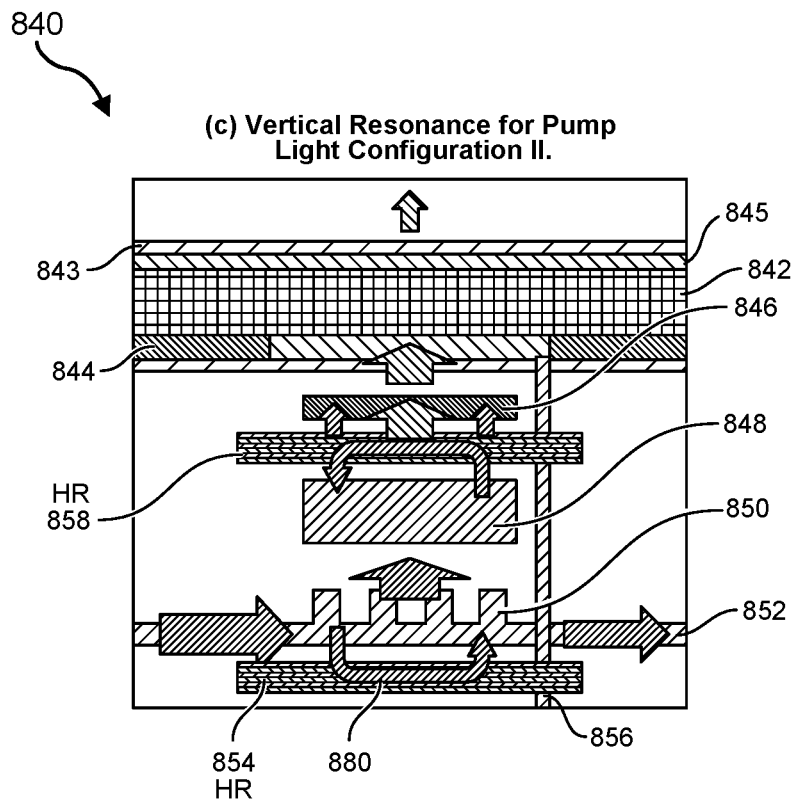

FIG. 8C shows a portion of a device 840 including a liquid crystal layer 842, a light emissive surface 843, a black matrix material 844, electrode 845, a color filter 846, a color conversion layer 848, an outcoupling structure 850 and waveguide 852. This arrangement may function as a pump-light configuration as light outcoupled from the waveguide 852 may pump an optical cavity formed using reflector 854 and reflector 858. For example, reflectors may include high reflectivity mirrors and/or partial reflectivity mirrors. An optical cavity may be defined by the pair of spaced-apart reflectors. The light outcoupled from the waveguide 852 may make multiple passes through the color conversion layer 848, in some examples generating light of a different color. This is represented schematically by the circulating arrows (e.g., arrow 888) through the color conversion layer 848, though light may be reflected back and forth through the cavity. The device 840 may further include electrodes such as metallic via 856. In this configuration, the waveguide 852 and outcoupling structure 850 may extend through the cavity formed by reflector 854 and reflector 858.

Figure 8D:
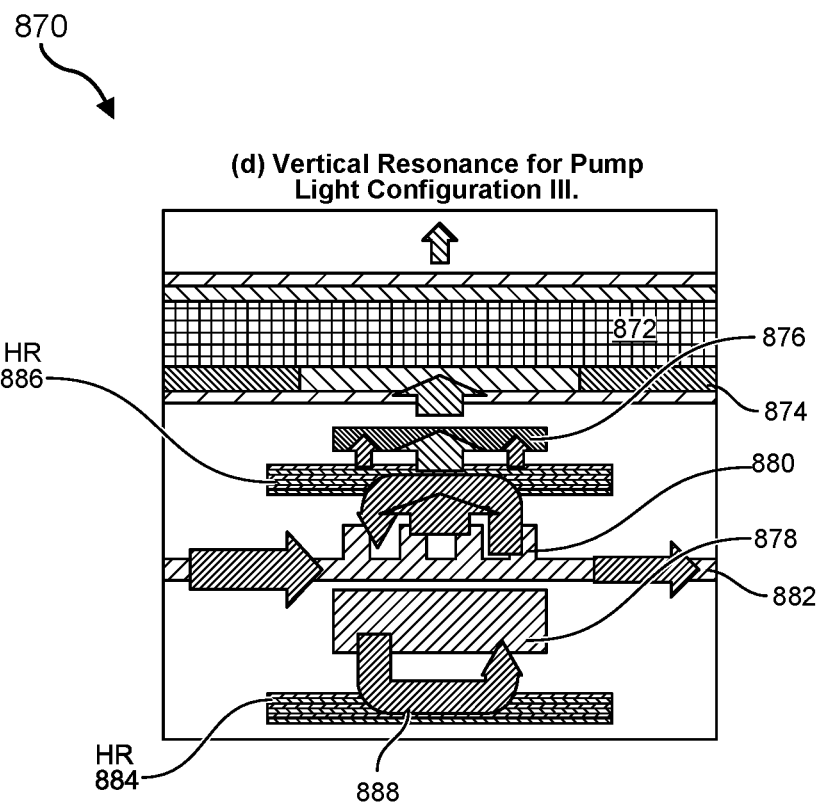

FIG. 8D shows a portion of a device 870 including a liquid crystal layer 872, a black matrix material 874, a color filter 876, a color conversion layer 878, an outcoupling structure 880 and waveguide 882. This arrangement may function as a pump-light configuration as light outcoupled from the waveguide 882 may pump an optical cavity formed using reflector 854 and reflector 858. For example, each reflectors may include a high reflectivity mirror and/or partial reflectivity mirror. The light outcoupled from the waveguide 882 may make multiple passes through the color conversion layer 878, in some examples generating light of a different color. This is represented schematically by the circulating arrows through the color conversion layer 878, though light may be reflected back and forth through the cavity. The device 870 may further include electrodes such as metallic via 856. In this configuration, the waveguide 852 and outcoupling structure 850 may extend through the cavity formed by reflectors 884 and 886. The color conversion layer 878 may be located on the opposite side of the waveguide 882 than the liquid crystal layer 872.

Figure 9A:
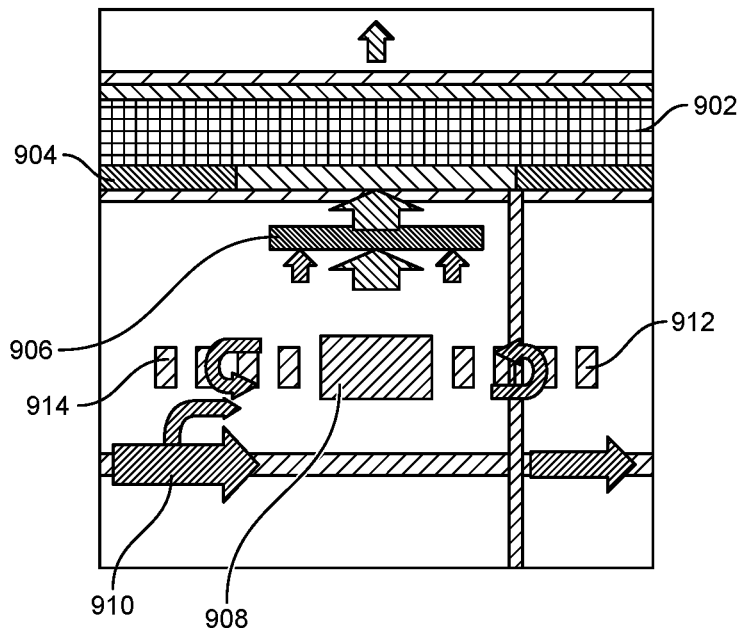
FIGS. 9A-9C show further device configurations, according to some examples.
Figure 9B:
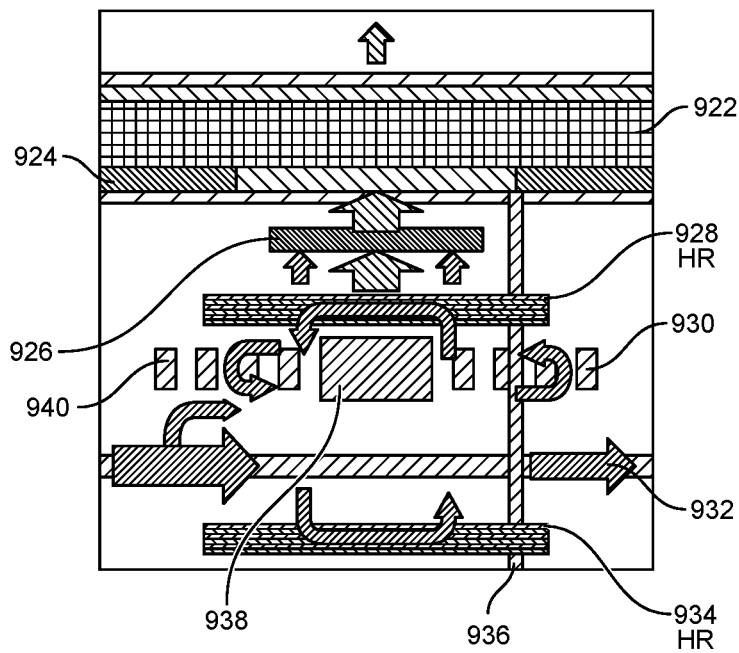
Figure 9C:
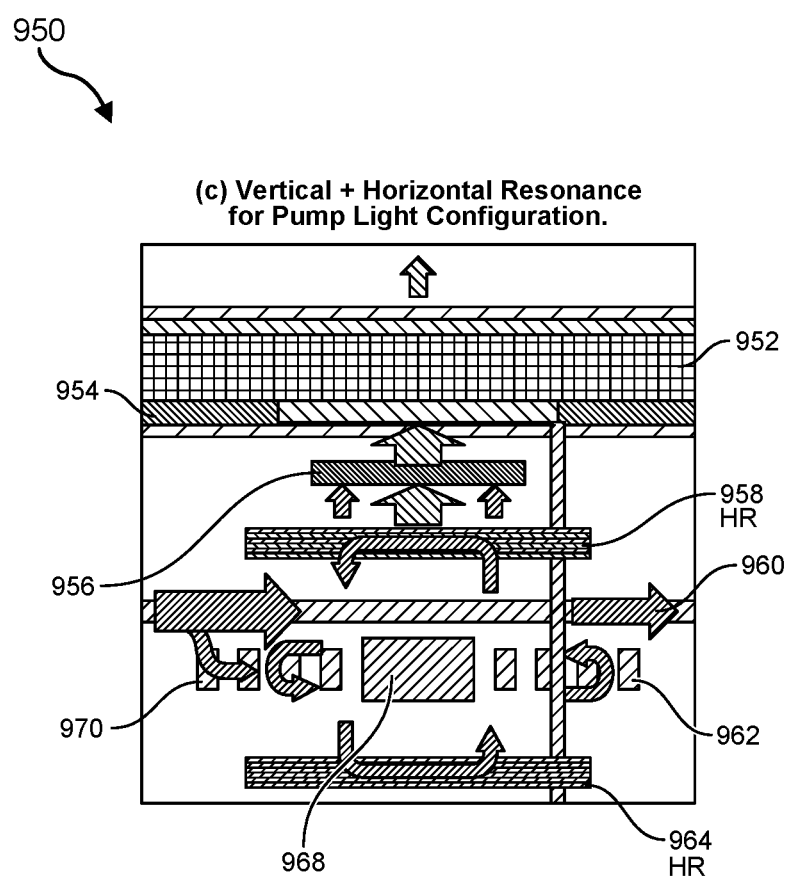

FIGS. 9A-9C show example device configurations that may be used in connection with display pixels, including a photonic IC layer, light outcouplers, and color conversion layers.

FIG. 9A shows a portion of a device 900 including a liquid crystal layer 902, a black matrix material 904, a color filter 906, a color conversion layer 908, an outcoupling structure including outcoupler elements 912 and 914, and waveguide 910. This arrangement may function as a horizontal pump-light configuration as light outcoupled from the waveguide 910 may pump an optical cavity formed using outcoupler elements 912 and 914. For example, outcoupler elements 912 and 914 may include periodic structures configured to have a high reflectivity for the optical cavity pump light outcoupled from the waveguide 910. The pump light may make multiple passes through the color conversion layer 908, in some examples generating light of a different color. This is represented schematically by the circulating arrows through the outcoupler elements 912 and 914, though light may be reflected linearly back and forth through the cavity.

FIG. 9B shows a portion of a device 920 including a liquid crystal layer 922, a black matrix material 924, a color filter 926, a color conversion layer 938, an outcoupling structure including outcoupler elements 912 and 914, and waveguide 910. This arrangement may function as a horizontal pump-light configuration as light outcoupled from the waveguide 910 may pump an optical cavity formed using outcoupler elements 930 and 940. For example, outcoupler elements 930 and 940 may include periodic structures configured to have a high reflectivity for the optical cavity pump light outcoupled from the waveguide 932. The pump light may make multiple passes through the color conversion layer 938 in both horizontal and vertical directions (as illustrated), in some examples generating light of a different color. A first (horizontal) optical cavity may be formed between the outcoupler elements 930 and 940, and a second (vertical) optical cavity may be formed between reflectors 928 and 934. The efficiency of color conversion may be increased by orthogonally directed pump light outcoupled from the waveguide 932. The device may further include electrodes such as metal via 936.

FIG. 9C shows a portion of a device 950 including a liquid crystal layer 952, a black matrix material 954, a color filter 956, a color conversion layer 968, an outcoupling structure including outcoupler elements 962 and 970, and waveguide 960. This arrangement may function as both a horizontal and vertical pump-light configuration as light outcoupled from the waveguide 960 may pump an optical cavity formed using outcoupler elements 962 and 970. For example, outcoupler elements 962 and 970 may include periodic structures configured to have a high reflectivity for the optical cavity pump light outcoupled from the waveguide 932. The pump light may make multiple passes through the color conversion layer 938 in both horizontal and vertical directions (as illustrated), in some examples generating light of a different color. A first (horizontal) optical cavity may be formed between the outcoupler elements 962 and 970, and a second (vertical) optical cavity may be formed between reflector 958 and reflector 964. The efficiency of color conversion may be increased by orthogonally directed pump light outcoupled from the waveguide 932. The device may further include electrodes such as metal via 936. In some examples, one or more of the reflector 964, the reflector 958, and/or outcoupler elements 962 and 970 may be located on the opposite side of the waveguide 960 than the liquid crystal layer 952.

Figure 10A:
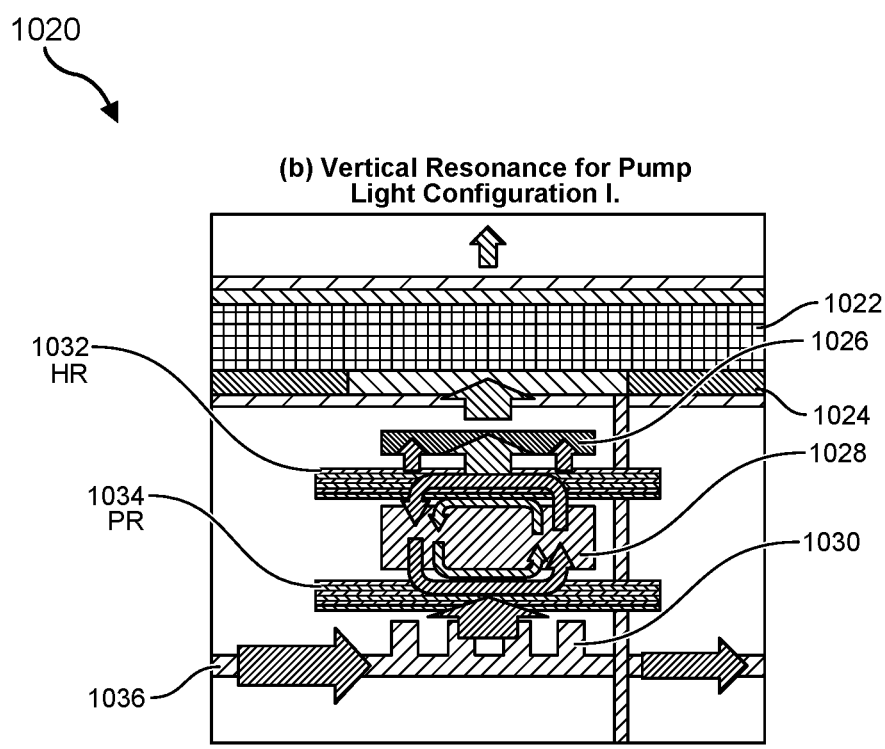
FIGS. 10A-10C show devices having a pump light configuration, according to some examples.
Figure 10B:
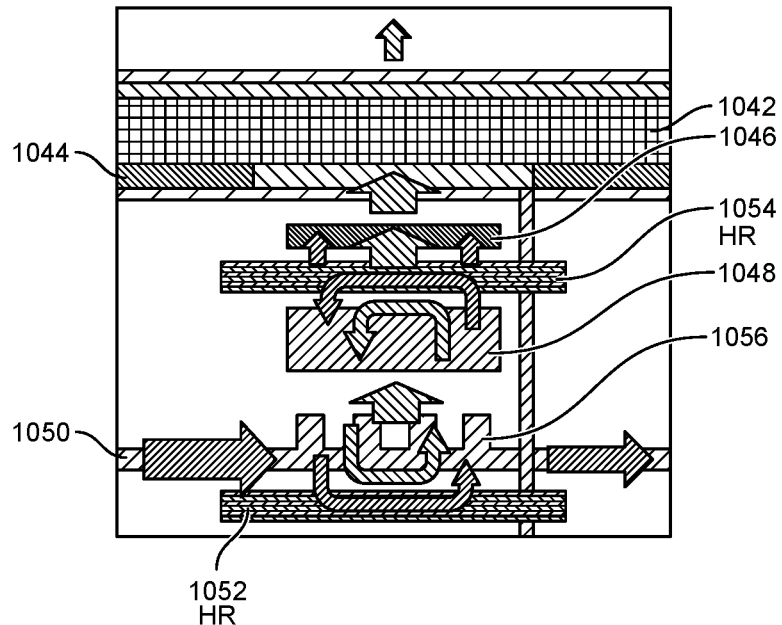
Figure 10C:
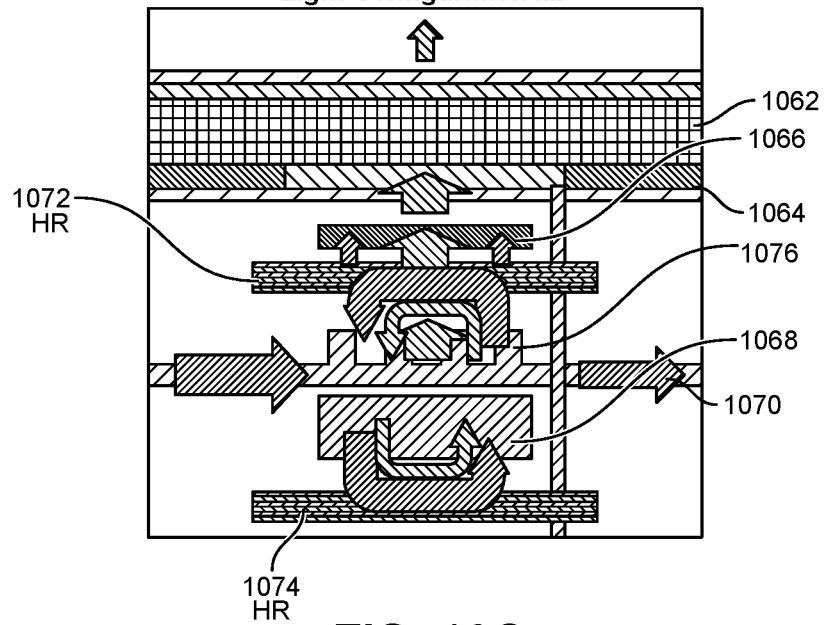

FIGS. 10A-10C show further example configurations for an example pixel, including the photonic IC connection, outcouplers, and color conversion modules.

FIG. 10A shows a configuration similar to that discussed above in relation to FIG. 8B. FIG. 10A shows a portion of a device 1020 including a liquid crystal layer 1022, a black matrix material 1024, a color filter 1026, a color conversion layer 1028, an outcoupling structure 1030 and waveguide 1036. This arrangement may function as a pump-light configuration as light outcoupled from the waveguide 1036 may pump an optical cavity formed using reflectors 1032 and 1034. For example, reflectors may include high reflectivity mirrors and/or partial reflectivity mirrors. In this example, light outcoupled from the waveguide 1036 may make multiple passes through the color conversion layer 1028. The light produced by the color conversion layer may also circulate within the cavity. The reflectors 1032 and 1034 may have high reflectivity (HR) or partial reflectivity (PR) for the pump light (e.g., blue light) and/or the light produced by the color conversion layer (e.g., red light, yellow light, or green light). This is represented schematically by the nested circulating arrows through the color conversion layer 1028, though both light colors may be reflected back and forth in a generally linear fashion through the cavity. The device 1020 may further include electrodes such as metallic vias.

FIG. 10B shows a configuration similar to that discussed above in relation to FIG. 8C. The figure shows a portion of a device 1040 including a liquid crystal layer 1042, a black matrix material 1044, a color filter 1046, a color conversion layer 1048, an outcoupling structure 1056 and waveguide 1050. This arrangement may function as a pump-light configuration as light outcoupled from the waveguide 1050 may pump an optical cavity formed using reflectors 1052 and 1054. For example, reflectors may include high reflectivity mirrors and/or partial reflectivity mirrors. Both the pump light outcoupled from the waveguide 1050 and the different color light produced by the color conversion layer 1048 may make multiple passes through the color conversion layer 1048. In some examples, a blue pump light may generate red, yellow, or green light from the color conversion layer. The multiple passes of both pump and generated color light is represented schematically by the nested circulating arrows through the color conversion layer 1048, though both wavelengths of light may be reflected back and forth through the cavity in a linear fashion. The device 1040 may further include electrodes such as metallic vias. In this configuration, the waveguide 1050 and outcoupling structure 1056 may extend through the cavity formed by reflectors 1052 and 1054.

FIG. 10C shows a portion of a device 1060 similar to that described above in relation to FIG. 8D. The device 1060 including a liquid crystal layer 1062, a black matrix material 1064, a color filter 1066, a color conversion layer 1068, an outcoupling structure 1076 and waveguide 1070. This arrangement may function as a pump-light configuration as light outcoupled from the waveguide 1070 may pump an optical cavity formed using reflectors 1072 and 1074. For example, reflectors may include high reflectivity mirrors and/or partial reflectivity mirrors. Both the pump light outcoupled from the waveguide 1070 and the different color light generated by the color conversion layer may make multiple passes through the color conversion layer 1068. This is represented schematically by the nested circulating arrows through the color conversion layer 1068, though light may be reflected back and forth through the cavity in a linear fashion. The device 1060 may further include electrodes such as metallic via 856. In this configuration, the waveguide 1070 and outcoupling structure 1076 may extend through the cavity formed by reflectors 1072 and 1074. The color conversion layer 1068 may be located on the opposite side of the waveguide 1070 than the liquid crystal layer 1062.

Figure 11A:
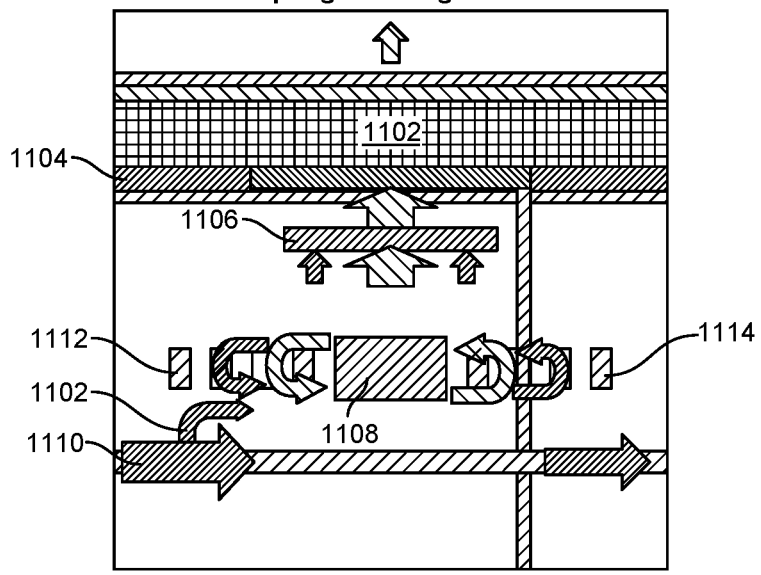
FIG. 11A-11C show further example devices, according to some examples.

FIG. 11A shows a portion of a device 1100 that is similar to that discussed above in relation to FIG. 9A. The device 1100 including a liquid crystal layer 1102, a black matrix material 1104, a color filter 1106, a color conversion layer 1108, an outcoupling structure including outcoupler elements 1112 and 1114, and waveguide 1110. This arrangement may function as a horizontal pump-light configuration as light outcoupled from the waveguide 1110 may pump an optical cavity formed using outcoupler elements 1112 and 1114. For example, outcoupler elements 1112 and 1114 may include periodic structures configured to have a high reflectivity for the optical cavity pump light outcoupled from the waveguide 1110. In this example, both pump light and the different color light provide by the color conversion layer 1108 may make multiple passes through the color conversion layer 1108. This is represented schematically by the nested circulating arrows through the outcoupler elements 1112 and 1114, though light for both wavelengths may be reflected linearly back and forth through the cavity formed by outcoupler elements 1112 and 1114.

Figure 11B:
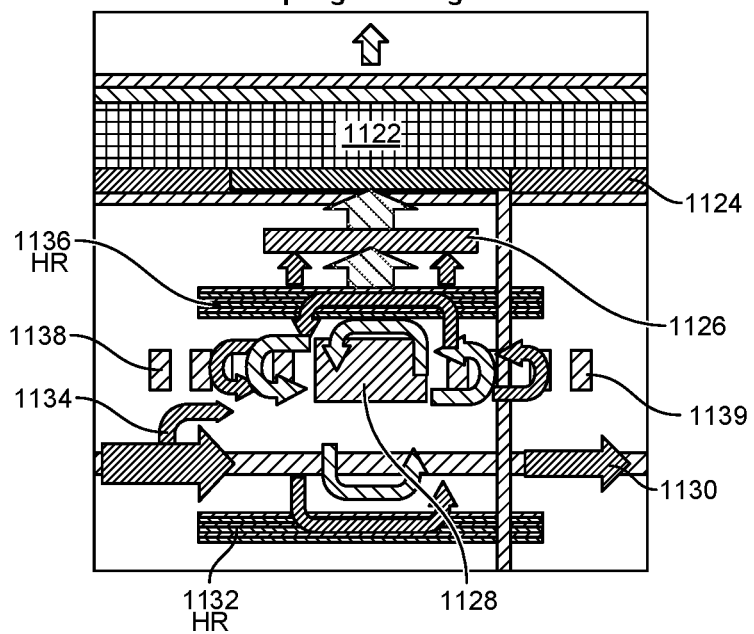

FIG. 11B shows a portion of a device that is similar to that discussed above in relation to FIG. 9B. FIG. 11B shows device 1120 including a liquid crystal layer 1122, a black matrix material 1124, a color filter 1126, a color conversion layer 1128, an outcoupling structure including outcoupler elements 1138 and 1139, and waveguide 1130. This arrangement may function as a horizontal pump-light configuration as light outcoupled from the waveguide 1130 may pump an optical cavity formed using outcoupler elements 1138 and 1139. For example, outcoupler elements 1138 and 1139 may include periodic structures configured to have a high reflectivity for both the optical cavity pump light outcoupled from the waveguide 1130 and for the different color light provided by the color conversion layer 1128. Both the pump light and the different color light provided by the color conversion layer 1128 may make multiple passes through the color conversion layer 1128 in both horizontal and vertical directions (as illustrated), as schematically represented by the nested circulating arrows. A first (horizontal) optical cavity may be formed between the outcoupler elements 1138 and 1139, and a second (vertical) optical cavity may be formed between reflectors 1132 and 1136. The efficiency of color conversion may be increased multiple passes of orthogonally directed pump light and light generated by the color conversion layer 1128. The device may further include electrodes such as metal vias.

Figure 11C:
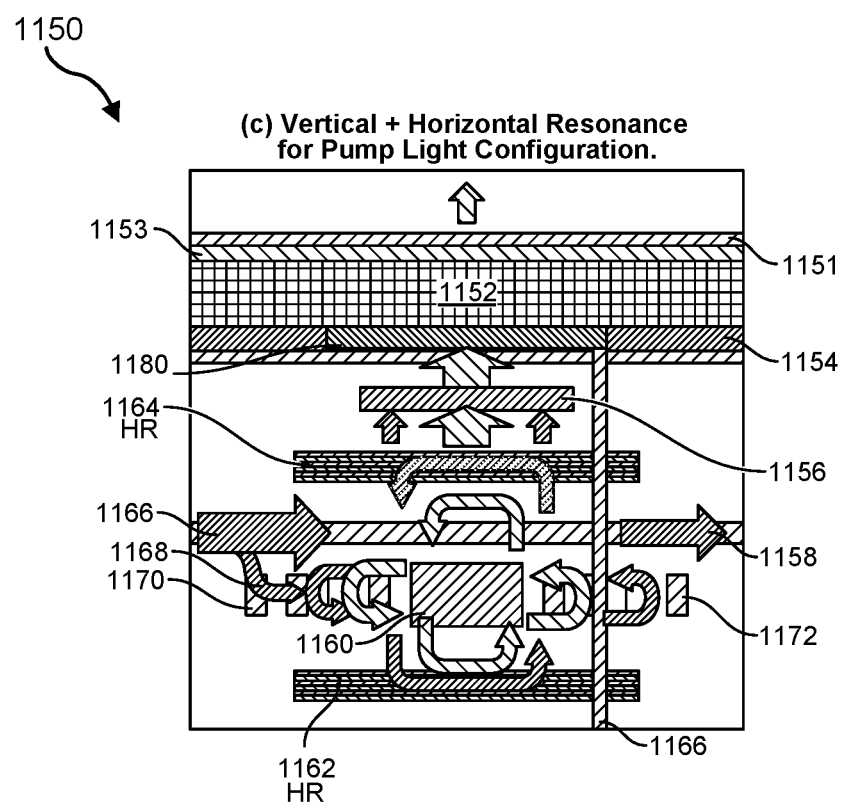

FIG. 11C shows a portion of a device 1150 that is similar to that discussed above in relation to FIG. 9C. FIG. 11C shows a portion of a device 1150 including a liquid crystal layer 1152, a black matrix material 1154, a color filter 1156, a color conversion layer 1160, an outcoupling structure including outcoupler elements 1170 and 1172, and waveguide 1158. The different sized arrows along the waveguide 1158 (e.g., arrow 1166) schematically represent conveyance of light along waveguide 1158 and a decrease in waveguide light intensity due to outcoupling of light from the waveguide 1158. This arrangement may function as both a horizontal and vertical pump-light configuration as light outcoupled from the waveguide 1158 may pump an optical cavity formed using outcoupler elements 1170 and 1172. For example, outcoupler elements 1170 and 1172 may include periodic structures configured to have a high reflectivity for both the optical cavity pump light (outcoupled from the waveguide 1158). Both the pump light and different colored light generated by the color conversion layer 1160 may make multiple passes through the color conversion layer 1160 in both horizontal and vertical directions, as illustrated by the nested circulating arrows. A first (horizontal) optical cavity may be formed between the outcoupler elements 1170 and 1172, and a second (vertical) optical cavity may be formed between reflector 1162 and reflector 1164. The efficiency of color conversion may be increased by orthogonally directed pump light outcoupled from the waveguide 1158. The device may further include electrodes such as metal via 1166, which may electrically connect electronic components with a transparent electrode through which light may exit. In some examples, one or more of the reflector 1162, color conversion layer 1160, and/or outcoupler elements 1170 and 1172 may be located on the opposite side of the waveguide 1158 than the liquid crystal layer 1152. The liquid crystal layer 1152 may be sandwiched between transparent substrates that may support alignment layers and, for example, orthogonal stripe electrodes (e.g., electrodes 1151 and 1180). An alignment layer 1153 may be located between the electrode 1151 and the liquid crystal layer 1152.

An example electronic IC layer may be fabricated using CMOS (e.g., PMOS/NMOS) technology based on silicon wafers (similar to LCoS technology), or using TFT technology (e.g., using α-Si, LTPS, organic-TFT, oxide-TFT, LTPS+oxide-TFT, etc.) on a transparent substrates. Processes may be adapted from those used to fabricate active matrix liquid crystal display panels.

An example electronic IC layer may include the circuitry for each active pixel to drive LC, and may be connected to the top interface layer through metallic vias or other electrical connections. Metallic vias may extend vertically upwards (e.g., normal to the plane of the display panel) and through the photonic IC layer, but may be spatially distant from light-guiding waveguides and may not interfere with the operation of the photonic IC layer.

An example electronic IC layer may include circuitry for active photonic components in the photonic IC layer, which may be connected through vertical metallic vias or other electrical connections. An example electronic IC layer may include other circuitry to process the data for display to improve the power consumption and data processing and transfer speed. An example electronic IC layer may include power, data and other electronic bus lines.

FIGS. 12A-12D show possible configurations of example devices including electronic IC layers.

Figure 12A:
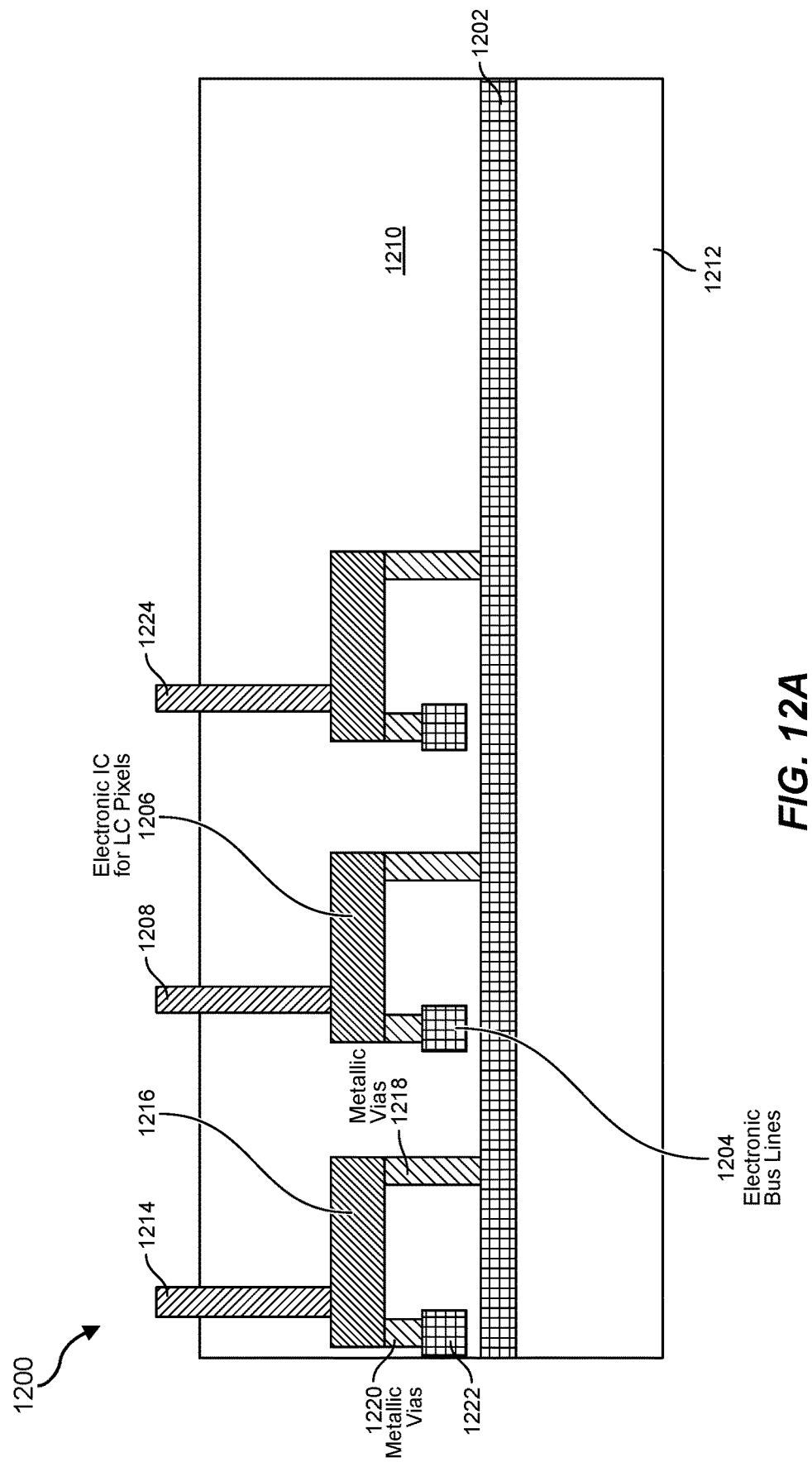
FIGS. 12A-12D show an electronic IC layer configurations, according to some examples.

FIG. 12A shows a device 1200 including an electronic IC layer for control of, for example, liquid crystal display pixels. Device 1200 includes electrodes such as electrodes or electrical vias 1208, 1214, 1220 and 1224, electronic devices (e.g., silicon-based devices such as active matrix pixel control components) such as devices 1206 and 1216, electronic bus line 1202, and orthogonal electronic bus lines such as lines 1204 and 1222. The electronic IC layer may be formed on a substrate 1212. Other layers, such as photonic IC layers (not shown in detail) may be supported within layer 1210.

Figure 12B:
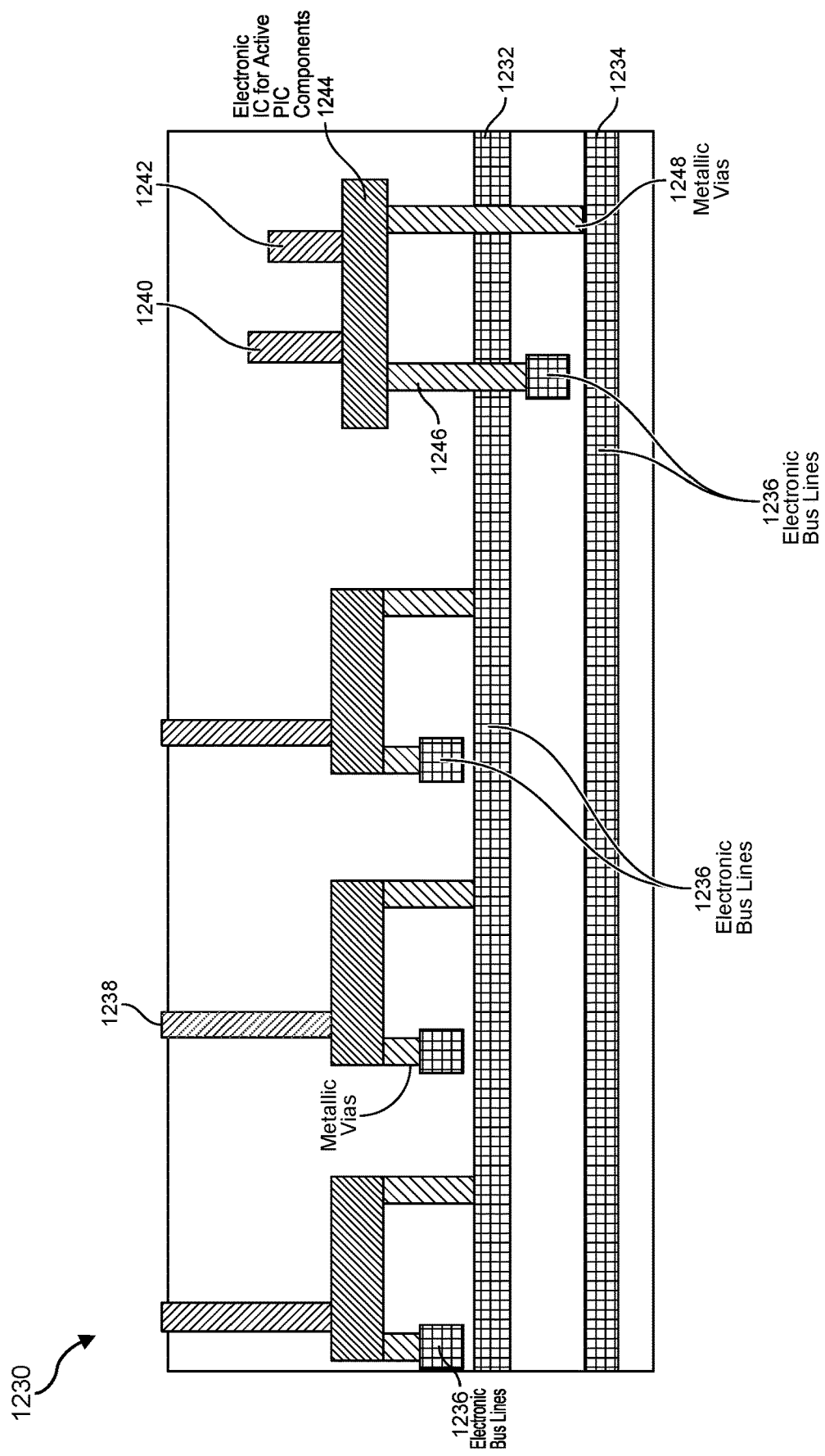

FIG. 12B shows an electronic IC layer configuration for control of, for example, active photonic IC components which may be used to control local dimming within backlight zones. FIG. 12B shows a device 1230 including an electronic IC layer. Device 1230 includes electrodes such as electrodes or electrical vias 1238, 1240, 1242 and 1248, electronic devices such as an electronic IC 1244 to control active PIC components, electronic bus lines such as bus lines 1232 and 1234, and orthogonal electronic bus lines such as lines 1236 and 1222.

Figure 12C:
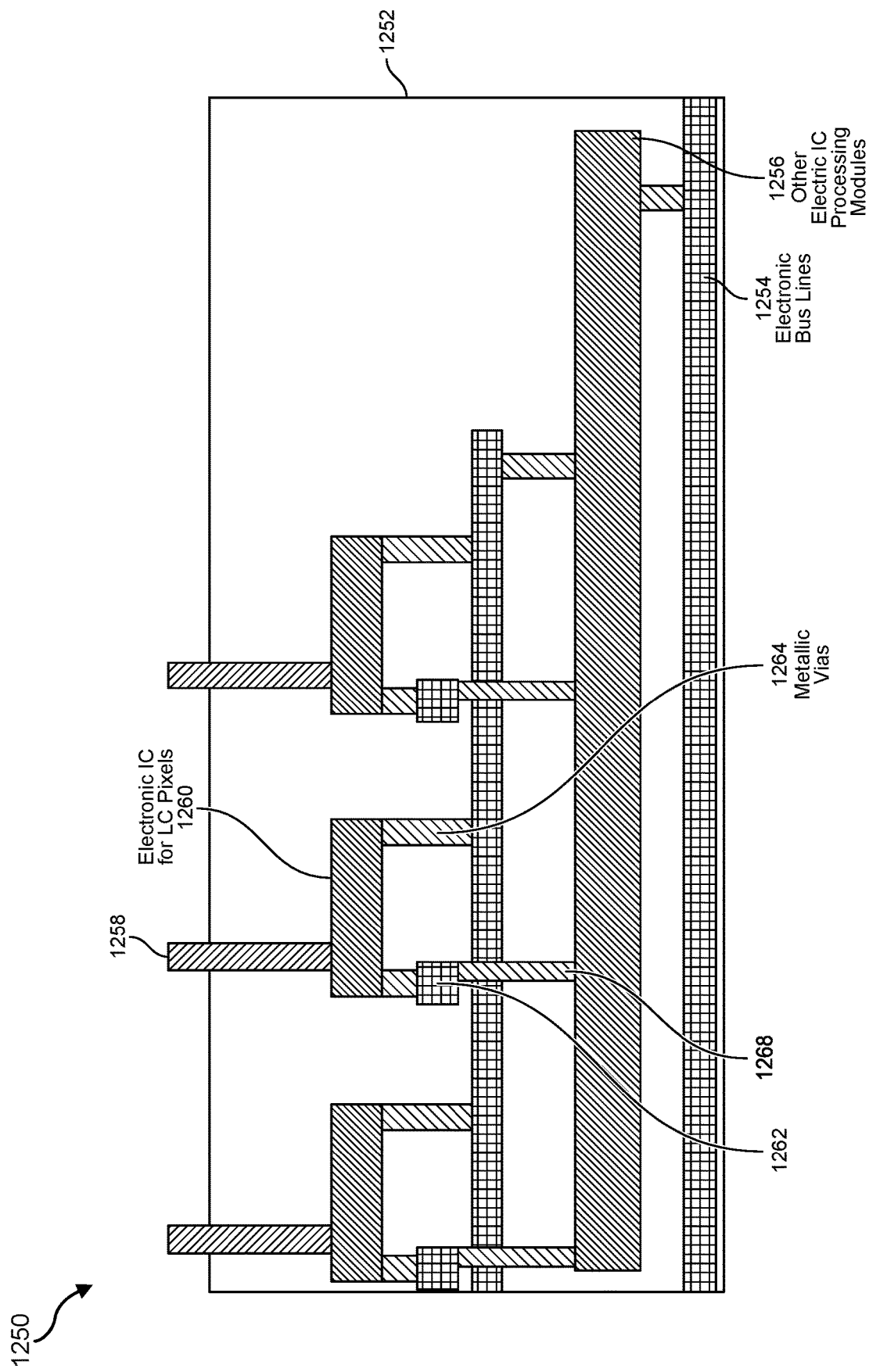

FIG. 12C shows a device 1250 including a further example electronic IC layer configuration. Device 1250 includes electrodes such as electrodes or electrical vias 1264 and 1268, electronic devices such as an electronic device 1260 (e.g., to control active matrix display components), electronic bus lines such as 1254, other processing modules 1256, and orthogonal electronic bus lines such as lines 1262.

Figure 12D:
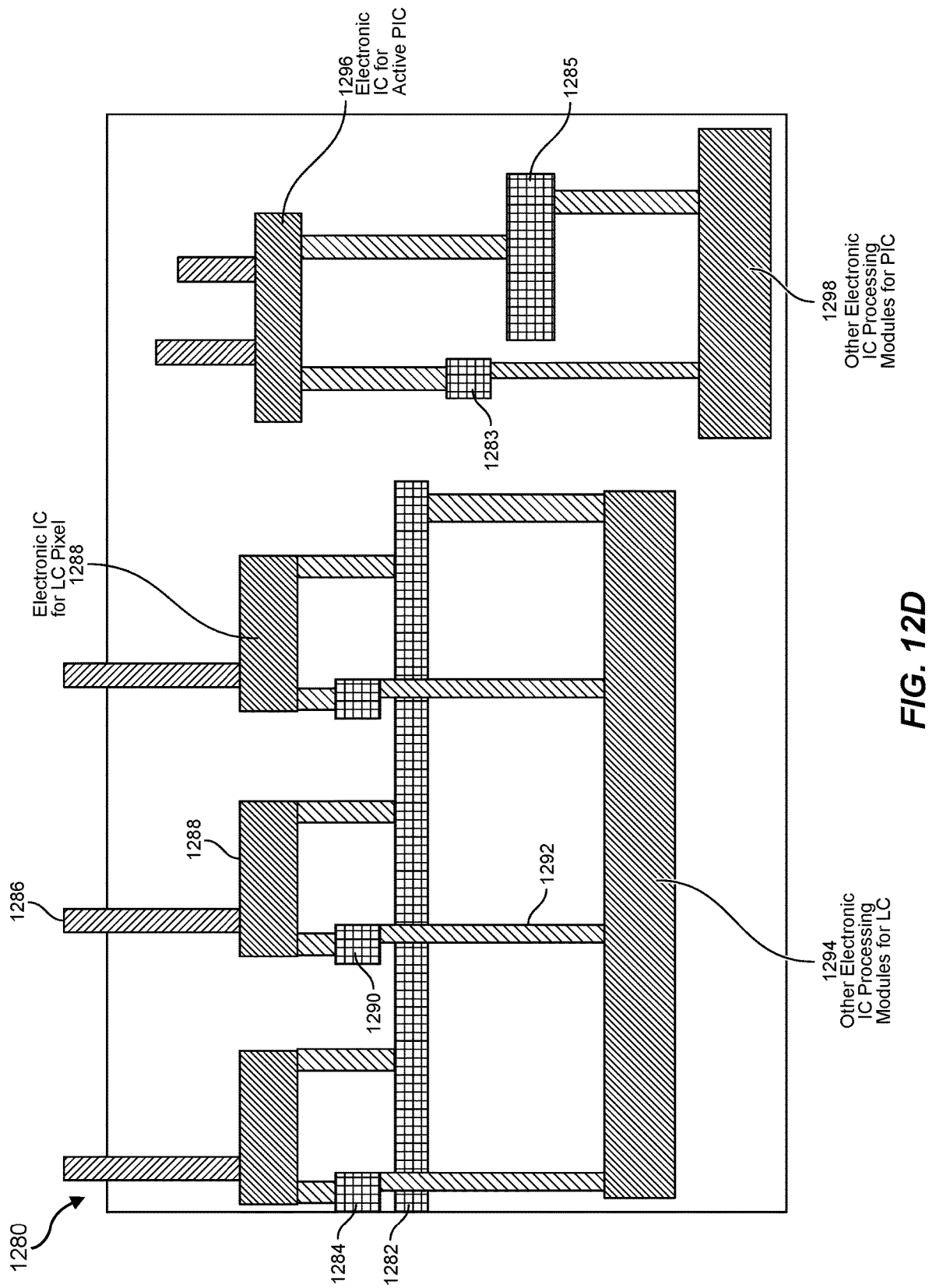

FIG. 12D shows a device 1280 including a further example electronic IC layer configuration. Device 1280 includes electrodes such as electrodes or electrical vias 1292, electronic devices such as an electronic device 1288 (e.g., to control active matrix display components) or integrated circuit 1294, electronic bus lines such as bus line 1282, and orthogonal electronic bus lines such as bus line 1290. A second electronic IC layer may be provided for active control of a peripheral interface controller (PIC), for example, at 1296. The second electronic IC layer may include other electronic IC processors (1298), other components (e.g., component 1285) and other electrodes, bus lines, and vias such as orthogonal bus line 1283.

In some examples, augmented reality and/or virtual reality (AR/VR) devices may include a display configured to provide virtual or augmented reality elements. In augmented reality (AR), the AR image elements may be combined with light from an external environment. Examples may include a display backlight that may include at least one laser and an active photonic integrated circuit (APIC) to illuminate various backlight zones of the display. For examples, laser radiation may be distributed using waveguides and light outcoupler elements may be located near the center of each zone (e.g., the center of a pixel or a group of pixels). Light intensity within each zone may be controlled using active optical components. Laser radiation may include UV or blue light, and color conversion elements may be used to obtain any other desired colors. Color conversion elements may include fluorescent materials and may be arranged within sub-pixels. Color conversion elements may optionally include an optical resonator and include additional focusing elements. Examples further include a backlight unit (BLU) including an integrated laser and color conversion elements. The backlight may provide adjustable illumination of one or more backlight zones.

In some examples, one or more lasers may be used as a light source for a backlight unit for a display. Laser light provides high brightness, high directionality, and may allow large color gamut (e.g., using a color conversion). However, the delivery of laser light to the display panels is a challenging problem. Current AR waveguides exhibit severe nonuniformity, which is device and pupil position dependent. A display backlight with dynamic zonal brightness control would be very useful for display performance and reduced power operation.

BLUs including miniLEDs may use diffusers to help create uniform illumination, but these introduce additional losses, weight, and thickness to the module. Light guides may couple light (either lasers or LEDs) from the side, but may have problems in uniformity, light cone angle control, and polarization maintenance. AR waveguide based delivery may be challenging in terms of uniformity and issues of interference between overlapping part. Photonic IC (IC) based delivery systems may also suffer uniformity challenges, angular cone challenges, cross-talk and speckle challenges. Current architectures may not support zonal illumination, which is useful for improved contrast ratio and power efficiency.

In some examples, an active photonics integrated circuit (APIC) based laser back light unit may provide one or more of the following: color-separated sources for individual sub-pixels; high pixel density; high efficiency; and/or zonal dimming functionalities. An example BLU backplane, BLU, or device including a BLU may include a source light, a dynamic light distribution module, at least one outcoupling module, at least one beam spot generation module, at least one color-conversion module, and optionally one or more color filters. A module configuration may be designed for a specific application, such as an AR/VR device or other display application. The module design may provide high performance and relatively straightforward manufacturability.

Improved uniformity is highly desirable for LED-based backlights and generally requires use of a diffuser. The described example backlights using laser radiation allow the diffuser to be omitted, saving weight and providing improved performance. In some examples, a narrowband filter may be included at each RGB sub-pixel to remove any stray light of unwanted color and to reduce crosstalk. In some examples, an optical isolator may be used to prevent stray light being reflected or scattered back into the light source.

Technical advantages may include an efficient laser backlight unit having local (zonal) dimming functionalities. A device may include only one laser source and a simple integrated light routing and control network. Local dimming and energy redistribution may be achieved using an active light distribution module. Only one out-coupler design (e.g., with high out-coupling efficiency) may be used per local zone per color. A redundant design may be tolerant of individual light channel failure. In some examples, light may be focused into the finite opening of display panels for improved light efficiency. Light color conversion may be provided at the sub-pixel level for better light efficiency. In some examples discussed further below, a device may not require alignment at the pixel level between the outcoupling module and a beam spot generation module.

Figure 13:
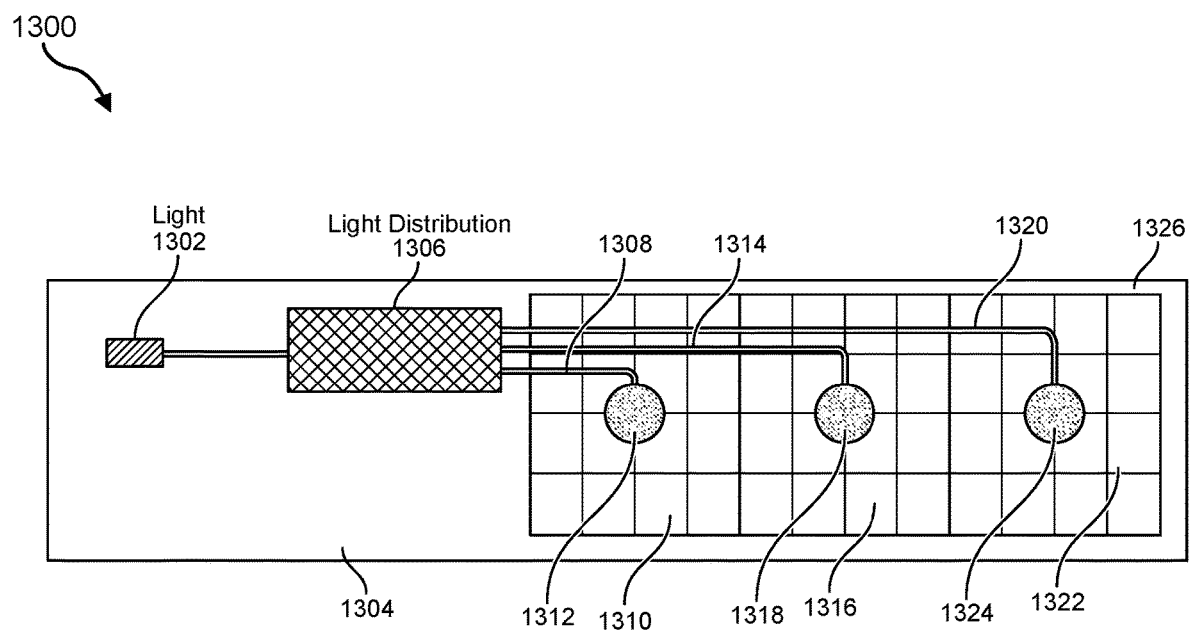
FIG. 13 shows a device with light outcoupling into different backlight zones, according to some examples.

FIG. 13 shows an example configuration of a device 1300 including a light source 1302, a light distribution module 1306 configured to distribute light from the light source 1302 into waveguides 1308, 1314 and 1320, and light outcoupling from the waveguide using outcoupler elements 1312, 1318, and 1324 into different backlight zones 1310, 1316 and 1322. For illustrative simplicity, only three backlight zones are shown, though this is not limiting. The outcoupler elements may be located at or near the center of each backlight zone. The periphery of each backlight zones (e.g., backlight zone periphery 1326) may be square, rectangular, or any desired form. Components may be located on a common substrate 1304. In some examples, the light source may be remotely located from the backlight unit and light conveyed using a further waveguide (e.g., an optical fiber) or by free space distribution.

Figure 14:
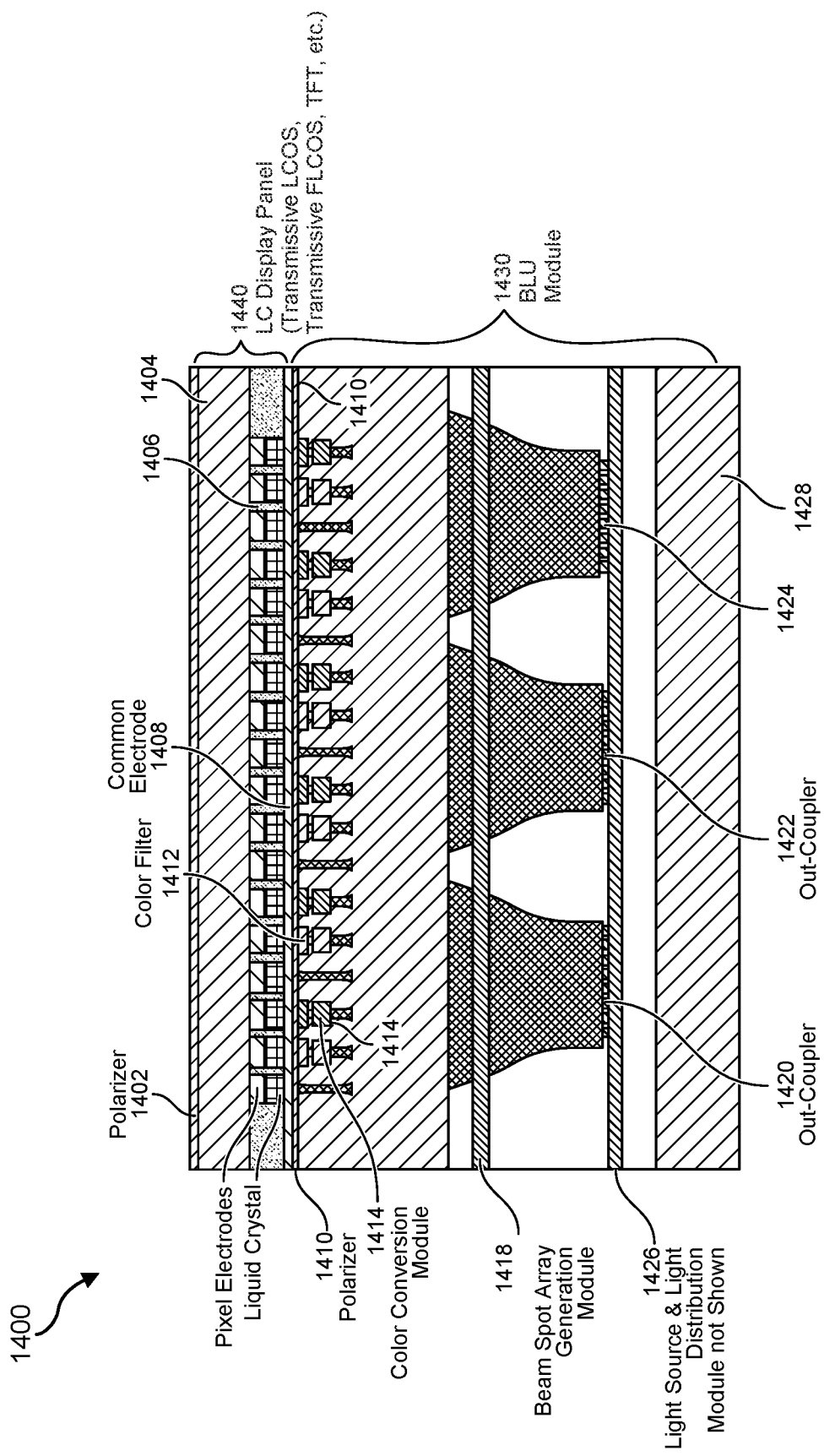
FIG. 14 shows a device including a liquid crystal display and a backlight unit, according to some examples.

FIG. 14 shows a side view of a portion of an example device 1400, such as a BLU module. Device 1400 includes a polarizer 1402, liquid crystal layer 1404, electrode arrangement 1406, second polarizer 1410, color conversion module 1414, beam spot array generation module 1418, waveguide 1426 (details of the light source and light distribution module are not shown), and outcoupler modules (1420, 1422, and 1424) and substrate 1428. The device configuration can be considered as including a liquid crystal display panel 1440 and a backlight unit module 1430. The outcoupler modules (1420, 1422, and 1424) are used to direct light from a waveguide of a photonic integrated circuit (PIC) towards the display, shown at the top of the figure. The output beams are schematically illustrated as cross-hatched regions. The beam spot array generation module 1418 may be used to provide a plurality of collimated or focused beams that are directed towards corresponding pixels and/or sub-pixels. A light source (e.g., a laser, not shown) may provide essentially a single color of light. For example, the laser radiation may include blue light. Color converters, discussed in more detail herein, may be used to provide red, green or yellow light (or other colors) from the incident blue light.

Device 1400 may be used as a BLU module with a liquid crystal display, such as transmissive LCOS (liquid crystal on silicon), transmissive FLCOS (ferroelectric liquid crystal on silicon), active matrix nematic liquid crystal, TFT, or any other suitable display technology.

Figure 15:
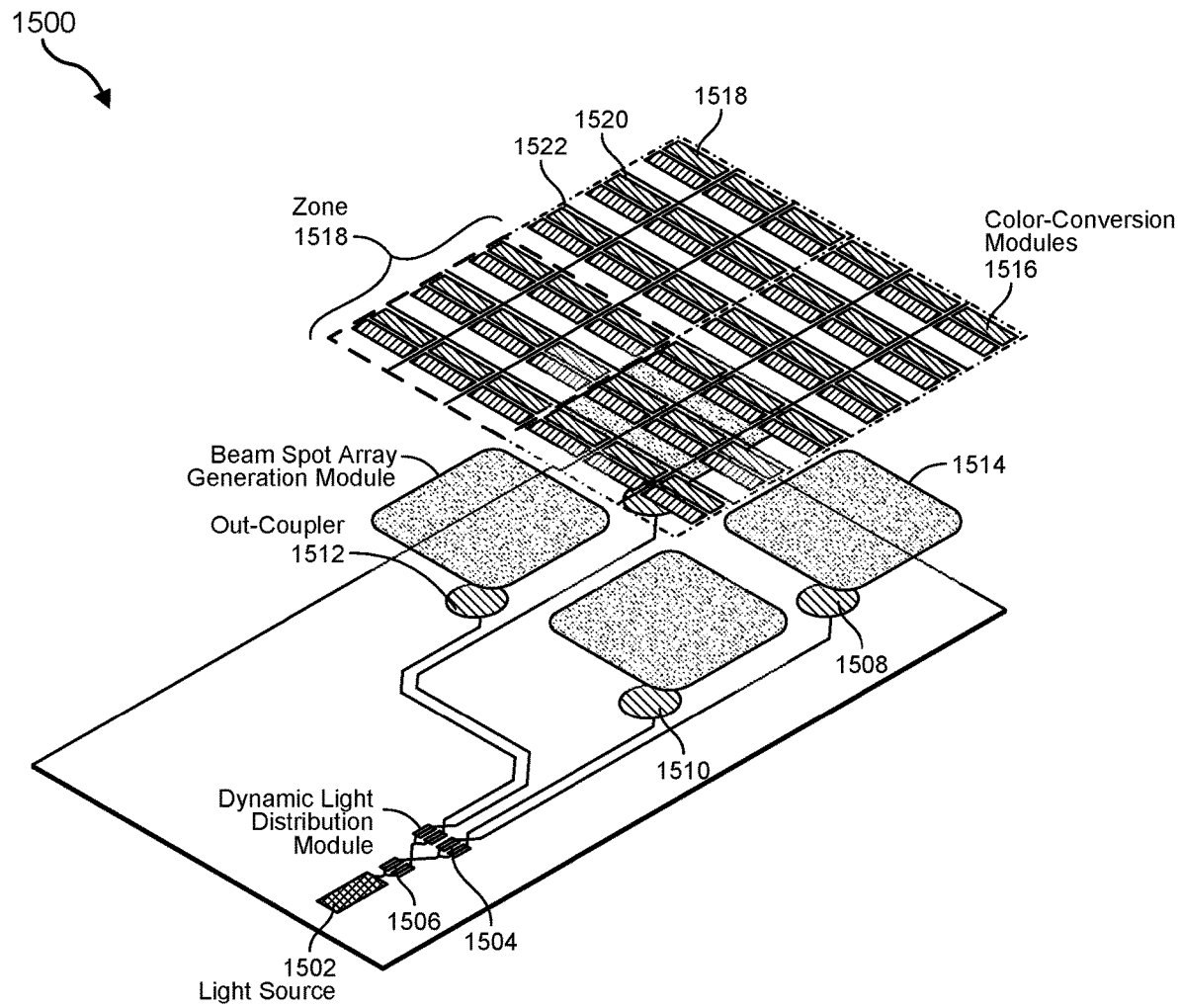
FIG. 15 shows a device divided into zones each having an out-coupler and an associated beam spot array generation module, according to some examples.

FIG. 15 shows a 3D view of an example display 1500, showing the light source 1502, dynamic light distribution module 1504, out-couplers (1508, 1510 and 1512), beam spot array generation module 1514, and color conversion modules (e.g., 1516, 1520 and 1522). The display 1500 may be divided into zones, such as zone 1518, as illustrated by dashed lines. An out-coupler and optional associated beam spot array generation module may be located at or near the center of each display zone. Display zones are shown having an approximately square periphery, but other rectangular or other forms may be used.

Figure 16:
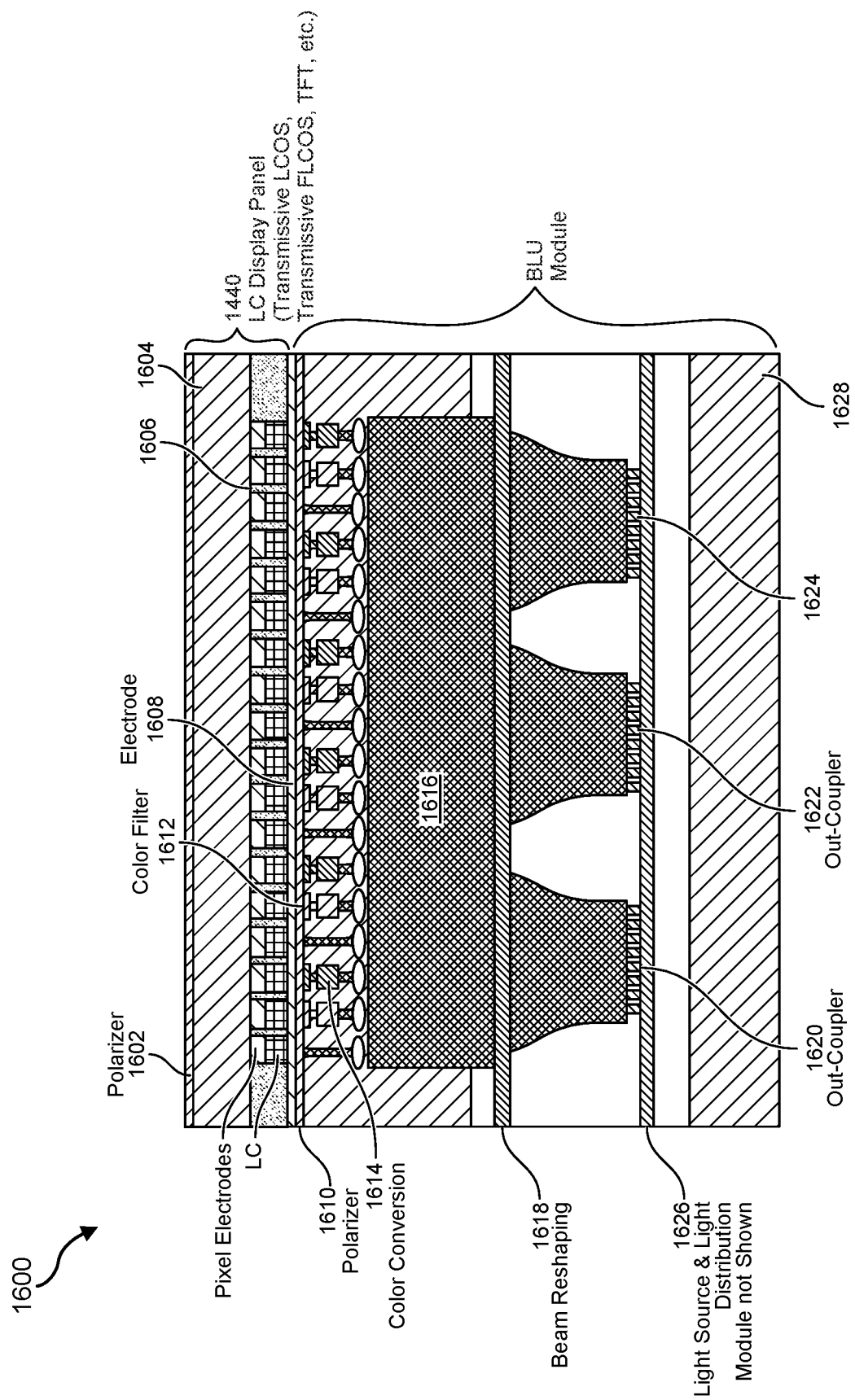
FIG. 16 shows a device including a beam reshaping module, according to some examples.

FIG. 16 shows a second example configuration. The beam reshaping module may reshape the out-coupled laser light into a generally uniform planar-wave like field near the color-conversion modules. In some examples, the beam reshaping module may include a microlens array. In some examples, an optional micro-focusing element (e.g., a microlens array) may focus the light through the color-conversion modules for better performance, such as higher brightness and/or improved efficiency.

FIG. 16 shows a side view of a portion of an example device 1600. Device 1600 includes a polarizer 1602, liquid crystal layer 1604, electrode arrangement 1606, second polarizer 1610, color conversion module 1614, beam reshaping element 1618, waveguide 1626 (details of the light source and light distribution module are not shown), and outcoupler modules (1420, 1422, and 1424) and substrate 1628. The device configuration can be considered as including a liquid crystal display panel 1640 and a backlight unit module 1630. The outcoupler modules (1620, 1622, and 1624) are used to direct light from the waveguide 1626 of a photonic integrated circuit (PIC) towards the display, shown at the top of the figure as illustrated. The output beams are schematically illustrated as cross-hatched regions. The beam reshaping element 1618 (e.g., a spot array generation module) may be used to provide a plurality of collimated or focused beams that are directed towards corresponding pixels and/or subpixels. A light source (e.g., a laser, not shown) may provide essentially a single color of light. For example, the laser radiation may include blue light. Color converters, discussed in more detail herein, may be used to provide red, green or yellow light (or other colors) from the incident blue light. The beam reshaping element may include micro-focusing elements such as an arrangement of microlenses.

Example micro-focusing elements may include one or more of the following: microlenses (e.g., a microlens arrangement such as a microlens array); meta-lenses (e.g., including one or more structured effective index component); layered structures with effective focusing power; gradient index lenses; or HOEs (holographic optical elements) or other types of diffractive lens.

Figure 17:
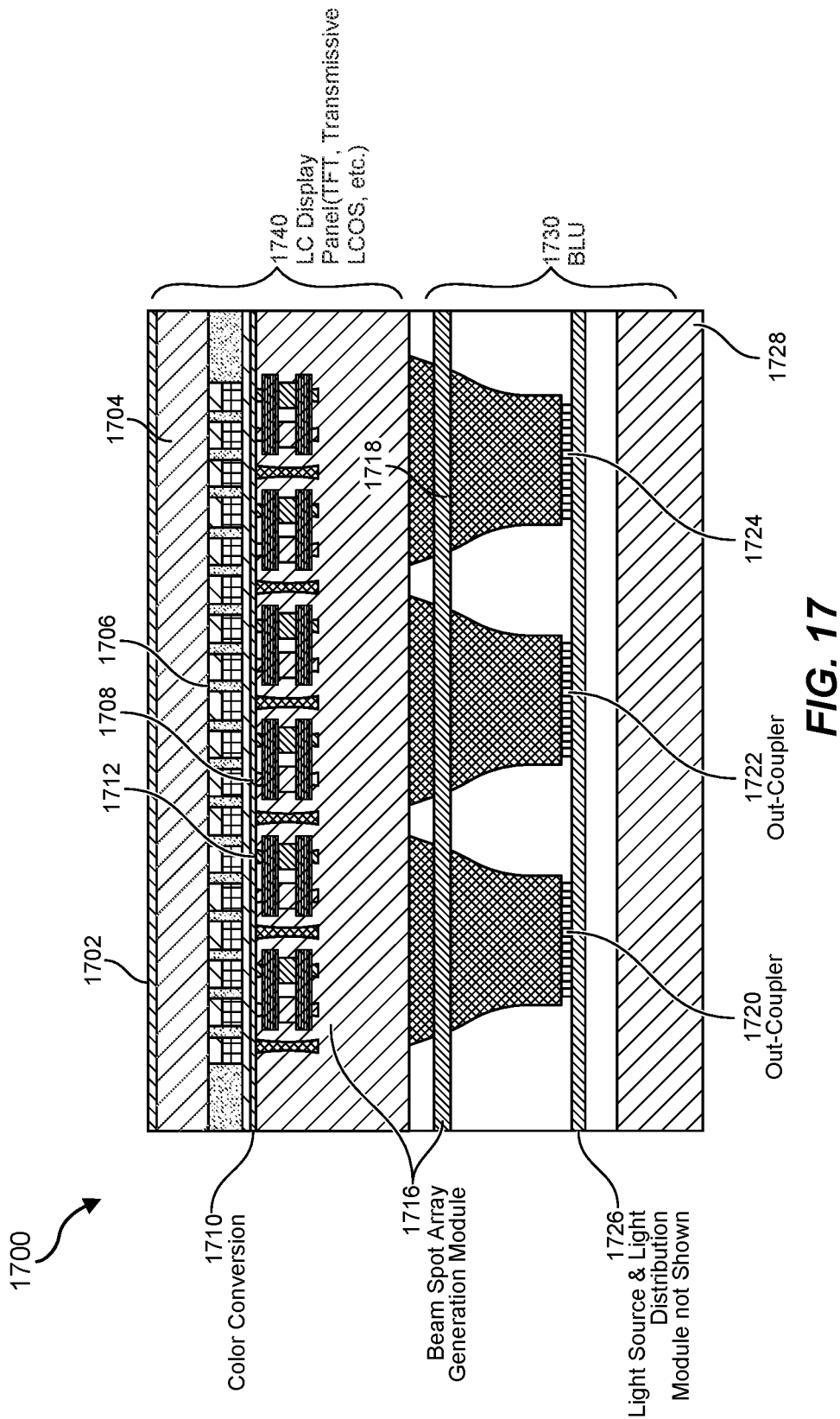
FIG. 17 shows a device including color conversion modules and a beam spot array generation modules, according to some examples.

FIG. 17 shows a further example device 1700, including color conversion modules and a beam spot array generation module. The device configuration is similar to that discussed above in relation to FIG. 16. Device 1700 includes polarizer 1702, liquid crystal layer 1704, an arrangement 1706 of electrodes and black matrix material to define display pixels, and optical resonators 1708 and 1712. As discussed in more detail above, the color conversion efficiency may be increased using an optical resonator to obtain multiple passes of the pump light through the color conversion layer 1710. Device 1700 may be considered as a combination of a backlight unit 1730 and a liquid crystal display 1740. The backlight unit 1730 may include a photonic IC including one or more waveguides, such as waveguide 1726. Out-couplers 1720, 1722, and 1724 direct light from the waveguide towards the color conversion layer 1710. The light beams are schematically represented by cross-hatched regions. A beam spot array generation module 1716 is used to increase the local intensity at each color conversion module by generating a corresponding array of light spots. For example, an example beam spot array generation module may include crossed diffraction gratings of appropriate pitch such that the beam spots are aligned on the color conversion modules.

An example device may include one or more light sources, and/or may be configured to receive light from one or more light sources that may be located outside of the BLU. In some examples, a light source may include one or more of the following: a semiconductor laser (e.g., a laser diode, vertical cavity surface emitting laser (VCSEL), or other semiconductor laser), fiber laser, heterogeneously integrated laser, light emitting diode (LED), superluminescent LED, and/or nonlinearly converted light source, such as a pump laser combined with a nonlinear optical element, for example, second-harmonic generation (SHG), third harmonic generation (THG), four-wave mixing (FWM), difference-frequency generation (DFG), parametric downconversion (PDC), and the like. Light sources may be connected to the light distribution module through one or more of the following: optical fibers, nanowires, free-space edge coupling, or a waveguide grating coupler.

A light distribution module may be configured to distribute light from one or more light sources into a number of light channels (e.g., waveguides) distributed in one or more layers. The light distribution module may be located on a side of the display module, or it may also be distributed within a photonic chip.

An example light distribution module may include one or more of the following components: optical isolators, waveguides, beam splitters, lenses, optical couplers, active optical components, and the like. For example, one or more optical isolators may include: an isolator between each light source and the remainder of the light distribution module to block reflected light from entering the light sources. Waveguides may include: rectangular, rib, ridge, or any lithographically defined and fabricated waveguides; direct laser written waveguides; ion-diffusion/implanted waveguides; and/or holographically defined and developed waveguides. Beam splitters may include cascaded trees of any combination, including fiber-based beam splitters, on-chip star couplers, MMI (multi-mode interferometer) couplers, MZI (Mach-Zehnder interferometer) or other directional coupler, and/or Y-splitters. In some examples, optical couplers may include resonator-based (e.g., photonic crystal) couplers. In some examples, a device may include one or more active (or dynamic) light distribution modules which may be configured to allow adjustment of one or more light levels at one or more display zones, or over the entire display.

Figure 18:
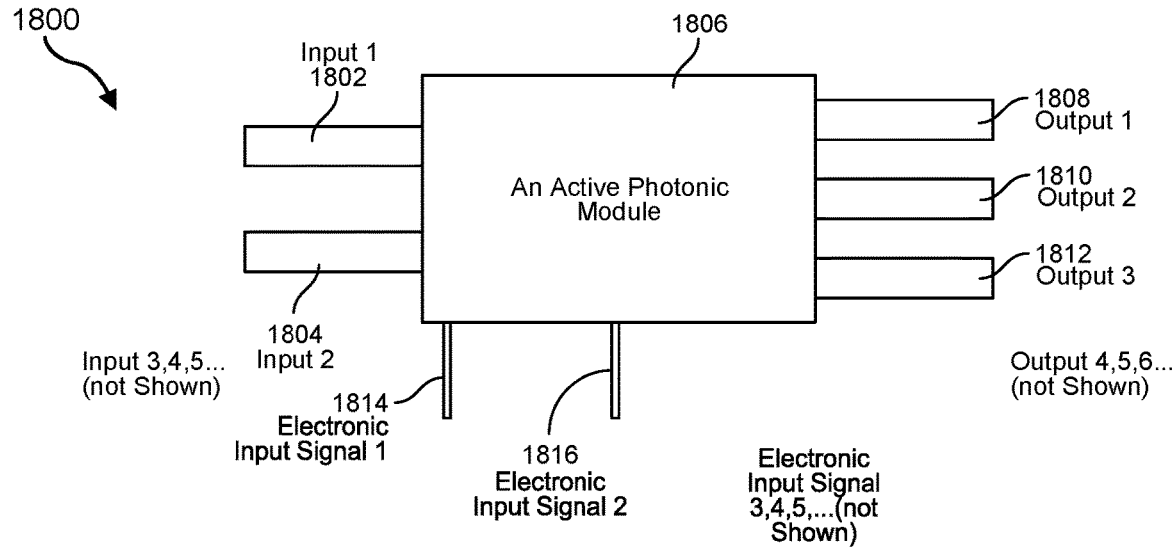
FIG. 18 shows a device including a dynamic light distribution module, according to some examples.

FIG. 18 shows a schematic of a device 1800, in this example, including a dynamic light distribution module 1806 having two inputs and two or more outputs (e.g., three outputs). First and second electronic input signals applied to first and second input electrodes (1814 and 1816, respectively) may be used to distribute the input light received by first and second light inputs (1802 and 1804, respectively) between the two or more outputs (e.g., outputs 1808, 1810 and 1812). In this example, the light may be output into two or more waveguides directed to different backlight zones. Electrical signals may be used to control the light intensity incident at one or more zones of the BLU, for example, by adjusting light intensity ratios between different waveguide or dynamically modulating light intensity within one or more waveguides.

Figure 19:
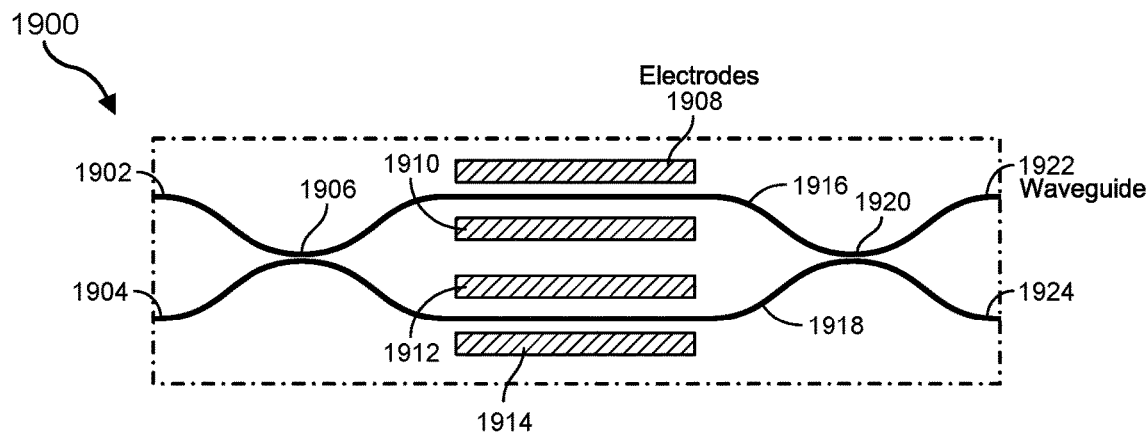
FIG. 19 shows a device including a Mach-Zehnder interferometer, according to some examples.

FIG. 19 shows an example device 1900 including a Mach-Zehnder interferometer based 2 input, 2 output active light distribution module. This may be termed a 2×2 directional coupler, and multiple units may be cascaded to form a 2×N coupler as described below in relation to FIG. 22. Device 1900 has two light inputs (1902 and 1904), two outputs 1922 and 1924 (e.g., into waveguides), coupling regions 1906 and 1920, with electrooptical modulation available using electrical signals applied between electrodes 1908 and 1910, and between electrodes 1912 and 1914 to modulate the output intensities at locations 1916 and 1918 within the device 1900.

Figure 20:
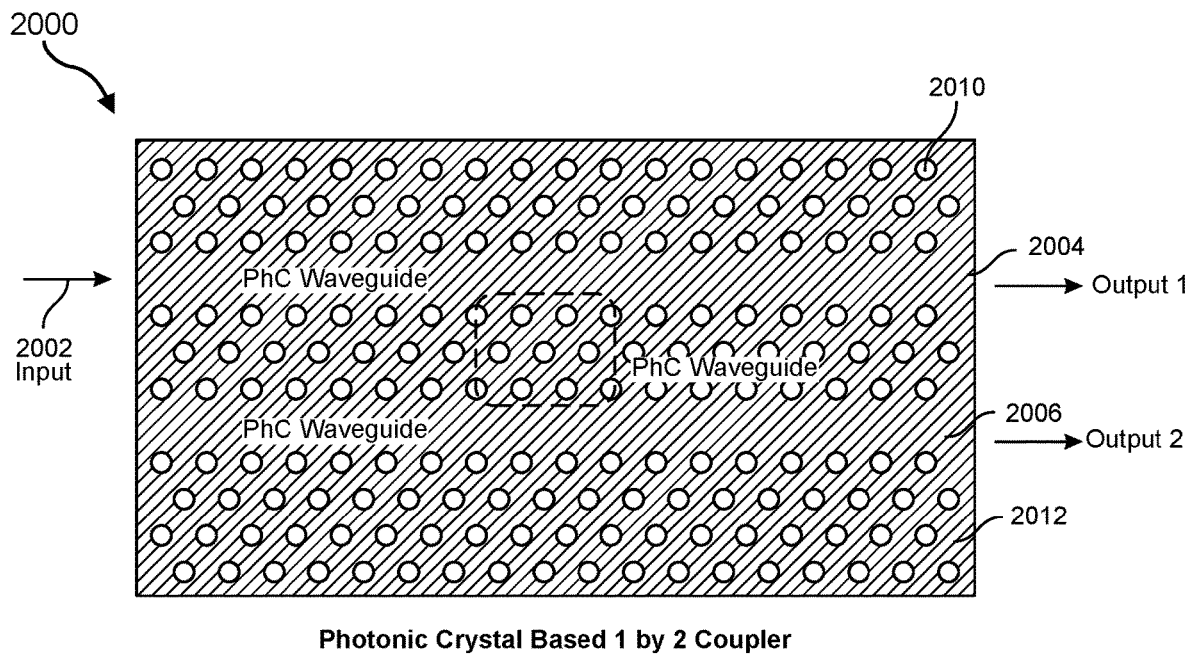
FIG. 20 shows a device including a photonic crystal based optical coupler, according to some examples.

FIG. 20 shows an example device 2000 including a photonic crystal (PhC) based 1×2 coupler, with one input (2002) and two outputs (2004 and 2006). A photonic crystal may include an arrangement of voids (e.g., hole 2010) within an optical material (2012). In some examples, a photonic crystal may include an arrangement of particles, such as nanoparticles or microparticles of an optical material. A photonic crystal waveguide may include a region of optical material clad by regions of optical material including an arrangement of holes.

Figure 21:
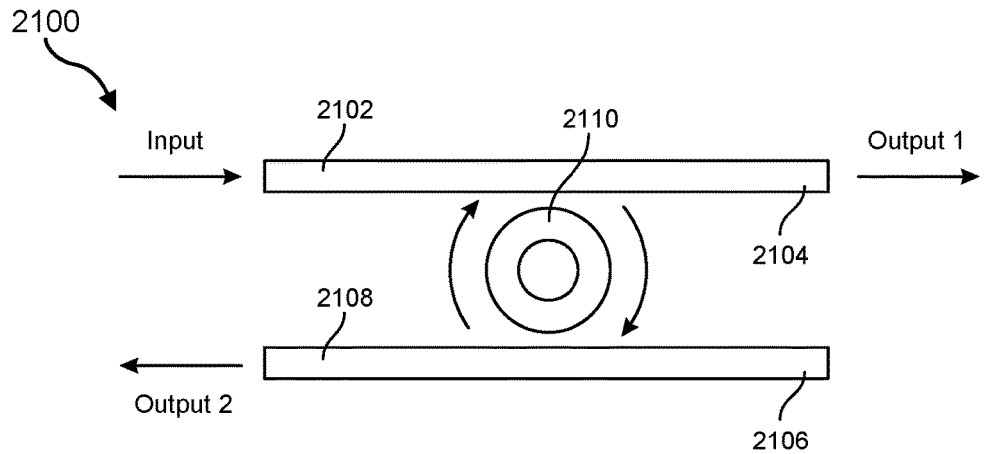
FIG. 21 shows a device including a ring-based optical coupler, according to some examples.

FIG. 21 shows an example device 2100 including a 1×2 ring-based coupler. The device 2100 includes a light input 2102, a ring modulator region 2110, a first output 2104, a second output 2108 and a waveguide stub 2106.

Figure 22:
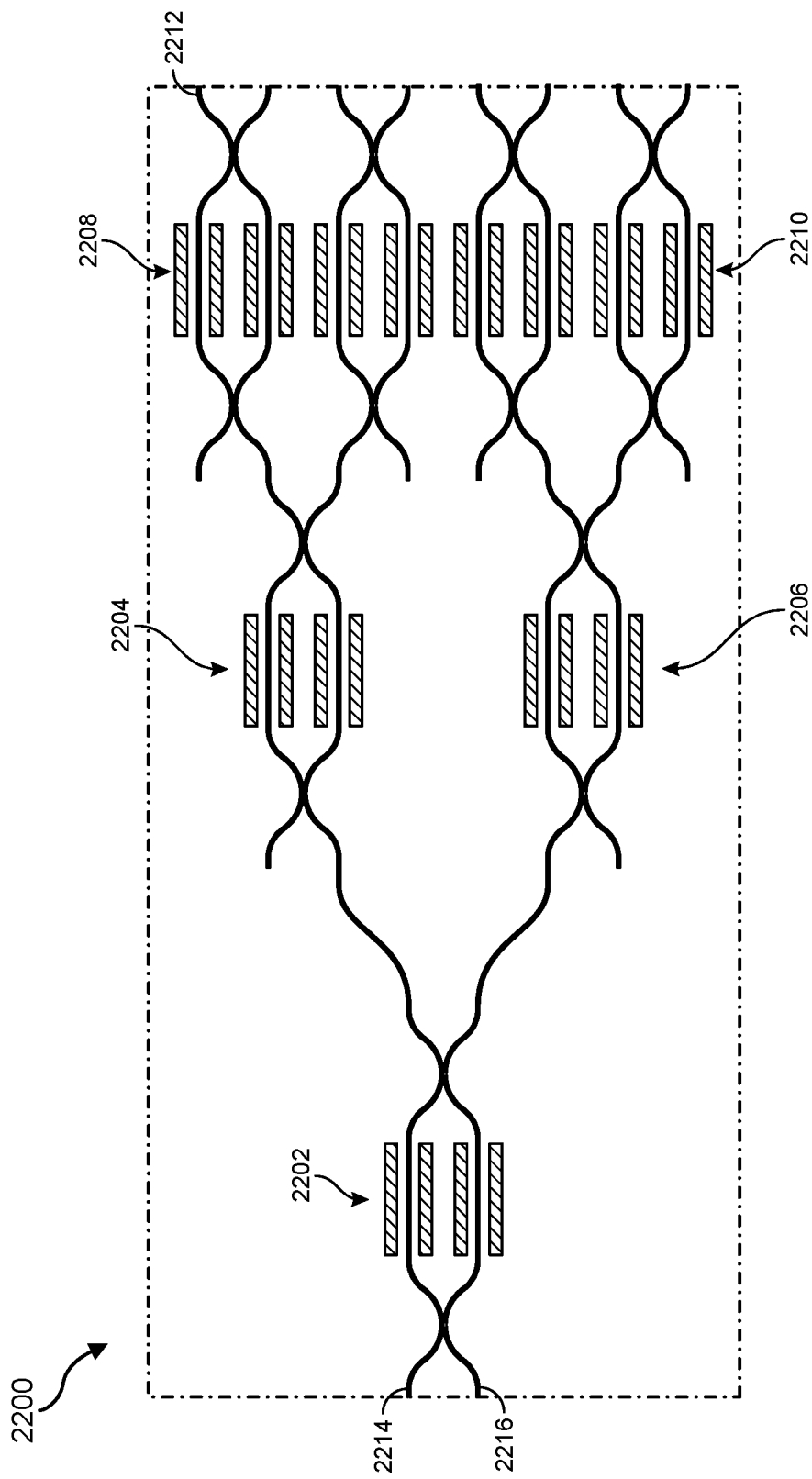
FIG. 22 shows a device including a light distribution coupler formed from cascaded modules, according to some examples.

FIG. 22 shows an example device 2200 including a 2-input, 8-output (2×8) light distribution module. A plurality of 2×2 light distribution modules (for example, as discussed above in relation to FIG. 19) may be cascaded as shown to provide additional output ports. Device 2200 includes a first module 2202 with two outputs directed to second and third modules 2204 and 2206, with the four outputs directed to four modules (e.g., modules 2208 and 2210). The column of 4 modules provide 8 light outputs., including output 2212. Additional columns of modules may be added to obtain 16, 32, 64 or other number of light outputs. Pairs of electrodes (discussed above in relation to FIG. 19) may be used to dynamically adjust the light intensity at one or more selected light outputs.

Any structure or component of the light distribution module may include one or more active waveguides to achieve dynamic tunability and/or switching, such that the intensity ratio between particular channels may be dynamically varied (e.g., for local dimming functionality). In some examples, the total output intensity of a light source may be adjusted to adjust any desired combination of local dimming and/or global dimming.

An example active waveguide may include one or more of the following: electro-optic materials (e.g., lithium niobate ($LiNbO_3$), barium titanate (BTO), aluminum nitride (AlN) and/or other III-V materials. In some examples, an active waveguide may include one or more electro-optic polymers. Electro-optic materials may be formed as part of an example waveguide structure and electrodes may be located to apply an electrical signal across the electro-optic material.

In some examples, a waveguide may include a thermo-optic material, for example, as part the waveguide structure. One or more micro-heating elements may be located proximate the thermo-optic material.

In some examples, a waveguide may include one or more mechanical movable parts, for example, controlled using piezo-electric, electrostatic or other mechanisms. A mechanical movable part may be adjusted to change the geometry or the arrangement of waveguide(s) or other component(s), for example, using one or more control mechanisms.

In some examples, a waveguide may include a phase change material (e.g., as part the waveguide structure) which may be modified using one or more proximate micro-heating elements. In some examples, a waveguide may include a micro-fluidic channel as part of the waveguide structure, along with one or more proximate fluidic control mechanisms. In some examples, a waveguide may include a liquid crystal as part of the waveguide structure, for examples, with electrodes positioned to realign the orientation of at least a portion of the liquid crystal.

Light channels may be configured to connect the output of the light distribution module and one or more out-couplers. An example light channel may include one or more of any of the following: a waveguide, an amplitude modulator, and/or a phase modulator. An example waveguide may include a single-mode waveguide (e.g., rectangular, ridge, rib, or other type of waveguide), and/or a multi-mode waveguide. An amplitude modulator may include one or more of the following: an MZI, a ring modulator (e.g., a micro-ring modulator), a tunable-absorption waveguide, photonic crystal (PhC) cavity, and/or a mechanically adjustable component. A phase modulator may be configured to scramble the relative phase of signals provided by each out-coupler.

An example out-coupling module (or out-coupler) may out-couple light propagating in the waveguide into an out-of-plane direction to illuminate a display. An example out-coupler may include one or more of any of the following: a grating coupler, an arrangement of scatterers, an antireflection coating, other grating structures, or an holographic optical element (HOE). An example grating coupler may have a 1D, 2D or 3D grating profile, and the grating coupler may be etched directly into the waveguide or may be separate from but proximate to the waveguide. For example, there may be evanescent optical coupling between the waveguide and the grating coupler. An arrangement (e.g., an array) of scatterers may include non-resonant and/or resonant structures) and may be fabricated proximate the waveguide layer(s). Scatterers may include meta-grating scatterers, for example including a multilayer and/or resonant scatterers. An anti-reflective (AR) coating may be formed on the other side of the waveguide to increase the coupling efficiency and reduce unwanted light leakage and loss. An example AR coating may include one or more stacked layers of dielectric, metallic or semiconductor materials. Grating structures may include a volumetric Bragg grating. A holographic optical element (HOE) may include any suitable optical element, such as a liquid-crystal based polarization volume hologram.

Example out-couplers were discussed above, for example, in relation to FIGS. 6A and 6B. Example outcouplers may include straight or oblique grating elements, which may be formed on, in, or proximate to but separated from a waveguide. An example AR coating may be formed on the opposite side of the grating from the outcouplers. In some examples, different outcouplers may be formed at different locations within the BLU. For example, oblique gratings may be formed near an edge portion of the BLU.

An example beam spot generation module may be configured to receive a output beam profile (e.g., approximately Gaussian-like profile) from the out-coupling module, and generate an array of uniform spots at a given distance that may then propagate through the display panel. In some examples, a module in front of different out-coupler region within the segment may be designed differently such that they generate spatially-overlapping beam spot array at the desired plane, which may provide redundancy (e.g., tolerance to loss of a waveguide function).

An example beam spot generation module may include one or more of any of the following: a meta-surface (e.g., a metamaterial element); a diffractive optical element; a holographic optical element; and/or a volume holographic optical element.

Out-couplers and a spot array generator may be integrated as a single module by suitably configuring the local phase and coupling strength of the out-coupled light across the out-coupling region.

An example color conversion module may be configured to receive laser radiation and provide one or more desired colors to illuminate the display. In some examples, the laser radiation may include blue light. The blue light, along with red and green light generated by color conversion modules, may illuminate the display. In some examples, the laser radiation may include UV light. Red, green and blue light may be generated by color conversion modules to illuminate the display.

An example color conversion module may include one or a combination of color-conversion materials that may absorb light within a particular wavelength range and emit light in the desired wavelength range (e.g., of a desired color). Color-conversion materials may include one or more of the following: quantum dots (e.g., semiconductor quantum dots having one or more radii), fluorescent materials; quantum wells (e.g., semiconductor quantum wells having one or more well thicknesses); nanowires (e.g., semiconductor nanowires); or other nanostructures.

Example color conversion modules may further include: a high/partial reflectivity film stack to form a resonant cavity for the laser light, for example to enhance absorption and consequently conversion efficiency; and/or one or more polarizers (e.g., wire-grid, particle, multi-stack, reflective polarizer, etc.).

A reflective polarizer and/or a reflective coating may recycle the color-converted light in an unwanted polarization, and improve output efficiency. Light of the unwanted polarization may be reflected back into the cavity. An optical retarder, such as a quarter-wave plate, may be used to convert reflected light of unwanted polarization into the desired polarization.

FIGS. 23A-23D show example configurations for a color conversion module that may be used in a backlight module or other device.

Figure 23A:
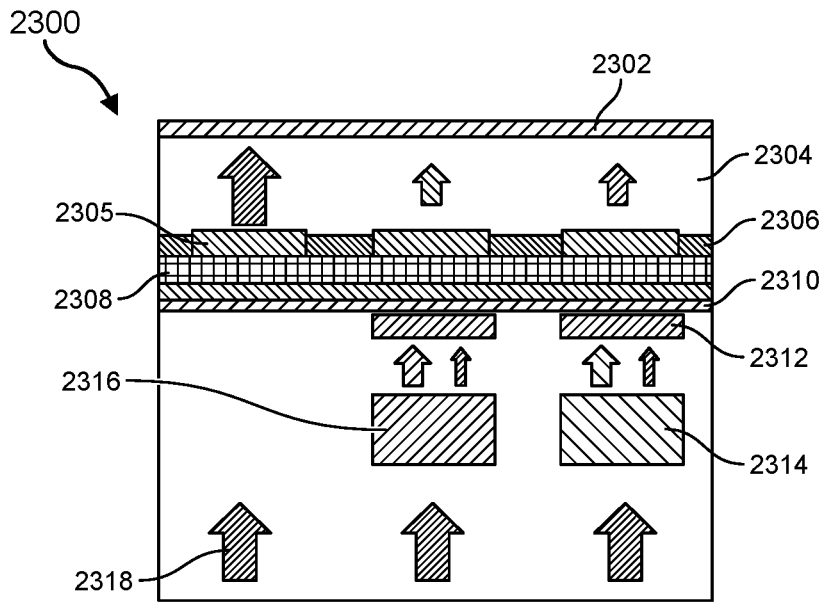
FIGS. 23A-23D show various color conversion configurations, according to some examples.

FIG. 23A shows a device 2300 in which the laser radiation makes a single pass through the color conversion material. The laser radiation may be blue, and color conversion modules may be used to provide red and green light. Device 2300 includes light emissive surface 2302 (e.g., including a polarizer, upper liquid crystal display substrate, alignment layer and electrodes), liquid crystal layer 2304, electrode 2305 (e.g., a transparent electrically conductive electrode), black matrix layer 2306, liquid crystal display substrate 2308, polarizer 2310, optical filter 2312, and color conversion module 2314. The figure shows a representative three pixels, for example, blue, red, and green pixels. In some examples, blue light may be sent to the display portion through a waveguide and no color conversion modules are needed for blue pixels. The color filter may allow red or green light to pass, and may block blue light. The upwardly directed arrows schematically show the direction of light transmission, and the waveguide and outcoupler components are not shown.

Figure 23B:
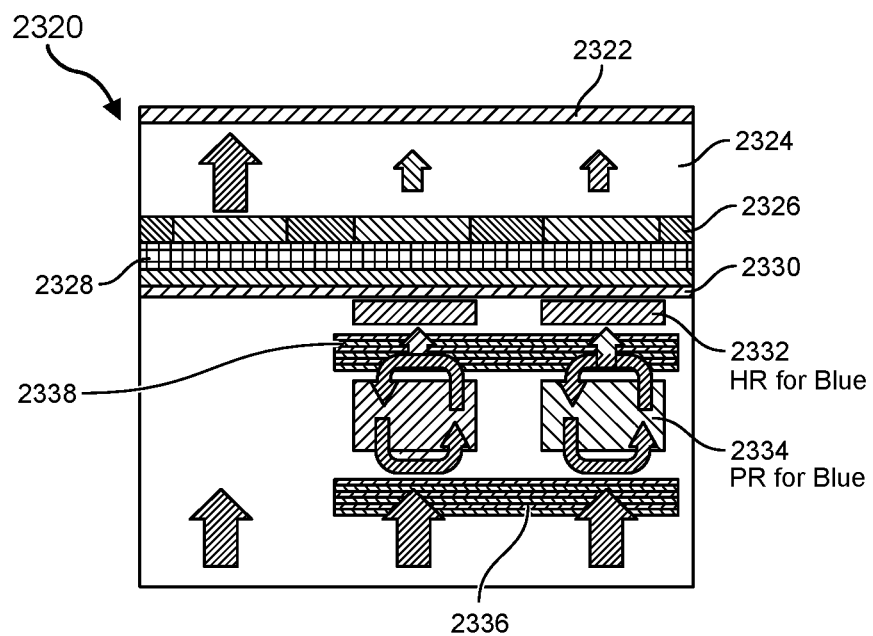

FIG. 23B shows an example device 2320 including color conversion modules located within an optical cavity. For example, the optical cavity may be optically resonant for blue light and/or light provided by the color conversion modules. The optical cavity may include high reflectance (HR) and/or partially reflective (PR) reflectors.

Device 2320 may be configured so that the laser radiation makes multiple passes through the color conversion module. The laser radiation may be blue, and color conversion modules may be used to provide red and green light, or other non-blue light. Device 2320 includes light emissive surface 2322 (e.g., including a polarizer, upper liquid crystal display substrate, alignment layer and electrodes), liquid crystal layer 2324, electrode and black matrix layer 2326, liquid crystal display substrate 2328, polarizer 2330, optical filter 2332, and color conversion module 2334. The figure shows a representative three pixels, for example, blue, red, and green pixels. In some examples, blue light may be sent to the display portion from a waveguide and no color conversion modules are needed for the blue pixels. The color filter may allow red or green light to pass as desired, and may block blue light. In this example, the pump light (e.g., blue light) and generated red or green light may make multiple passes back and forth through the color conversion modules. The upwardly directed arrows schematically show the direction of light transmission, and the waveguide and outcoupler components are not shown.

Figure 23C:
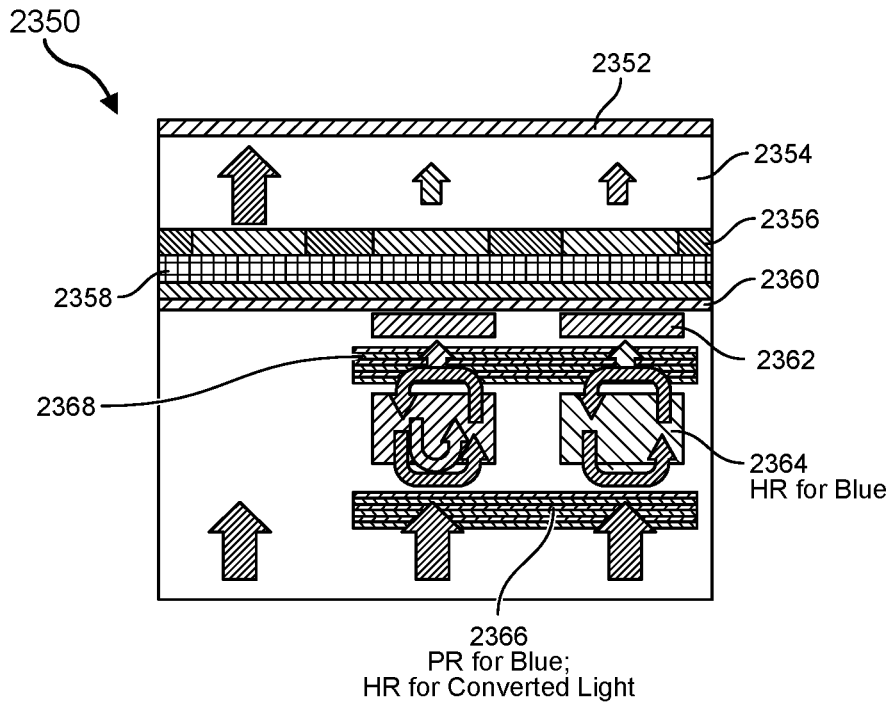

FIG. 23C shows the inclusion of a reflector for blue light located outside of the optical cavity. The reflector may pass, for example, desired red and/or green light and reflect blue laser radiation that passes through the color conversion module. Device 2350 may be configured so that the laser radiation makes multiple passes through the color conversion module. The laser radiation may be blue, and color conversion modules may be used to provide red and green light, or other non-blue light. Device 2350 includes light emissive surface 2352 (e.g., including a polarizer, upper liquid crystal display substrate, alignment layer and electrodes), liquid crystal layer 2354, electrode and black matrix layer 2356, liquid crystal display substrate 2358, polarizer 2360, optical filter 2362, and color conversion module 2364. The figure shows a representative three pixels, for example, blue, red, and green pixels. In some examples, blue light may be sent to the display portion from a waveguide and no color conversion modules are needed for the blue pixels. The color filter may allow red or green light to pass as desired, and may block blue light. In this example, the pump light (e.g., blue light) and generated red or green light may make multiple passes back and forth through the color conversion modules, as represented by the circulating arrows, within an optical cavity defined by reflectors 2366 and 2368. The lower reflector may be highly reflective for converted light (e.g., red or green light) but only partially reflective for the pump light (e.g., the blue light). The upwardly directed arrows schematically show the direction of light transmission, and the waveguide and outcoupler components are not shown.

Figure 23D:
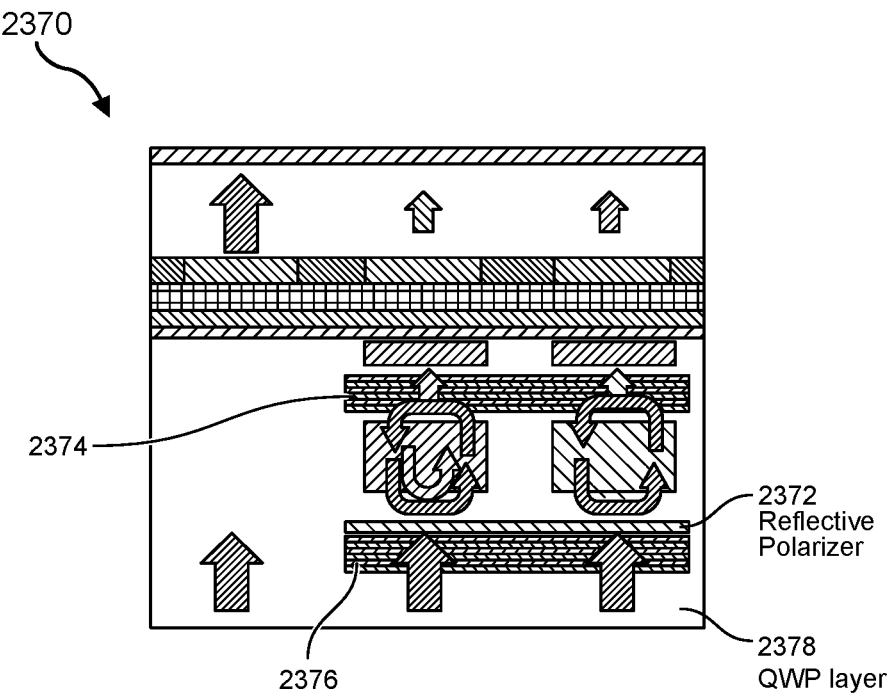

FIG. 23D shows a device including a reflective polarizer that may be used to recycle any unwanted polarization of converted light. Devices may include quantum wells (QWs) or other arrangements of nanostructure or microstructures. FIG. 23D shows the inclusion of a reflector for blue light located inside the optical cavity.

Device 2370 may be configured so that the laser radiation makes multiple passes through the color conversion module. The device configuration is similar to that discussed above in relation to FIG. 23C and will not be discussed again in detail. The laser radiation may be blue, and color conversion modules may be used to provide red and green light, or other non-blue light. Device 2370 includes a reflector 2372 located within a cavity formed by reflectors 2374 and 2376. The reflector may be highly reflective for converted light (e.g., red or green light) but only partially reflective for the pump light (e.g., the blue light). In some examples, an additional reflector 2378 may be located beneath the cavity (as illustrated, e.g., as a quantum well polarizer) and may recycle any light transmitted in a direction away from the display. The upwardly directed arrows schematically show the direction of light transmission, and the waveguide and outcoupler components are not shown.

FIGS. 24A-24C show further device examples.

FIG. 24A shows a device 2400 including a light emissive surface 2402 (e.g., including a polarizer, upper liquid crystal display substrate, alignment layer and electrodes), liquid crystal layer 2404, electrode and black matrix layer 2406 (e.g., including electrodes that help define the display pixels and black matrix material between the electrodes to reduced light leakage), liquid crystal display substrate 2408, polarizer 2410, optical filter 2412, and color conversion module

2414. The figure shows a representative three pixels, for example, blue, red, and green pixels. In some examples, blue light may be sent to the display portion through a waveguide and no color conversion modules are needed for blue pixels. The color filter may allow red or green light to pass and may block blue light. The upwardly directed arrows schematically show the direction of light transmission, and the waveguide and outcoupler components are not shown. In this example, reflectors 2418 and 2416 provide an optical cavity therebetween and both pump light (e.g., blue light) and converted light (e.g., red and green light) may make repeated passes through the color conversion module within the optical cavity. Additional polarized reflector 2420 may be used to removed unwanted polarizations and/or wavelengths from the light in the optical cavity.

FIG. 24B shows a device 2430 including a light emissive surface 2432 (e.g., including a polarizer, upper liquid crystal display substrate, alignment layer and electrodes), liquid crystal layer 2434, electrode and black matrix layer 2436 (e.g., including electrodes that help define the display pixels and black matrix material between the electrodes to reduced light leakage), liquid crystal display substrate 2438 (e.g., including a polarizer), optical filter 2440, and color conversion module 2444. The figure shows a representative three pixels, for example, blue, red, and green pixels. In some examples, UV and/or violet light may be sent to the display portion through a waveguide and a color conversion modules may be provided for blue pixels as well as for red, yellow, or green pixels. The color filter may allow blue, red or green light to pass and may block UV or violet light. The upwardly directed arrows schematically show the direction of light transmission, and the waveguide and outcoupler components are not shown. In this example, reflectors 2442 and 2446 provide an optical cavity therebetween and both pump light (e.g., UV or violet light) and converted light (e.g., blue, red and green light) may make repeated passes through the color conversion module within the optical cavity. Additional polarized reflector 2420 may be used to removed unwanted polarizations and/or wavelengths from the light in the optical cavity.

FIG. 24C shows a device 2470 including a light emissive surface 2472 (e.g., including a polarizer, upper liquid crystal display substrate, alignment layer and electrodes), liquid crystal layer 2474, electrode and black matrix layer 2476 (e.g., including electrodes that help define the display pixels and black matrix material between the electrodes to reduced light leakage), liquid crystal display substrate 2478, polarizer 2480, optical filter 2482, and color conversion module 2484. The figure shows a representative four pixels, for example, blue, red, green (or yellow) and white pixels. In some examples, UV and/or violet light may be sent to the display portion through a waveguide and a color conversion modules may be provided for blue pixels as well as for red, yellow, green, or white pixels. The color filter may allow blue, red or green light to pass and may block UV or violet light. The upwardly directed arrows schematically show the direction of light transmission, and the waveguide and outcoupler components are not shown. In this example, reflectors 2486 and 2488 may provide an optical cavity therebetween and both pump light (e.g., UV or violet light) and converted light (e.g., blue, red green, or white light) may make repeated passes through the color conversion module within the optical cavity. Additional polarized reflector 2490 may be used to removed unwanted polarizations and/or wavelengths from the light in the optical cavity. The white light pixels may be used to adjust the brightness of the display and may help with viewability in bright light conditions. The white light color conversion module may include one or more luminescent materials (e.g., phosphors, fluorescent materials, or photoluminescent materials), such as a white light luminescent materials or combination of luminescent materials, a combination of red, green, and blue luminescent materials, a combination orange and blue luminescent materials, or other combination of materials. In some examples, the white light pixels may be replaced by yellow pixels, orange-red pixels, yellow-orange pixels, yellow-green pixels, or the like.

Figure 25:
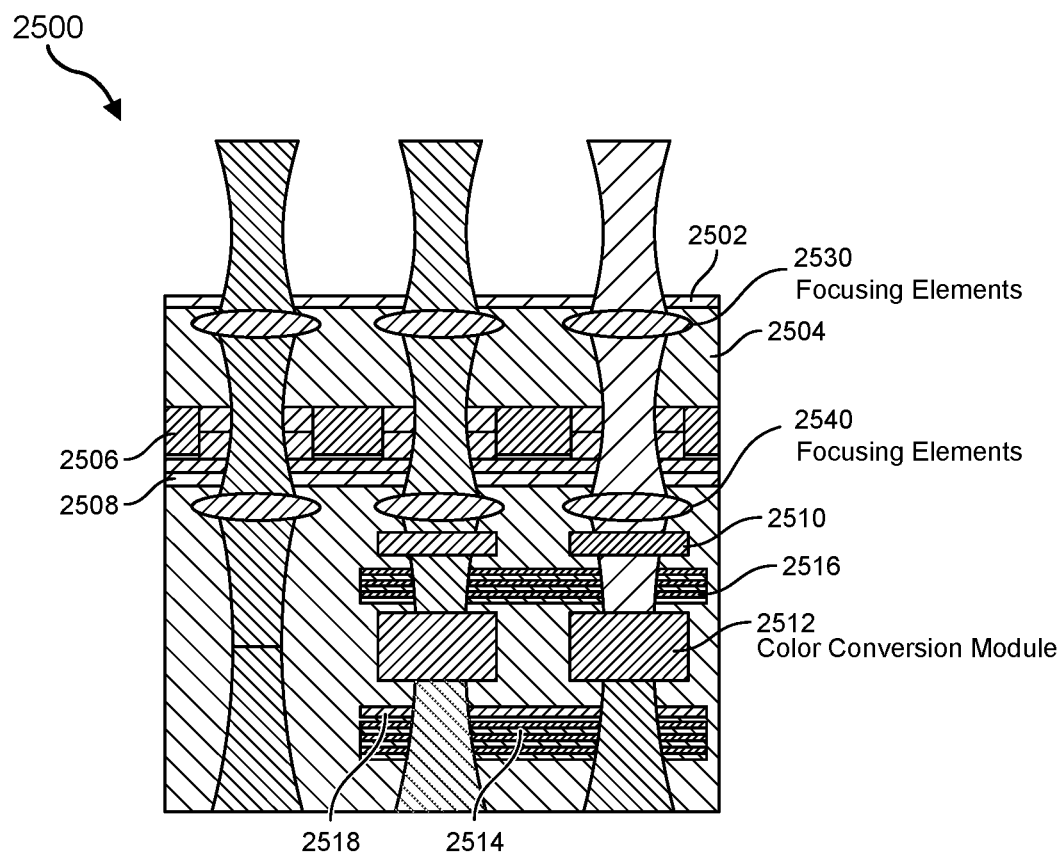
FIG. 25 shows a device including micro-focusing elements, according to some examples.

FIG. 25 shows an example device 2500 including micro-focusing elements. Additional set(s) of micro-focusing elements can be added to the optical path between the color-conversion module and the display panel, and after the display panel, for better focusing, angular profile control, chief ray redirection, and the like.

Device 2500 includes light emissive surface 2502 (e.g., including a polarizer, upper liquid crystal display substrate, alignment layer and electrodes), liquid crystal layer 2504, electrode and black matrix layer 2506 (e.g., including electrodes that help define the display pixels and black matrix material between the electrodes to reduced light leakage), liquid crystal display substrate 2508 (e.g., including a polarizer), optical filter 2510, and color conversion module 2512. The figure shows a representative three pixels, for example, blue, red, green (or yellow) pixels. Blue light may be provided by a waveguide (not shown) and no color conversion module is needed for a blue pixel. Color conversion modules may be provided for red, yellow, or green pixels, or other color pixels. The color filter may allow red, yellow or green light to pass and may block blue light. The upwardly directed arrows schematically show the direction of light transmission, and the waveguide and outcoupler components are not shown. In this example, reflectors 2514 and 2516 may provide an optical cavity therebetween and both pump light (e.g., UV or violet light) and converted light (e.g., blue, red green, or white light) may make repeated passes through the color conversion module within the optical cavity. Additional polarized reflector 2518 may be used to removed unwanted polarizations and/or wavelengths from the light in the optical cavity. Focusing elements may include one or more of the following: microlenses, meta-lenses, adjustable lenses (e.g., fluid lenses), layered structures, gradient-index lenses, or a diffractive optical element (DOE). Micro-lenses may be arranged in arrays. A meta-lens may include a structured effective index configuration, such as a metamaterial lens. Layered structures may have an effective focusing power. Gradient index lenses may include a refractive index profile configured to provide desired focusing. Diffractive optical elements may include gratings, photonic crystals, or any other suitable diffractive optical element.

Some or all electronic components (e.g., power lines, signal lines and control circuitry for the light sources) and the dynamic light distribution module may be fabricated either on top or bottom of the photonic layer and connected to the active components through conducting vertical vias.

Some or all electronic components, including power lines, signal lines and control circuitry for the light sources as well as the dynamic light distribution module may be located on the side of the chip or even on a separate chip and connected to the active components through metallic or conducting wire network fabricated on the main chip.

Figure 26:
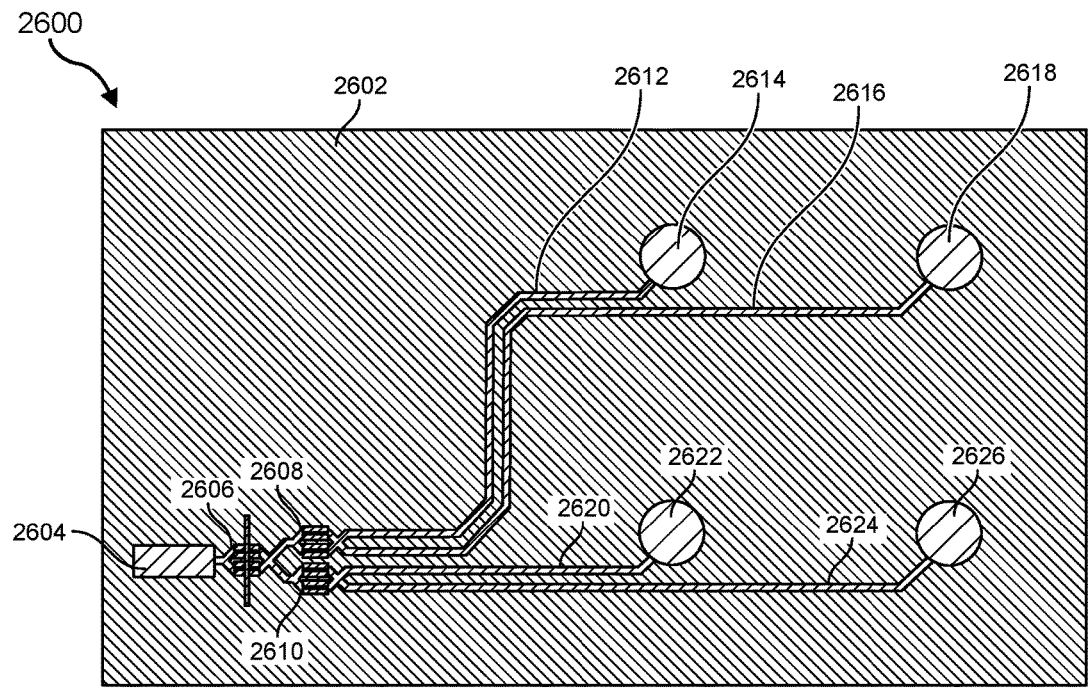
FIG. 26 shows electronic circuitry integration, according to some examples.

FIG. 26 illustrates example electronic circuitry integration. Device 2600 includes substrate 2602, light source 2604 (e.g., a laser such as a blue, violet, or UV laser), an arrangement of optical couplers (2606, 2608 and 2610)

arranged to provide four optical outputs from the single light source, waveguides (2612, 2616, 2620, and 2624) configured to convey the light to the backlight zones, and outcouplers (2614, 2616, 2622 and 2626) configured to out-couple light from the waveguides into display zones. Each waveguide may have one or more outcouplers.

Figure 27:
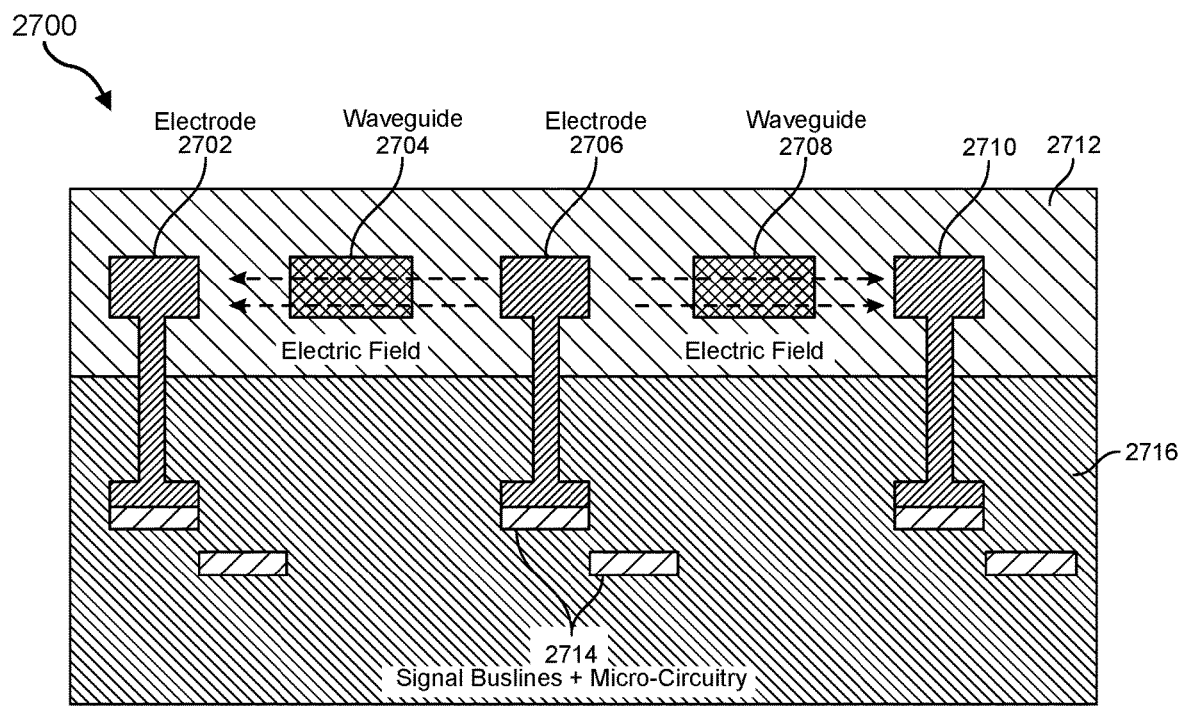
FIG. 27 shows a device in which an electric field may be applied in a transverse direction, according to some examples.

FIG. 27 shows an example device 2700 having a device configuration in which an electric field is applied in a transverse direction (e.g., parallel to the display). Device 2700 includes electrodes 2702 and 2706 configured to apply an electric field across waveguide 2704. At least a portion of the waveguide 2704 may include an electrooptical material having one or more physical properties that may be modified by the electric field. The electrodes 2702 and 2706 may be used to dynamically adjust the light transmission through the waveguide 2704. A second electric field may be applied between electrode 2706 and electrode 2710 to adjust light transmission through waveguide 2708. Waveguides and proximate portions of electrodes may be embedded in a substrate 2716 (e.g., a dielectric medium). Electrodes may be electrically connected to signal buslines (e.g., buslines 2714) and associated microcircuitry (not shown). Buslines may be supported by (e.g., embedded in) the substrate 2716. A control circuit (not shown) may control local and global dimming of a backlight using electrical control of electrooptical portions of a waveguide.

Figure 28:
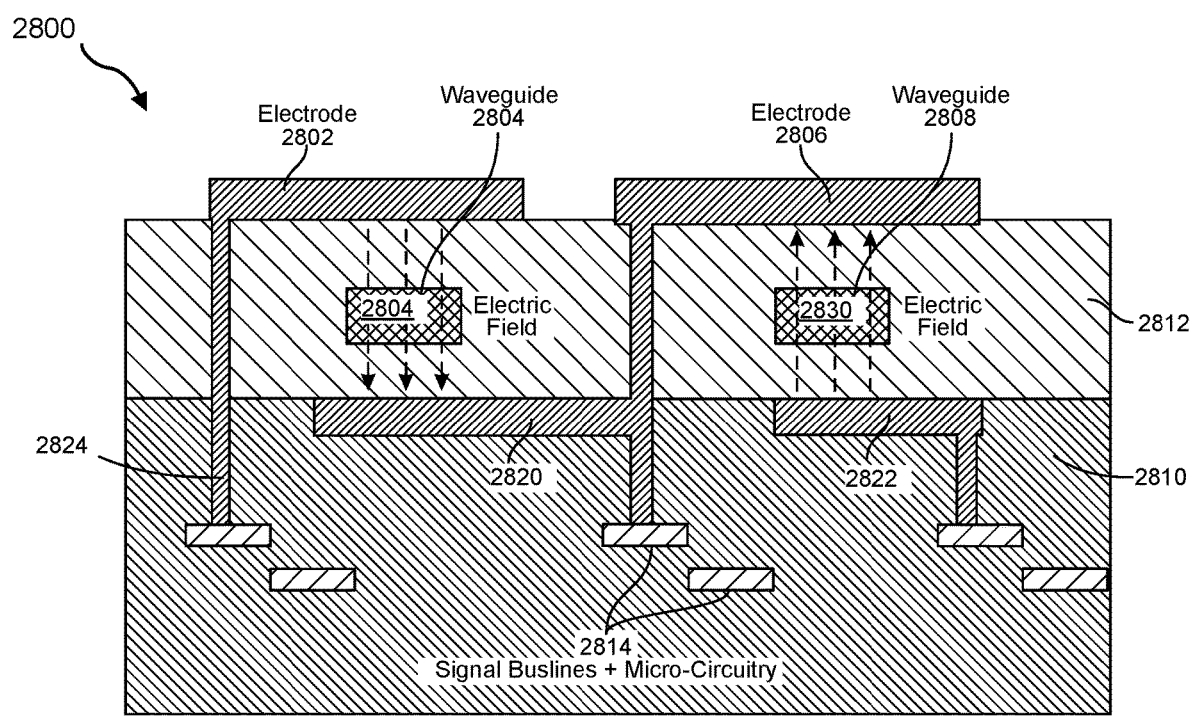
FIG. 28 shows a device in which an electric field may be applied in a vertical direction, according to some examples.

FIG. 28 shows an example device 2800 (in cross-section) in which an electric field may be applied in a vertical direction (e.g., normal to the display). Device 2800 includes electrodes (e.g., electrodes 2802, 2806, 2820 and 2822), waveguides (2804 and 2808) and an electronic IC (2814), for example, including signal buslines and microcircuitry. Applied electric fields may correspond to AC (alternating current) or DC (direct current). For example, electrodes 2802 and 2820 may be used to dynamically adjust the light transmission through the waveguide 2804. A second electric field may be applied between electrode 2806 and electrode 2822 to adjust light transmission through waveguide 2830. Waveguides and proximate portions of electrodes may be embedded in a dielectric medium 2812. Electrodes may be electrically connected to signal buslines (e.g., connected to the electronic IC 2814) and associated microcircuitry (not shown in detail), for example, through electrically conducting vias such as via 2834. Buslines may be supported by (e.g., embedded in) a substrate 2810. A control circuit (not shown) may control local and global dimming of a backlight using electrical control of electrooptical portions of a waveguide.

In some examples, electric fields may be used to modify optical properties of, for example, a waveguide and may be used to vary the backlight illumination in various portions of a backlight unit, for example, based on the brightness of the corresponding portion of an image shown on the display.

An example display module may include one or more of any of the following: transmissive LCOS; transmissive FLCOS; TFT (thin film transistor)+LC (liquid crystal) (e.g., active matrix liquid crystal display).

Displays may include novel pixelated display panels in which each pixel may include one or more of any of the following: active optical materials that may modify an optical response by external electric field or electric current; structures that may modify the optical response using an external electric field or electric current.

Color conversion modules may include one or more color-conversion materials that may absorb light within a certain wavelength range (e.g., absorb laser light), and emit light within a desired wavelength range (e.g., output red, green, yellow, white, orange, or other color light). An example color conversion material may include: a quantum well; semiconductor nanostructure or other types of nanostructure such as nanowires; quantum dots (e.g., semiconductor quantum dots), fluorescent materials (e.g., inorganic phosphors or fluorescent materials such as organic, polymer, or doped glass or semiconductor materials); or other suitable fluorescent materials.

Color conversion modules may also include one or more of any of the following: high and/or partial reflectivity film stacks to form a resonant cavity for the laser light to enhance absorption and consequently conversion efficiency; polarizers (e.g., wire-grid, particle, multi-stack, reflective polarizers, etc.); reflective polarizers, waveplates, and/or the reflective coatings configured to recycle any color-converted light having an unwanted polarization to improve output efficiency.

Example color conversion modules may include one or more of the following: a high/partial reflectivity film stack to form a resonant cavity for the laser light, for example to enhance absorption and consequently conversion efficiency; and/or one or more polarizers (e.g., wire-grid, particle, multi-stack, reflective polarizer, etc.). A reflective polarizer and/or a reflective coating may recycle the color-converted light in an unwanted polarization, and improve output efficiency. Light of the unwanted polarization may be reflected back into the cavity. An optical retarder, such as a quarter-wave plate, may be used to convert reflected light of unwanted polarization into the desired polarization.

An example light modulation module may include one or more of any of the following: LCOS (liquid crystal on silicon); ferroelectric LCOS; TFT-LC (thin-film transistor liquid crystal, or active matrix configurations); polymer-based EO display panels (e.g., including electroluminescent polymers, polymer stabilized or encapsulated liquid crystals); and/or organic or inorganic semiconductor material-based display panels.

In some examples, a pixelated display panel may be configured so that pixels may include one or more of the following; active optical materials (e.g., EO polymers, organic semiconductor materials, EO materials, EO ceramics, phase change materials, 2D materials, ITO) that may have optical properties that may be modified by an applied electric field or current. Example pixels may further include structures that can modify the optical response by an electric field or current. Examples further include emissive displays where an image may be formed by electrooptical control of waveguide elements.

In some examples, a device (e.g., a BLU module, a display, or a display including a backlight) may be used with a liquid crystal display, such as transmissive LCOS (liquid crystal on silicon), transmissive FLCOS (ferroelectric liquid crystal on silicon), active matrix nematic liquid crystal, TFT, or any other suitable display technology. In some examples, a light source may include one or more of the following: a semiconductor laser (e.g., a laser diode, vertical cavity surface emitting laser (VCSEL), or other semiconductor laser), fiber laser, heterogeneously integrated laser, light emitting diode (LED), superluminescent LED, and/or non-linearly converted light source, such as a pump laser combined with a nonlinear optical element, for example, second-harmonic generation (SHG), third harmonic generation (THG), four-wave mixing (FWM), difference-frequency generation (DFG), parametric downconversion (PDC), and the like. Light sources may be connected to the light distribution module through one or more of the following: optical fibers, nanowires, free-space edge coupling, or a waveguide grating couples.

In some examples, a device may include an electronic integrated circuit, a photonic integrated circuit, a color conversion module, and a display interface layer adjacent a display, where the photonic integrated circuit is configured to receive waveguide light from the photonic integrated circuit and transmit the waveguide light to the color conversion module, the color conversion module is configured to convert the light into converted light having at least one different light color from the waveguide light, and the waveguide light and the converted light is used to illuminate a portion of the display. The device may be a head-mounted device, such as an augmented reality device and/or a virtual reality device (AR/VR device).

In some examples, a method of illuminating a display includes transmitting laser light along a waveguide, outcoupling the laser light into a color conversion module, using the color conversion module, generating converted light having a different light color, and illuminating the display using the different light color.

In some examples, an apparatus includes at least one physical processor and physical memory including computer-executable instructions that, when executed by the physical processor, cause the physical processor to control the apparatus to perform a method such as described herein. In some examples, a non-transitory computer-readable medium includes one or more computer-executable instructions that, when executed by at least one processor of a computing device, cause the computing device to perform a method such as described herein. In some examples, an apparatus may include at least one physical processor and physical memory including computer-executable instructions that, when executed by the physical processor, cause the physical processor to control an apparatus, for example, using a method such as described herein, for example to control a display and/or backlight assembly.

Examples further include computer-implemented methods corresponding to methods such as described herein. Example methods include computer-implemented methods for operating or fabricating an apparatus, such as various apparatus as described herein. The steps of an example method, such as adhering components together, may be performed by any suitable computer-executable code and/or computing system. In some examples, one or more of the steps of an example method may represent an algorithm whose structure includes and/or may be represented by multiple sub-steps. In some examples, a non-transitory computer-readable medium including one or more computer-executable instructions that, when executed by at least one processor of a computing device, cause the computing device to perform a method as described herein such as driving an electronic display, such as a liquid crystal display. In some examples, a computer-implemented method may include a method such as described herein. In some examples, a method for assembling an optical device such as an AR/VR device may include computer control of an apparatus. In some examples, a non-transitory computer-readable medium may include one or more computer-executable instructions that, when executed by at least one processor of an apparatus, cause the apparatus to at least partially assemble or operate an electronic device such as an AR/VR device, for example, using a method such as described herein. In some examples, a non-transitory computer-readable medium may include one or more computer-executable instructions that, when executed by at least one processor of an apparatus, cause the apparatus to at least partially operate an electronic device such as an AR/VR device, for example, using a method such as described herein.

In some examples, a device may include a laser, a dynamic light distribution module, a color conversion module and a display, where the dynamic light distribution module is configured to receive laser light from the laser and transmit the laser light to the color conversion module, the color conversion module is configured to convert the laser light into a different light color, and the different light color is used to illuminate a portion of the display. The device may be a head-mounted device, such as an augmented reality device and/or a virtual reality device.

In some examples, a method of illuminating a display includes transmitting laser light along a waveguide, outcoupling the laser light into a color conversion module, using the color conversion module, generating a different light color using the color conversion module, and illuminating a display using the different light color.

In some examples, a device may include at least one physical processor and physical memory including computer-executable instructions that, when executed by the physical processor, cause the physical processor to control the apparatus to perform a method as described herein.

In some examples, an apparatus may include a backlight unit (BLU) including a light source such as a laser, a dynamic light distribution module, and a color conversion module. In some examples, a BLU may be configured to receive laser light from an external laser source. Laser light may be transmitted to various zones of the backlight unit using the dynamic light distribution module. In some examples, dynamic electrooptical control of light transmission intensities along a waveguide may be used to achieve global and/or local dimming of a display, such an AR/VR display or television display. Color conversion modules may be used to convert the laser light into one or more desired colors. Example apparatus may be used in head-mounted devices such as augmented reality and/or virtual reality devices. Examples further include other devices, methods, systems, and computer-readable media.

Examples include a compact, high-efficiency, high-PPI, and cost-effective display engine for AR/VR systems that supports laser light sources with improved color gamut. At a high level, the display engine includes a display backplane formed from an electronics layer, a photonics circuit layer, a color conversion layer, and a display interface. The electronics layer may include drive electronics and the photonics layer may distribute laser radiation to illuminate the display. The color conversion layer may convert essentially monochromatic laser radiation into any desired color to illuminate display pixels or subpixels. For example, the photonics circuit layer can receive blue light and convey the blue light to a display portion. A color conversion module proximate the display portion then converts parts of the blue light into red light and green light. The display portion can then be illuminated using red, green, and blue light while needing only a single photonic network to distribute the blue light to the display portion. Red and green light can be generated locally proximate the display portion, eliminating the need for separate photonic networks for the red and green light. This display backplane may be used in connection with a variety of display technologies, including liquid crystal displays (LCDs).

EXAMPLE EMBODIMENTS

Example 1. An example device may include a photonic integrated circuit configured to transmit light of a first color, a color conversion layer configured to receive the light of the first color from the photonic integrated circuit and convert at least a portion of the light of the first color into light of a second color that is different from the first color, and a display configured to be illuminated by the light of the first color and the light of the second color.

Example 2. The device of example 1, where the light of the first color is blue light and the light of the second color is red light.

Example 3. The device any of examples 1 or 2, where the light of the first color is blue light and the light of the second color is green light or yellow light.

Example 4. The device of any of examples 1-3, where the photonic integrated circuit includes a waveguide having a light outcoupler configured to direct at least a portion of the light of the first color from the waveguide towards the color conversion layer.

Example 5. The device of example 4, where the light outcoupler includes a grating.

Example 6. The device of examples 4 or 5, where the light outcoupler includes an arrangement of scattering particles.

Example 7. The device of any of examples 1-6, where the photonic integrated circuit includes a light input port and a dynamic light distribution module.

Example 8. The device of any of examples 1-7, where the dynamic light distribution module includes at least on Mach-Zehnder interferometer.

Example 9. The device of any of examples 1-8, where the light input port is configured to receive light of the first color from a laser, the light of the first color including laser radiation from the laser.

Example 10. The device of any of examples 1-9, where the device includes a laser configured to emit blue laser radiation; and the light of the first color is blue laser radiation.

Example 11. The device of any of examples 1-10, where the device further includes a pair of spaced-apart reflectors, and the color conversion layer is located within an optical cavity defined by the pair of spaced-apart reflectors.

Example 12. The device of any of examples 1-11, where the device includes a waveguide extending through the optical cavity.

Example 13. The device of any of examples 1-12, where the device further includes an electronic integrated circuit, and the color conversion layer is located between the electronic integrated circuit and the display.

Example 14. The device of any of examples 1-13, where the electronic integrated circuit includes at least one of electronic bus lines for power distribution, control lines, data lines, or an electronic circuit configured for active pixel control of the display.

Example 15. The device of any of examples 1-14, further including a display interface layer, where the display interface layer includes at least one of an anti-reflection coating, an electrically conductive electrode, an alignment layer, electrodes, a polarizer, or a black matrix layer.

Example 16. The device of any of examples 1-15, where the device is a head-mounted device.

Example 17. The device of any of examples 1, where the device is an augmented reality device or a virtual reality device.

Example 18. A device including a photonic integrated circuit, a color conversion layer, and a display, where the photonic integrated circuit is configured to receive ultraviolet (UV) light and transmit the UV light to the color conversion layer, the color conversion layer includes a plurality of color conversion modules, and the plurality of color conversion modules is configured to convert at least a portion of the UV light into three colors of visible light and illuminate the display using the three colors of visible light.

Example 19. The device of example 18, where the three colors of visible light include red light, green light, and blue light.

Example 20. A method of illuminating a display, including transmitting a first light beam having a first wavelength along a waveguide out-coupling the first light beam from the waveguide into a color conversion module using the color conversion module, generating a second light beam having a second wavelength different from the first wavelength, and illuminating a display using the first light beam and the second light beam.

Embodiments of the present disclosure may include or be implemented in-conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 2900 in FIG. 29) or that visually immerses a user in an artificial reality (such as, e.g., virtual-reality system 3000 in FIG. 30). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 29:
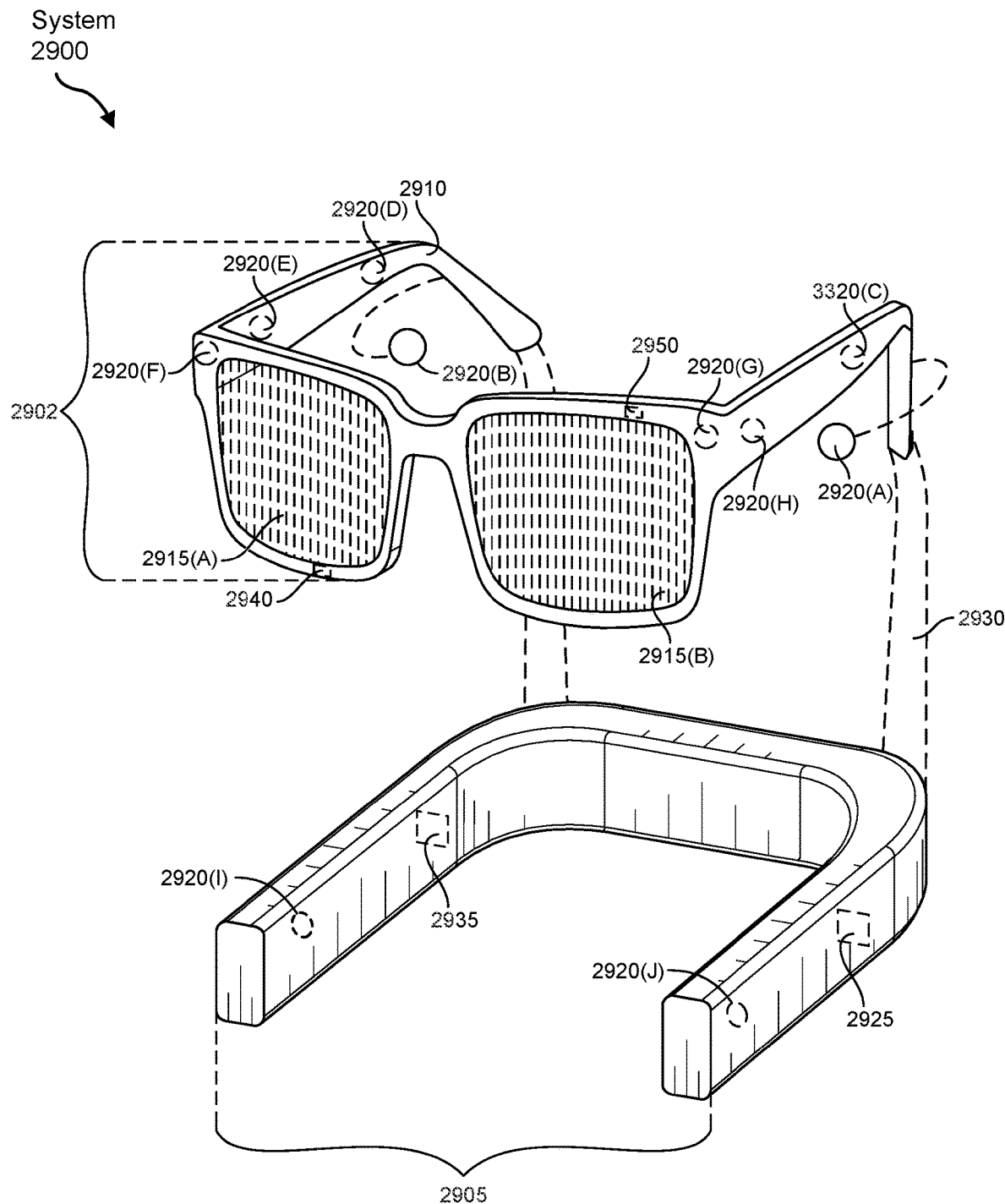
FIG. 29 is an illustration of exemplary augmented-reality glasses that may be used in connection with embodiments of this disclosure.
Figure 30:
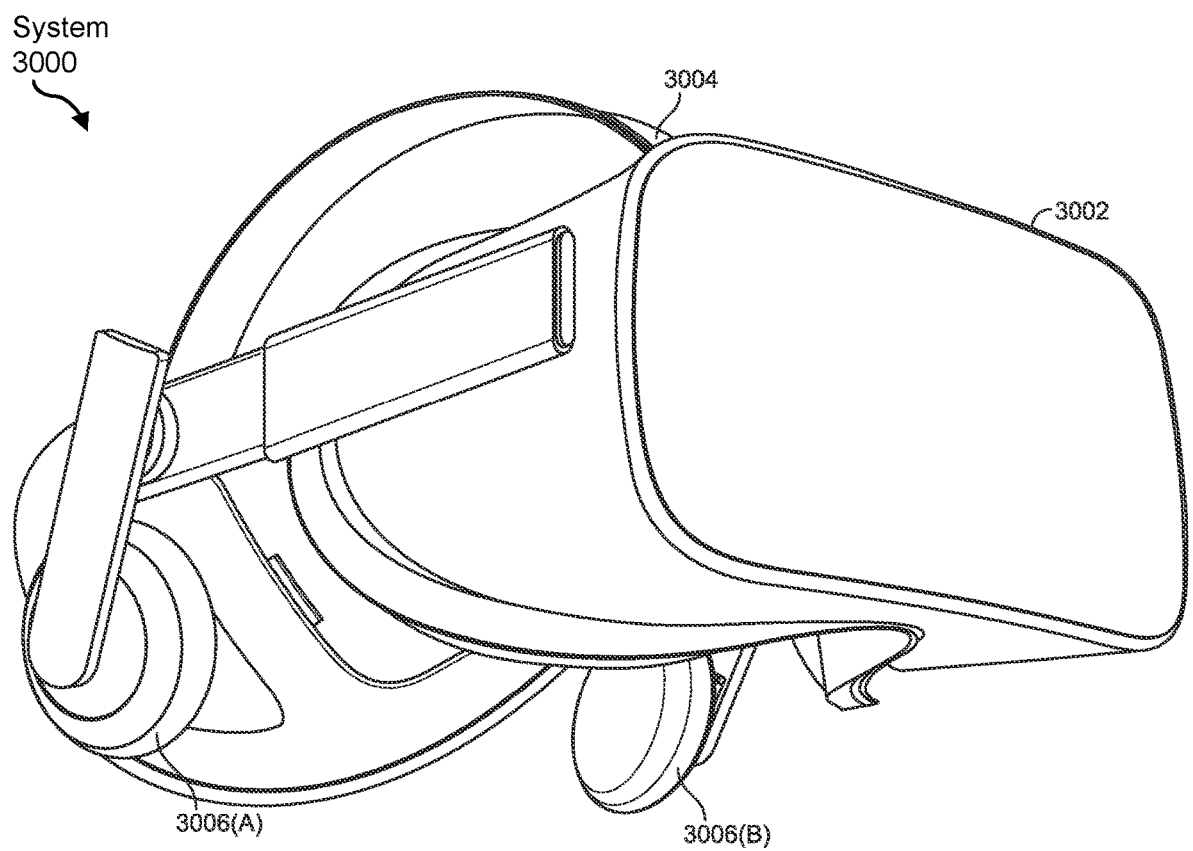
FIG. 30 is an illustration of an exemplary virtual-reality headset that may be used in connection with embodiments of this disclosure.

Turning to FIG. 29, augmented-reality system 2900 may include an eyewear device 2902 with a frame 2910 configured to hold a left display device 2915(A) and a right display device 2915(B) in front of a user's eyes. Display devices 2915(A) and 2915(B) may act together or independently to present an image or series of images to a user. While augmented-reality system 2900 includes two displays, embodiments of this disclosure may be implemented in augmented-reality systems with a single NED or more than two NEDs.

In some embodiments, augmented-reality system 2900 may include one or more sensors, such as sensor 2940. Sensor 2940 may generate measurement signals in response to motion of augmented-reality system 2900 and may be located on substantially any portion of frame 2910. Sensor 2940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2900 may or may not include sensor 2940 or may include more than one sensor. In embodiments in which sensor 2940 includes an IMU, the IMU may generate calibration data based on measurement signals from sensor 2940. Examples of sensor 2940 may include, without limitation, accelerometers, gyroscopes, magnetometers, other suitable types of sensors that detect motion, sensors used for error correction of the IMU, or some combination thereof.

In some examples, augmented-reality system 2900 may also include a microphone array with a plurality of acoustic transducers 2920(A)-2920(J), referred to collectively as acoustic transducers 2920. Acoustic transducers 2920 may represent transducers that detect air pressure variations induced by sound waves. Each acoustic transducer 2920 may be configured to detect sound and convert the detected sound into an electronic format (e.g., an analog or digital format). The microphone array in FIG. 29 may include, for example, ten acoustic transducers: 2920(A) and 2920(B), which may be designed to be placed inside a corresponding ear of the user, acoustic transducers 2920(C), 2920(D), 2920(E), 2920(F), 2920(G), and 2920(H), which may be positioned at various locations on frame 2910, and/or acoustic transducers 2920(I) and 2920(J), which may be positioned on a corresponding neckband 2905.

In some embodiments, one or more of acoustic transducers 2920(A)-(J) may be used as output transducers (e.g., speakers). For example, acoustic transducers 2920(A) and/or 2920(B) may be earbuds or any other suitable type of headphone or speaker.

The configuration of acoustic transducers 2920 of the microphone array may vary. While augmented-reality system 2900 is shown in FIG. 29 as having ten acoustic transducers 2920, the number of acoustic transducers 2920 may be greater or less than ten. In some embodiments, using higher numbers of acoustic transducers 2920 may increase the amount of audio information collected and/or the sensitivity and accuracy of the audio information. In contrast, using a lower number of acoustic transducers 2920 may decrease the computing power required by an associated controller 2950 to process the collected audio information. In addition, the position of each acoustic transducer 2920 of the microphone array may vary. For example, the position of an acoustic transducer 2920 may include a defined position on the user, a defined coordinate on frame 2910, an orientation associated with each acoustic transducer 2920, or some combination thereof.

Acoustic transducers 2920(A) and 2920(B) may be positioned on different parts of the user's ear, such as behind the pinna, behind the tragus, and/or within the auricle or fossa. Or, there may be additional acoustic transducers 2920 on or surrounding the ear in addition to acoustic transducers 2920 inside the ear canal. Having an acoustic transducer 2920 positioned next to an ear canal of a user may enable the microphone array to collect information on how sounds arrive at the ear canal. By positioning at least two of acoustic transducers 2920 on either side of a user's head (e.g., as binaural microphones), augmented-reality system 2900 may simulate binaural hearing and capture a 3D stereo sound field around about a user's head. In some embodiments, acoustic transducers 2920(A) and 2920(B) may be connected to augmented-reality system 2900 via a wired connection 2930, and in other embodiments acoustic transducers 2920(A) and 2920(B) may be connected to augmented-reality system 2900 via a wireless connection (e.g., a BLUETOOTH connection). In still other embodiments, acoustic transducers 2920(A) and 2920(B) may not be used at all in conjunction with augmented-reality system 2900.

Acoustic transducers 2920 on frame 2910 may be positioned in a variety of different ways, including along the length of the temples, across the bridge, above or below display devices 2915(A) and 2915(B), or some combination thereof. Acoustic transducers 2920 may also be oriented such that the microphone array is able to detect sounds in a wide range of directions surrounding the user wearing the augmented-reality system 2900. In some embodiments, an optimization process may be performed during manufacturing of augmented-reality system 2900 to determine relative positioning of each acoustic transducer 2920 in the microphone array.

In some examples, augmented-reality system 2900 may include or be connected to an external device (e.g., a paired device), such as neckband 2905. Neckband 2905 generally represents any type or form of paired device. Thus, the following discussion of neckband 2905 may also apply to various other paired devices, such as charging cases, smart watches, smart phones, wrist bands, other wearable devices, hand-held controllers, tablet computers, laptop computers, other external compute devices, etc.

As shown, neckband 2905 may be coupled to eyewear device 2902 via one or more connectors. The connectors may be wired or wireless and may include electrical and/or non-electrical (e.g., structural) components. In some cases, eyewear device 2902 and neckband 2905 may operate independently without any wired or wireless connection between them. While FIG. 29 illustrates the components of eyewear device 2902 and neckband 2905 in example locations on eyewear device 2902 and neckband 2905, the components may be located elsewhere and/or distributed differently on eyewear device 2902 and/or neckband 2905. In some embodiments, the components of eyewear device 2902 and neckband 2905 may be located on one or more additional peripheral devices paired with eyewear device 2902, neckband 2905, or some combination thereof.

Pairing external devices, such as neckband 2905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2900 may be provided by a paired device or shared between a paired device and an eyewear device, thus reducing the weight, heat profile, and form factor of the eyewear device overall while still retaining desired functionality. For example, neckband 2905 may allow components that would otherwise be included on an eyewear device to be included in neckband 2905 since users may tolerate a heavier weight load on their shoulders than they would tolerate on their heads. Neckband 2905 may also have a larger surface area over which to diffuse and disperse heat to the ambient environment. Thus, neckband 2905 may allow for greater battery and computation capacity than might otherwise have been possible on a stand-alone eyewear device. Since weight carried in neckband 2905 may be less invasive to a user than weight carried in eyewear device 2902, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2905 may be communicatively coupled with eyewear device 2902 and/or to other devices. These other devices may provide certain functions (e.g., tracking, localizing, depth mapping, processing, storage, etc.) to augmented-reality system 2900. In the embodiment of FIG. 29, neckband 2905 may include two acoustic transducers (e.g., 2920(I) and 2920(J)) that are part of the microphone array (or potentially form their own microphone subarray). Neckband 2905 may also include a controller 2925 and a power source 2935.

Acoustic transducers 2920(I) and 2920(J) of neckband 2905 may be configured to detect sound and convert the detected sound into an electronic format (analog or digital). In the embodiment of FIG. 29, acoustic transducers 2920(I) and 2920(J) may be positioned on neckband 2905, thereby increasing the distance between the neckband acoustic transducers 2920(I) and 2920(J) and other acoustic transducers 2920 positioned on eyewear device 2902. In some cases, increasing the distance between acoustic transducers 2920 of the microphone array may improve the accuracy of beamforming performed via the microphone array. For example, if a sound is detected by acoustic transducers 2920(C) and 2920(D) and the distance between acoustic transducers 2920(C) and 2920(D) is greater than, e.g., the distance between acoustic transducers 2920(D) and 2920(E), the determined source location of the detected sound may be more accurate than if the sound had been detected by acoustic transducers 2920(D) and 2920(E).

Controller 2925 of neckband 2905 may process information generated by the sensors on neckband 2905 and/or augmented-reality system 2900. For example, controller 2925 may process information from the microphone array that describes sounds detected by the microphone array. For each detected sound, controller 2925 may perform a direction-of-arrival (DOA) estimation to estimate a direction from which the detected sound arrived at the microphone array. As the microphone array detects sounds, controller 2925 may populate an audio data set with the information. In embodiments in which augmented-reality system 2900 includes an inertial measurement unit, controller 2925 may compute all inertial and spatial calculations from the IMU located on eyewear device 2902. A connector may convey information between augmented-reality system 2900 and neckband 2905 and between augmented-reality system 2900 and controller 2925. The information may be in the form of optical data, electrical data, wireless data, or any other transmittable data form. Moving the processing of information generated by augmented-reality system 2900 to neckband 2905 may reduce weight and heat in eyewear device 2902, making it more comfortable to the user.

Power source 2935 in neckband 2905 may provide power to eyewear device 2902 and/or to neckband 2905. Power source 2935 may include, without limitation, lithium-ion batteries, lithium-polymer batteries, primary lithium batteries, alkaline batteries, or any other form of power storage. In some cases, power source 2935 may be a wired power source. Including power source 2935 on neckband 2905 instead of on eyewear device 2902 may help better distribute the weight and heat generated by power source 2935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 3000 in FIG. 30, that mostly or completely covers a user's field of view. Virtual-reality system 3000 may include a front rigid body 3002 and a band 3004 shaped to fit around a user's head. Virtual-reality system 3000 may also include output audio transducers 3006(A) and 3006(B). Furthermore, while not shown in FIG. 30, front rigid body 3002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 2900 and/or virtual-reality system 3000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2900 and/or virtual-reality system 3000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2900 and/or virtual-reality system 3000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising".

What is claimed is:

1. A device comprising:
   a photonic integrated circuit configured to transmit light of a first color;
   a pair of spaced-apart reflectors;
   a color conversion layer, located within an optical cavity defined by the pair of spaced-apart reflectors, configured to:
      receive the light of the first color from the photonic integrated circuit; and
      convert at least a portion of the light of the first color into light of a second color that is different from the first color; and
   a display configured to be illuminated by the light of the first color and the light of the second color.

2. The device of claim 1, wherein the light of the first color is blue light and the light of the second color is red light.

3. The device of claim 1, wherein the light of the first color is blue light and the light of the second color is green light or yellow light.

4. The device of claim 1, wherein:
   the photonic integrated circuit includes a waveguide having a light outcoupler configured to direct at least a portion of the light of the first color from the waveguide towards the color conversion layer.

5. The device of claim 4, wherein the light outcoupler comprises a grating.

6. The device of claim 4, wherein the light outcoupler comprises an arrangement of scattering particles.

7. The device of claim 1, wherein the photonic integrated circuit comprises:
   a light input port; and
   a dynamic light distribution module.

8. The device of claim 7, wherein the dynamic light distribution module includes at least on Mach-Zehnder interferometer.

9. The device of claim 8, wherein:
   the light input port is configured to receive light of the first color from a laser, the light of the first color including laser radiation from the laser.

10. The device of claim 8, wherein:
    the device comprises a laser configured to emit blue laser radiation; and
    the light of the first color is blue laser radiation.

11. The device of claim 1, wherein the spaced-apart reflectors comprise at least one of:
    one or more high reflectivity mirrors; and
    one or more partial reflectivity mirrors.

12. The device of claim 1, wherein the device includes a waveguide extending through the optical cavity.

13. The device of claim 1, wherein:
    the device further includes an electronic integrated circuit; and
    the color conversion layer is located between the electronic integrated circuit and the display.

14. The device of claim 13, wherein the electronic integrated circuit includes at least one of electronic bus lines for power distribution, control lines, data lines, or an electronic circuit configured for active pixel control of the display.

15. The device of claim 1, further comprising a display interface layer, wherein:
the display interface layer includes at least one of an anti-reflection coating, an electrically conductive electrode, an alignment layer, electrodes, a polarizer, or a black matrix layer.

16. The device of claim 1, where the device is a head-mounted device.

17. The device of claim 1, where the device is an augmented reality device or a virtual reality device.

18. A device comprising:
a photonic integrated circuit;
a display;
an electronic integrated circuit; and
a color conversion layer, located between the electronic integrated circuit and the display, wherein:
the photonic integrated circuit is configured to receive ultraviolet (UV) light and transmit the UV light to the color conversion layer;
the color conversion layer includes a plurality of color conversion modules; and
the plurality of color conversion modules is configured to:
convert at least a portion of the UV light into three colors of visible light; and
illuminate the display using the three colors of visible light.

19. The device of claim 18, wherein the three colors of visible light include red light, green light, and blue light.

20. A method of illuminating a display, comprising:
transmitting a first light beam having a first wavelength along a waveguide out-coupling the first light beam from the waveguide into a color conversion module, located within an optical cavity defined by a pair of spaced-apart reflectors;
using the color conversion module, generating a second light beam having a second wavelength different from the first wavelength; and
illuminating a display using the first light beam and the second light beam.

* * * * *